US012573343B2

(12) United States Patent
Yun et al.

(10) Patent No.: US 12,573,343 B2
(45) Date of Patent: Mar. 10, 2026

(54) DISPLAY PANEL AND DISPLAY DEVICE INCLUDING THE SAME

(71) Applicant: LG DISPLAY CO., LTD., Seoul (KR)

(72) Inventors: Yong Woo Yun, Paju-si (KR); Dae Seok Oh, Paju-si (KR); Ki Tae Kwon, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/921,913

(22) Filed: Oct. 21, 2024

(65) Prior Publication Data

US 2025/0218365 A1 Jul. 3, 2025

(30) Foreign Application Priority Data

Dec. 28, 2023 (KR) ........................ 10-2023-0193965

(51) Int. Cl.

*G09G 3/3233* (2016.01)
*G09G 3/32* (2016.01)

(52) U.S. Cl.

CPC ............. *G09G 3/3233* (2013.01); *G09G 3/32* (2013.01); *G09G 2300/0814* (2013.01); *G09G 2300/0819* (2013.01); *G09G 2300/0842* (2013.01); *G09G 2310/08* (2013.01); *G09G 2320/068* (2013.01); *G09G 2380/10* (2013.01)

(58) Field of Classification Search

CPC ................... G09G 3/3233; G09G 3/32; G09G 2300/0814; G09G 2300/0819; G09G 2300/0842; G09G 2310/08; G09G 2320/068; G09G 2380/10

See application file for complete search history.

(56) References Cited

U.S. PATENT DOCUMENTS

| | | | | |
|---|---|---|---|---|
| 2019/0108790 | A1 | 4/2019 | Liang et al. | |
| 2021/0295774 | A1 | 9/2021 | Sun et al. | |
| 2021/0366372 | A1 | 11/2021 | Sun et al. | |
| 2021/0375203 | A1* | 12/2021 | Chen | G09G 3/204 |
| 2022/0148504 | A1* | 5/2022 | Wang | G09G 3/2074 |
| 2023/0217763 | A1 | 7/2023 | Hong et al. | |

FOREIGN PATENT DOCUMENTS

KR 10-2023-0102365 A 7/2023

OTHER PUBLICATIONS

Office Action dated Apr. 30, 2025 issued in corresponding British Patent Application No. 2416010.3.

* cited by examiner

*Primary Examiner* — Antonio Xavier

(74) *Attorney, Agent, or Firm* — Morgan, Lewis & Bockius LLP

(57) ABSTRACT

A display device may include a driving element configured to generate a current; a first light-emitting element configured to emit light by the current from the driving element; a second light-emitting element configured to emit light by the current from the driving element; a mode selection circuit configured to select a current path from the driving element in response to a first horizontal mode selection signal, a second horizontal mode selection signal, a vertical mode selection signal, and a bridge signal.

18 Claims, 47 Drawing Sheets

DISPLAY PANEL AND DISPLAY DEVICE INCLUDING THE SAME

CROSS-REFERENCE TO RELATED APPLICATIONS

This application claims the priority to and benefit of Korean Patent Application No. 10-2023-0193965, filed on Dec. 28, 2023, the entire disclosure of which is incorporated herein by reference.

BACKGROUND

1. Technical Field

The present disclosure relates to a display panel and a display device, and particularly to, for example, without limitation, a display panel having a viewing angle that is variable in units of pixels and a display device including the same.

2. Discussion of the Related Art

A variable viewing angle technology may be applied to the display device. The variable viewing angle technology may display video content or visual information reproduced on the display device only to users within a narrow viewing angle range or to multiple users existing within a wide viewing angle range.

As the market for future vehicles such as electric vehicles and autonomous vehicles expands, the demand for vehicle display devices is rapidly increasing. Research is being conducted on a method of dividing the screen of a vehicle display device and controlling a part of the screen with a narrow viewing angle and another part with a wide viewing angle. This technology may display personal content or information that can only be viewed by a specific user by driving pixels having the narrow viewing angle arranged in a partial area of the screen, and at the same time, by driving pixels having the wide viewing angle arranged in another area of the screen, shared content that multiple users can see together may be displayed.

A display panel of an organic light-emitting display device is attracting attention in a vehicle display device. The organic light-emitting display device includes an organic light-emitting diode (hereinafter, referred to as "OLED") that emits light by itself, and has advantages of fast response speed and high luminous efficiency, luminance, and viewing angle. The organic light-emitting display device has a fast response speed and excellent luminous efficiency, luminance, viewing angle, and the like, and excellent contrast ratio and color reproduction rate because black gray scales may be expressed in complete black. Since the display panel of the organic light-emitting display device may be flexibly bent, a curved surface may be easily implemented. Due to these advantages, the market share of the organic light-emitting display device in a vehicle display device market is rapidly increasing.

The description of the related art should not be assumed to be prior art merely because it is mentioned in or associated with this section. The description of the related art includes information that describes one or more aspects of the subject technology, and the description in this section does not limit the invention.

SUMMARY

In the display device to which the variable viewing angle technology is applied, the viewing angle is not partially controlled, and the entire screen may be controlled at a specific viewing angle, or the viewing angle may be controlled in units of a screen area having a preset size. Accordingly, there is a need for a technology capable of freely controlling the viewing angle within the screen of the display device.

One or more aspects of the present disclosure are directed to an apparatus that substantially obviates one or more problems due to limitations and disadvantages of the related art.

One or more aspects of the present disclosure provide a display panel in which pixels may be controlled at the viewing angle different from the background in a window area of the screen by freely changing the viewing angle at all positions of the screen, and a display device including the same.

The problems or limitations to be solved or addressed by the present disclosure are not limited to those mentioned above, and other problems or limitations not mentioned will be clearly understood by those skilled in the art from the following description.

A display panel according to one example embodiment of the present disclosure includes a plurality of sub-pixels. Each of the plurality of sub-pixels includes a driving element that generates a current; a first light-emitting element that emits light by a current from the driving element; a second light-emitting element that emits light by a current from the driving element; a mode selection circuit that selects a current path from the driving element in response to a first horizontal mode selection signal, a second horizontal mode selection signal, a vertical mode selection signal, and a bridge signal; and a first pixel switch element connected to the driving element through a first node and connected to the mode selection circuit through a second node. The vertical mode selection signal includes at least a second vertical mode selection signal among a first vertical mode selection signal and the second vertical mode selection signal.

The mode selection circuit may include: a first switch element configured to be turned on in response to a gate-on voltage of the first horizontal mode selection signal electrically connecting the second node to a third node; a second switch element configured to be turned on in response to the gate-on voltage of the second horizontal mode selection signal electrically connecting the second node to a fourth node; a third switch element configured to be turned on in response to the gate-on voltage of the bridge signal electrically connecting the third node to the fourth node; and a fourth switch element configured to be turned on in response to the gate-on voltage of the second vertical mode selection signal electrically connecting the fourth node to an anode electrode of the second light-emitting element.

An anode electrode of the first light-emitting element may be connected to the third node.

A sub-pixel may be configured to be driven in a first mode, when the first switch element and the third switch element are turned on, and the second switch element and the fourth switch element are in an off state. A sub-pixel may be configured to be driven in the first mode, when the first switch element and the fourth switch element are turned on, and the second switch element and the third switch element are in the off state. A sub-pixel may be configured to be driven in the first mode, when the second switch element and the third switch element are turned on and the first switch element and the fourth switch element are in the off state. A sub-pixel may be configured to be driven in a second mode, when the second switch element and the fourth switch element are turned on and the first switch element and the third switch element are in the off state. The mode selection circuit further may further include a fifth switch element configured to be turned on in response to the gate-on voltage of the first vertical mode selection signal electrically connecting the third node to an anode electrode of the first light-emitting element.

A sub-pixel may be configured to be driven in a first mode, when the first switch element, the third switch element, and the fifth switch element are turned on, and the second switch element and the fourth switch element are in an off state. A sub-pixel may be configured to be driven in the first mode, when the first switch element, the fourth switch element, and the fifth switch element are turned on, and the second switch element and the third switch element are in the off state. A sub-pixel may be configured to be driven in the first mode, when the second switch element, the third switch element, and the fifth switch element are turned on, and the first switch element and the fourth switch element are in the off state. A sub-pixel may be configured to be driven in a second mode, when the second switch element, the fourth switch element, and the fifth switch element are turned on, and the first switch element and the third switch element are in the off state.

A sub-pixel may be configured to be driven in a first mode, when the first switch element, the fourth switch element, and the fifth switch element are turned on, and the second switch element and the third switch element are in an off state. A sub-pixel may be configured to be driven in a second mode, when the first switch element, the third switch element, and the fourth switch element are turned on, and the second switch element and the fifth switch element are in the off state. A sub-pixel may be configured to be driven in the second mode, when the second switch element, the fourth switch element, and the fifth switch element are turned on, and the first switch element and the third switch element are in the off state. A sub-pixel may be configured to be driven in the second mode, when the second switch element, the third switch element, and the fourth switch element are turned on, and the first switch element and the fifth switch element are in the off state.

A viewing angle of a sub-pixel for being driven in the first mode may be greater than a viewing angle of a sub-pixel for being driven in the second mode.

Each of the sub-pixels may further include a capacitor connected between sixth and seventh nodes; a second pixel switch element connected between a data line to which a data voltage of a pixel data is for being applied and a sixth node, and configured to be turned on in response to the gate-on voltage of a first scan signal; a third pixel switch element connected between the first node and the seventh node, and configured to be turned on in response to the gate-on voltage of a second scan signal; a fourth pixel switch element connected between a reference node to which a reference voltage is for being applied and an anode electrode of the first light-emitting element, and configured to be turned on in response to the gate-on voltage of the second scan signal; a fifth pixel switch element connected between the reference node and the anode electrode of the second light-emitting element, and configured to be turned on in response to the gate-on voltage of the second scan signal; and a sixth pixel switch element connected between the reference node and the sixth node, and configured to be turned on in response to the gate-on voltage of a light-emitting signal. The first pixel switch element may be connected between the first node and the second node and may be configured to be turned on in response to the gate-on voltage of the light-emitting signal. The driving element may include a first electrode to which a pixel driving voltage is for being applied, a second electrode connected to the first node, and a gate electrode connected to the seventh node.

Each of the plurality of sub-pixels further may include a capacitor connected between a pixel driving node to which a pixel driving voltage is for being applied and a seventh node; a second pixel switch element connected between a data line to which a data voltage of a pixel data is for being applied and a sixth node, and configured to be turned on in response to the gate-on voltage of a second scan signal; a third pixel switch element connected between the first node and the seventh node, and configured to be turned on in response to the gate-on voltage of a first scan signal; a fourth pixel switch element connected between a second compensation node to which a second compensation voltage is for being applied and an anode electrode of the first light-emitting element, and configured to be turned on in response to the gate-on voltage of a third scan signal; a fifth pixel switch element connected between the second compensation node and the anode electrode of the second light-emitting element, and configured to be turned on in response to the gate-on voltage of the third scan signal; a sixth pixel switch element connected between an initialization node to which an initialization voltage is for being applied and the seventh node, and configured to be turned on in response to the gate-on voltage of a fourth scan signal; a seventh pixel switch element connected between the pixel driving node and the sixth node, and configured to be turned on in response to the gate-on voltage of a light-emitting signal; and an eighth pixel switch element connected between a first compensation node to which a first compensation voltage is for being applied and the sixth node, and configured to be turned on in response to the gate-on voltage of the third scan signal. The first pixel switch element may be connected between the first node and the second node and may be configured to be turned on in response to the gate-on voltage of the light-emitting signal. The driving element may include a first electrode connected to the sixth node, a second electrode connected to the first node, and a gate electrode connected to the seventh node.

Each of the plurality of sub-pixels may include a capacitor connected between a pixel driving node to which a pixel driving voltage is for being applied and a seventh node; a second pixel switch element connected between a data line to which a data voltage of a pixel data is for being applied and a sixth node, and configured to be turned on in response to the gate-on voltage of an Nth scan signal (where N is a natural number); a third pixel switch element connected between the first node and the seventh node, and configured to be turned on in response to the gate-on voltage of the Nth scan signal; a fourth pixel switch element connected to an initialization node to which an initialization voltage is for being applied and an anode electrode of the first light-emitting element, and configured to be turned on in response to the gate-on voltage of an (N−1)th scan signal; a fifth pixel switch element connected between the initialization node and the anode electrode of the second light-emitting element, and configured to be turned on in response to the gate-on voltage of the (N−1)th scan signal; a sixth pixel switch element connected between the initialization node and the seventh node, and configured to be turned on in response to the gate-on voltage of the (N−1)th scan signal; and a seventh pixel switch element connected between the pixel driving node and the sixth node, and configured to be turned on in response to the gate-on voltage of a light-emitting signal. The first pixel switch element may be connected between the first node and the second node and may be configured to be turned on in response to the gate-on voltage of the light-emitting signal. The driving element may include a first electrode connected to the sixth node, a second electrode connected to the first node, and a gate electrode connected to the seventh node.

Each of the plurality of sub-pixels may include a capacitor connected between seventh and eighth nodes; a second pixel switch element connected between a data line to which a data voltage of a pixel data is for being applied and a sixth node, and configured to be turned on in response to the gate-on voltage of an Nth scan signal (where N is a natural number); a third pixel switch element connected between the first node and the seventh node, and configured to be turned on in response to the gate-on voltage of the Nth scan signal; a fourth pixel switch element connected to an initialization node to which an initialization voltage is for being applied and an anode electrode of the first light-emitting element, and configured to be turned on in response to the gate-on voltage of an (N−1)th scan signal; a fifth pixel switch element connected between the initialization node and the anode electrode of the second light-emitting element, and configured to be turned on in response to the gate-on voltage of the (N−1)th scan signal; a sixth pixel switch element connected between the initialization node and the seventh node, and configured to be turned on in response to the gate-on voltage of the (N−1)th scan signal; a seventh pixel switch element connected between the sixth node and the eighth node, and configured to be turned on in response to the gate-on voltage of a light-emitting signal; an eighth pixel switch element connected between a pixel driving node to which a pixel driving voltage is for being applied and the eighth node, and configured to be turned on in response to the gate-on voltage of the light-emitting signal; a ninth pixel switch element connected between a reference node to which a reference voltage is for being applied and the eighth node, and configured to be turned on in response to the gate-on voltage of the (N−1)th scan signal; and a tenth pixel switch element connected between the reference node and the eighth node, and configured to be turned on in response to the gate-on voltage of the Nth scan signal. The first pixel switch element may be connected between the first node and the second node and may be configured to be turned on in response to the gate-on voltage of the light-emitting signal. The driving element may include a first electrode connected to the sixth node, a second electrode connected to the first node, and a gate electrode connected to the seventh node.

A display device according to one example embodiment of the present disclosure includes a display panel; a data driver configured to supply a data voltage to data lines; a gate driver configured to receive a gate timing signal and supply a scan signal and a light emission signal to gate lines; and a level shifter configured to output a gate timing signal, a first horizontal mode selection signal, a second horizontal mode selection signal, a vertical mode selection signal, and a bridge signal.

The display panel may further include a plurality of vertical mode lines parallel to the data lines; and a plurality of horizontal mode lines parallel to the gate lines. The vertical mode selection signal and the bridge signal may be applied to the plurality of vertical mode lines. The first horizontal mode selection signal and the second horizontal mode selection signal may be applied to the plurality of horizontal mode lines.

The gate driver may be disposed on the display panel. At least a portion of the plurality of horizontal mode lines may overlap the gate driver on the display panel.

One or more aspects of the present disclosure allow low power and process optimization, as well as freely changing the viewing angles of pixels by using the mode selection signal of the pixel.

According to one or more aspects of the present disclosure, the viewing angle of the window pixel area surrounded by a background pixel area may be controlled differently from the background pixel area.

The effects of the present disclosure are not limited to the above-mentioned effects, and other effects that are not mentioned will be apparently understood by those skilled in the art from the following description and the appended claims.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure. In the drawings.

Figure 1:
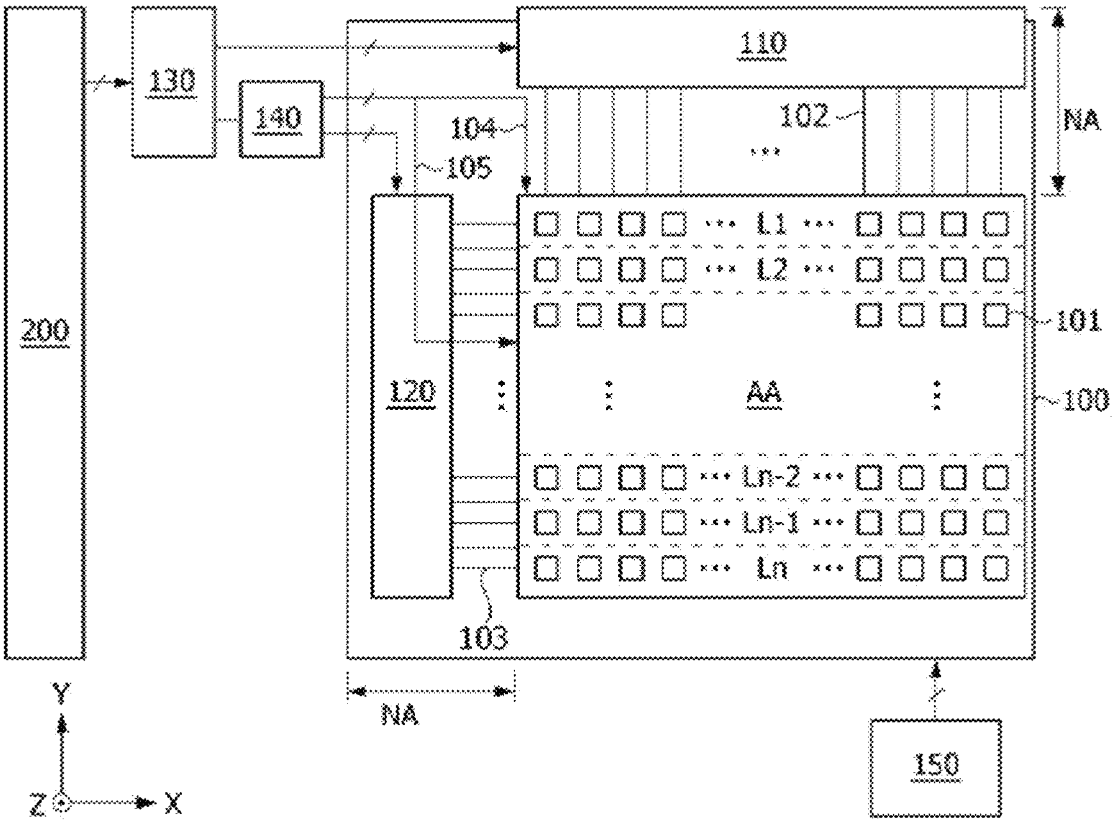
FIG. 1 is a block diagram illustrating a display device according to one example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “connect between,” “connect to,” “crossing,” “intersecting,” or the like, one or more other components may be interposed between them, unless “immediately” or “directly” is used.

When a temporal antecedent relationship is described, such as “after”, “following”, “next to”, “before”, or the like, it may not be continuous on a time base unless “immediately” or “directly” is used.

The terms “first,” “second,” and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit of the display device may include a plurality of transistors. The transistor may be implemented as a thin film transistor (TFT). The transistors may be implemented as an oxide thin film transistor (TFT) including an oxide semiconductor, a low temperature poly silicon TFT (LTPS TFT) including a low temperature poly silicon, and the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

Referring to FIG. 1, a display device according to an example embodiment of the present disclosure includes a display panel 100 and a display panel driving circuit for writing pixel data to pixels of the display panel 100. The display device also includes a power supply 150.

The display panel 100 may be, but is not limited to, a rectangular shaped panel having a length in the X-axis direction (or first direction), a width in the Y-axis direction (or second direction), and a thickness in the Z-axis direction (or third direction). For example, the display panel 100 may be a deformed panel that is at least partially curved or elliptical.

A display area AA of the display panel 100 includes a pixel array for displaying an input image thereon. The pixel array includes a plurality of data lines 102, a plurality of gate lines 103 intersected with the data lines 102, and the pixels 101 arranged in a matrix form. The display panel 100 may further include power lines commonly connected to the pixels. The power lines may be commonly connected to pixel circuits and supply a voltage required for driving the pixels 101 to the pixels 101.

Each of the pixels 101 may be divided into a red sub-pixel, a green sub-pixel, and a blue sub-pixel for color implementation. Each of the pixels may further include a white sub-pixel. Each sub-pixel includes a pixel circuit for driving a light-emitting element. The light-emitting element may be implemented as an organic light-emitting element, such as an OLED, or an inorganic light-emitting element, such as a micro light-emitting diode (LED). Each of the pixel circuits may be connected to the data lines, the gate lines, and the power lines. Hereinafter, a pixel may be interpreted as having the same meaning as a sub-pixel.

Each of the pixels 101 may include a first light-emitting element that emits light in a first viewing angle mode (hereinafter, referred to as a "first mode") and a second light-emitting element that emits light in a second viewing angle mode (hereinafter, referred to as a "second mode"). Each of the pixels 101 may emit light from the first light-emitting element at a wide viewing angle in the first mode, whereas in the second mode, light from the second light-emitting element may be emitted at a narrow viewing angle.

The display area AA includes a plurality of pixel lines L1 to Ln. Each of the pixel lines L1 to Ln includes one line of pixels arranged along the line direction (X-axis direction) in the pixel array of the display panel 100. The pixels arranged in one pixel line may share the gate lines 103. The sub-pixels arranged in the column direction (Y) may share the same data line 102. One horizontal period is a time obtained by dividing one frame period by the total number of the pixel lines L1 to Ln.

The display panel 100 may be implemented with a non-transmissive display panel or a transmissive display panel. The transmissive display panel may be applied to a transparent display device in which an image is displayed on a screen and an actual object is visible beyond the display panel. The display panel 100 may be made as a flexible display panel that can be flexibly bent.

The power supply 150 receives an input voltage from a host system 200 and outputs voltages required to drive the pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output constant voltages (or direct current voltages), such as a gate high voltage, a gate low voltage, a pixel driving voltage, a cathode voltage, a reference voltage, an initialization voltage, and an IC driving voltage for the display panel drive circuit through the DC-DC converter. The gate high voltage and the gate low voltage may be supplied to a level shifter 140 and the gate driver 120. The constant voltages such as the pixel driving voltage, the cathode voltage, the reference voltage, and the initialization voltage are supplied to the pixels 101 via the power lines commonly connected to the pixels 101.

The power supply 150 may further include a gamma voltage generator. The gamma voltage generator may receive a high potential reference voltage and a low potential reference voltage and output a plurality of gamma reference voltages divided by a predetermined voltage difference interval on a preset gamma curve, for example, 2.2 gamma curve. The gamma reference voltages are supplied to the data driver 110. The gamma reference voltages are divided by a voltage division circuit and subdivided into grayscale voltages in the data driver 110. The gamma voltage generator may be implemented as a programmable gamma circuit capable of adjusting a voltage of each of the gamma reference voltages according to digital data. The timing controller 130 or the host system 200 or a separate external device may update the digital data stored in a register of the programmable gamma circuit through a communication interface.

The display panel driving circuit writes the pixel data of the input image to the pixels of the display panel 100 under the control of the timing controller 130. The display panel driving circuit includes a data driver 110, a gate driver 120, a level shifter 140, and a timing controller 130.

The display panel driving circuit may further include a touch sensor driver for driving touch sensors. The touch sensor driver is omitted from FIG. 1. The data driver 110 and the touch sensor driver may be integrated into a source drive integrated circuit (IC).

The data driver 110 receives the pixel data of the input image received as a digital signal from the timing controller 130 and outputs the data voltage. The data driver 110 may receive the gamma reference voltages and generate gamma compensated voltages for each grayscale through the voltage division circuit. The gamma-compensated voltages are supplied to a digital to analog converter ("DAC") disposed on each of the channels of the data driver 110.

The data driver 110 samples and latches the digital data received from the timing controller 130, and then inputs the digital data to the DAC. Here, the digital data includes pixel data of the input image. The DAC converts the pixel data to a gamma-compensated voltage and outputs the data voltage of the pixel data.

The gate driver 120 may be formed on the display panel 100 together with circuit elements of the display area AA and the wires. The gate driver 120 may be disposed in at least one of left and right non-display areas NA of the display panel 100 outside the display area AA, or at least a portion thereof may be disposed within the display area AA.

The gate driver 120 may be disposed in the non-display areas NA on both sides of the display panel 100 with the display area AA of the display panel interposed therebetween, and may supply gate pulses from the both sides of the gate lines 103 in a double feeding method. In another embodiment, the gate driver 120 may be disposed in at least one side of the left and right non-display areas NA of the display panel 100 to supply gate signals to the gate lines 103 in a single feeding method. The gate driver 120 sequentially outputs pulses of the gate signals to the gate lines 103 under the control of the timing controller 130. The gate driver 120 may sequentially supply the gate signals to the gate lines 103 by shifting the pulses of the gate signals using a shift registers and an edge trigger.

The gate signal may include a scan signal input to the pixel circuit via a plurality of gate lines, and an emission signal (hereinafter referred to as an "EM signal"). In this case, the gate driver may include a gate driver that outputs the scan signal and a gate driver that outputs the EM signal. Each of the scan signal and the EM signal may swing between the gate high and gate low voltages.

The timing controller 130 receives from the host system 200 digital video data of the input image and timing signals synchronized with this data. The timing signal may include a vertical synchronization signal Vsync, a horizontal synchronization signal Hsync, and a data enable signal DE. Since a vertical period and a horizontal period may be known by counting the data enable signal DE, the vertical synchronization signal Vsync and the horizontal synchronization signal Hsync may be omitted. The horizontal synchronization signal Hsync and the data enable signal DE have a period of one horizontal period (1H).

The timing controller 130 generates a data timing control signal for controlling the operation timing of the data driver 110 and a gate timing control signal for controlling the operation timing of the gate driver 120 based on the timing signals Vsync, Hsync, and DE received from the host system 200, thereby controlling the display panel driving circuit. The timing controller 130 synchronizes the data driver 110 and the gate driver 120 by controlling the operation timing of the display panel driving circuit.

The timing control signal output from the timing controller 130 may be input to the shift register of the gate driver 120 through the level shifter 140. A mode selection signal output from the timing controller 130 may be input to a mode selection circuitry through the level shifter 140. The mode selection signal may include a vertical mode selection signal, a horizontal mode selection signal, and a bridge signal.

The level shifter 140 may convert a voltage level of the signal received from the timing controller 130 into a swing width between the gate high voltage and the gate low voltage and output the same. The level shifter 140 may decode the gate timing signal to output a start pulse and clock to drive the gate driver 120, and may decode the mode selection signal to output the vertical mode selection signal, the horizontal mode selection signal, and the bridge signal. The start pulse, clock, vertical mode select signal, horizontal mode select signal, and bridge signal are each alternating current signals that swing between the gate high and gate low voltages.

The host system 200 may scale an image signal from a video source to match the resolution of the display panel 100, and may transmit it to the timing controller 130 together with the timing signal. The host system 200 may transmit a viewing angle mode signal having different logic values in the first mode and the second mode together with the image signal to the timing controller 130 at least once every frame. The timing controller 130 may output a vertical mode selection signal, a horizontal mode selection signal, and a bridge signal in response to the viewing angle mode signal.

Figure 2:
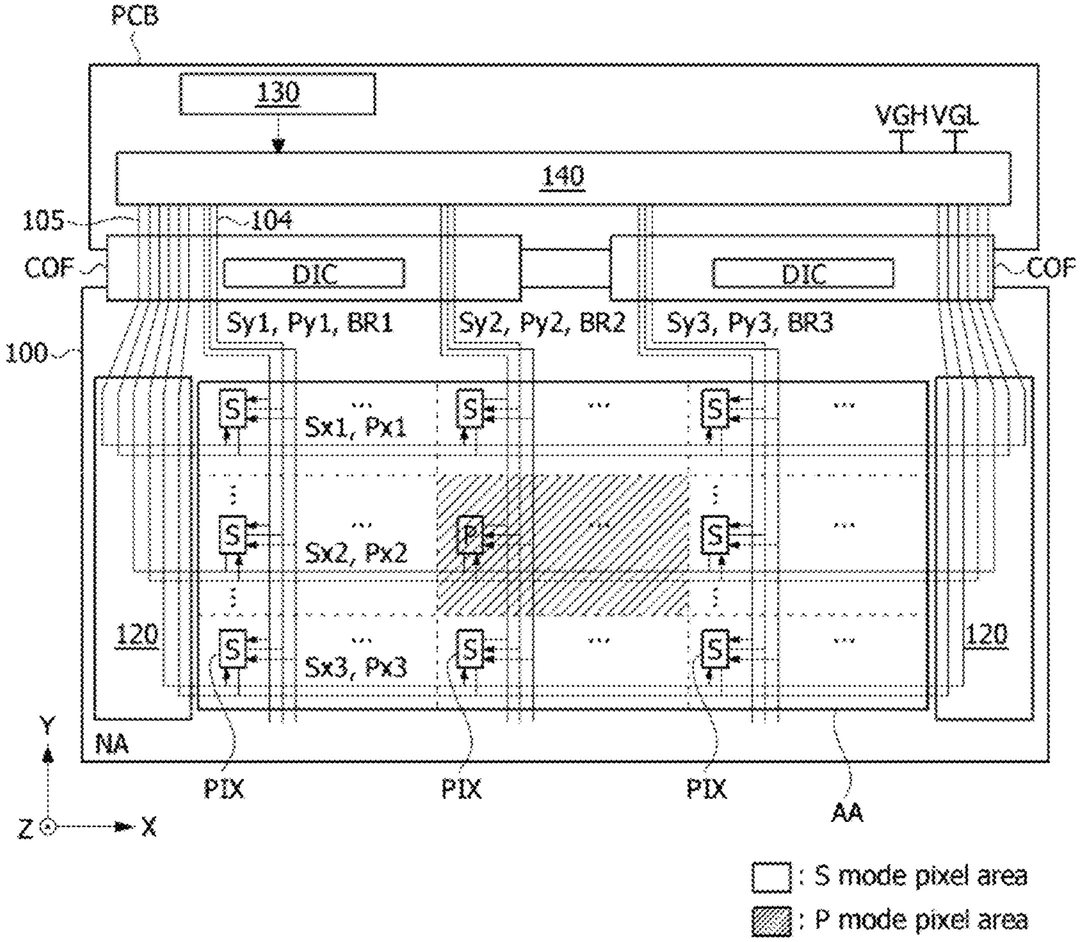
FIG. 2 is an example of a diagram illustrating a transmission path of a mode selection signal.

FIG. 2 is an example of a diagram illustrating the transmission path of the mode selection signal.

Referring to FIG. 2, the display panel 100 may further include a plurality of vertical mode lines 104 and a plurality of horizontal mode lines 105.

Vertical mode lines 104 are disposed in parallel to the data lines 102 and are connected to a pixel circuit PIX of each of the sub-pixels. The horizontal mode lines 105 are disposed in parallel to the gate lines 103 and are connected to the pixel circuit PIX of each of the sub-pixels. Some of the horizontal mode lines 105 may overlap the circuits of the gate driver 120 with an insulating layer therebetween.

Vertical mode selection signals Sy1, Py1, Sy2, Py2, Sy3, and Py3 and bridge signals BR1, BR2, and BR3 may be applied to the pixel circuit PIX of the pixels through the vertical mode lines 104. The vertical mode selection signals Sy1, Py1, Sy2, Py2, Sy3, and Py3 may select the viewing angle of each pixel in a Y-axis direction (or a second direction). Horizontal mode selection signals Sx1, Px1, Sx2, Px2, Sx3, and Px3 may be applied to the pixel circuit PIX of the pixels through the horizontal mode lines 105. The horizontal mode selection signals Sx1, Px1, Sx2, Px2, Sx3, and Px3 may select the viewing angle of each pixel in an X-axis direction (or a first direction). The bridge signals BR1, BR2, and BR3 may control the viewing angle of the pixels between the window pixel region and the background pixel region shown in FIG. 3 differently by controlling the viewing angle between pixels arranged along the X-axis direction differently.

The vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3 may be input to pixels for each position of the display area AA so that viewing angle may be individually controlled for each pixel area existing in the display area AA. For example, first mode selection signal group Sy1, Py1, Sx1, Px1, and BR1 may be input to pixels in the first pixel area, and second mode selection signal group Sy2, Py2, Sx2, Px2, and BR2 may be input to pixels in the second pixel area. Third mode selection signal group Sy3, Py3, Sx3, Px3, and BR3 may be input to pixels in the third pixel area.

The display device may include a circuit board (PCB) electrically connected to the display panel 100 and a chip on film (COF). A source drive IC (DIC) on which the circuit of the data driver 110 is integrated may be mounted on the flexible film of the COF.

The circuit board PCB may include a timing controller 130, a level shifter 140, a power supply 150, etc. The circuit board PCB may be electrically connected to the COF.

The COF may be connected between the circuit board PCB and the display panel 100 to electrically connect the circuit board PCB to the display panel 100, and supply a data voltage output from the source drive IC (DIC) to data lines on the display panel 100.

The gate timing control signal and the mode selection signal output from the timing controller 130 may be provided to the level shifter 140. The level shifter 140 receives a signal received from the timing controller 130, a gate high voltage VGH, and a gate low voltage VGL. The level shifter 140 decodes a gate timing control signal to output a start pulse and a clock swinging between the gate high voltage VGH and the gate low voltage VGL. The start pulse and the clock are supplied to the gate driver 120. The gate driver 120 may output a pulse of the gate signal when the start pulse and the clock are input. The level shifter 140 decodes a mode selection signal to output vertical mode selection signals Sy1, Py1, Sy2, Py2, Sy3, and Py3, horizontal mode selection signals Sx1, Px1, Sx2, Px2, Sx3, and Px3, and bridge signals BR1, BR2, and BR3 swinging between the gate high voltage VGH and the gate low voltage VGL. The vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3 are supplied to the pixel circuit PIX of the pixels through the corresponding vertical mode lines 104 and horizontal mode lines 105. Each of the pixels may be individually driven in a viewing angle mode indicated by the vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3.

Figure 3:
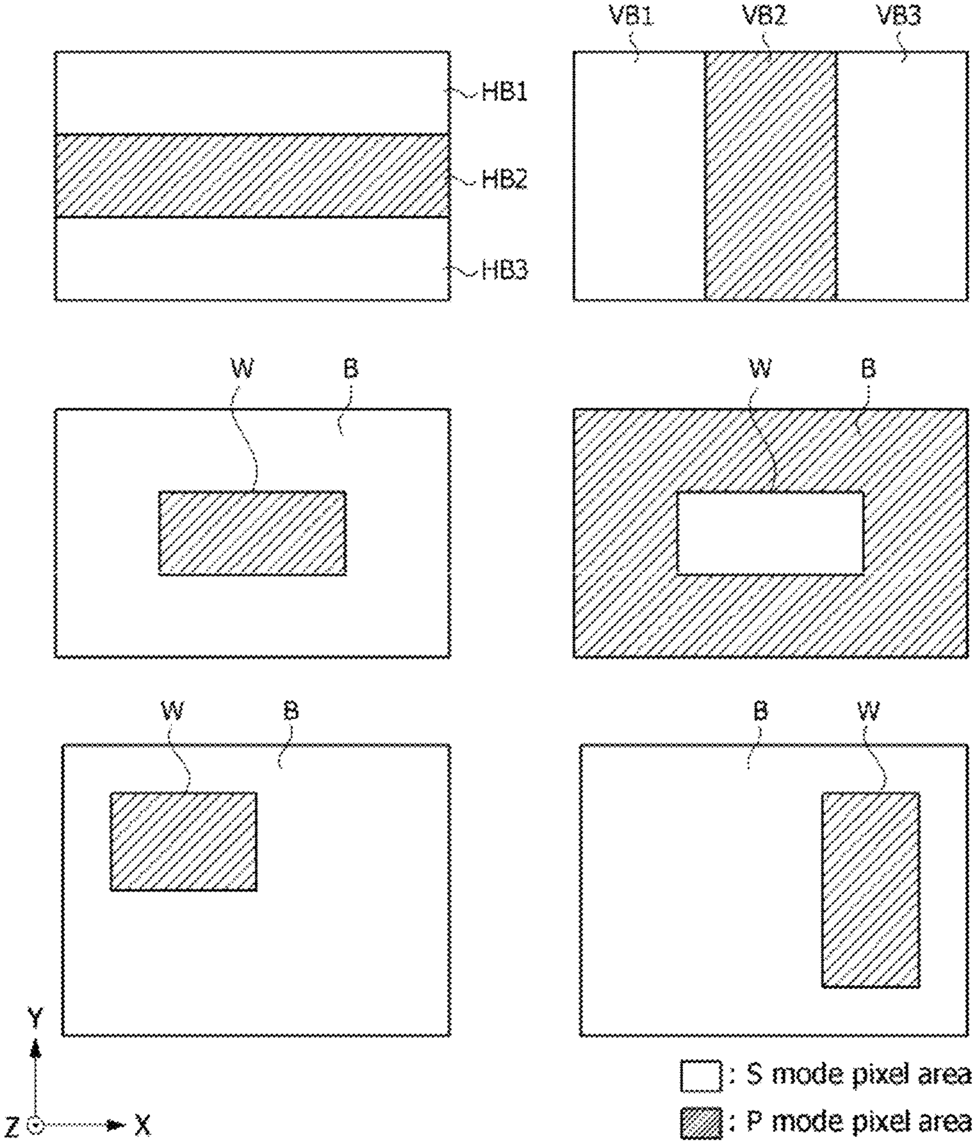
FIG. 3 is a diagram illustrating an example in which viewing angles of pixels are differently controlled for each pixel region.

FIG. 3 is a diagram illustrating an example in which a viewing angle of pixels is differently controlled for each pixel area. In FIG. 3, the non-hatched portion is a pixel area including pixels emitting light at a wide viewing angle in the first mode (S mode). The hatched portion is a pixel area including pixels emitting light at a wide viewing angle in the second mode (P mode). The viewing angle of the pixel areas may vary depending on the vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3.

Referring to FIG. 3, the display area AA may be divided into a plurality of pixel areas according to the viewing angle mode of the pixels. Each of the pixel areas may include two or more pixels.

The display area AA may be controlled by horizontal blocks HB1, HB2, and HB3 having different viewing angles. For example, the first and third horizontal blocks HB1 and HB3 may be pixel regions driven in the first mode, and the second horizontal block HB2 may be pixel regions driven in the second mode. Each of the horizontal blocks HB1, HB2, and HB3 may be driven in the first mode or the second mode by the vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3.

The display area AA may be controlled by vertical blocks VB1, VB2, and VB3 having different viewing angles. For example, the first and third vertical blocks VB1 and VB3 may be pixel regions driven in the first mode, and the second vertical block VB2 may be pixel regions driven in the second mode. Each of the vertical blocks VB1, VB2, and VB3 may be driven in the first mode or the second mode by the vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3.

The display area AA may be controlled by a background pixel area B and a window pixel area W surrounded by the background pixel area B, with different viewing angles each other. The window pixel area W may be interpreted as a pop-up window area. Each of the background pixel area B and the window pixel area W includes the pixels driven in the first mode or the second mode by the vertical mode selection signals Sy1, Py1, Sy2, Py2, Sy3, and Py3, the horizontal mode selection signals Sx1, Px1, Sx2, Px2, Sx3, and Px3, and the bridge signals BR1, BR2, and BR3. The size and position of each of the background pixel area B and the window pixel area W may be varied by vertical mode selection signals Sy1, Py1, Sy2, Py2, Sy3, and Py3, horizontal mode selection signals Sx1, Px1, Sx2, Px2, Sx3, and Px3, and bridge signals BR1, BR2, and BR3.

Figure 4:
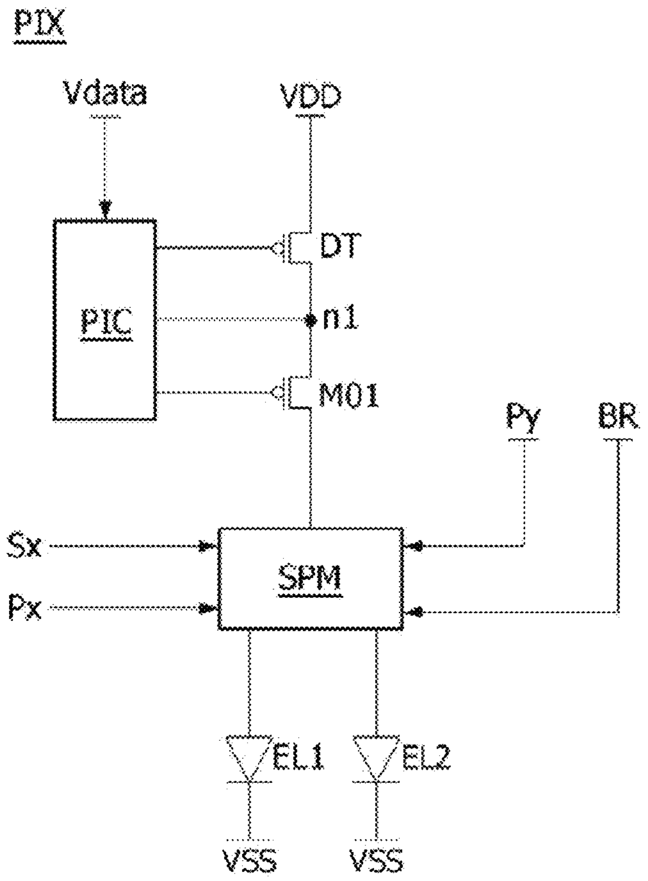
FIG. 4 is a circuit diagram schematically illustrating a pixel circuit according to one example embodiment of the present disclosure.

The vertical mode selection signals Sy1, Py1, Sy2, Py2, Sy3, and Py3 may include a first vertical mode selection signal Sy for activating the first mode and a second vertical mode selection signal Py for activating the second mode, but are not limited thereto. For example, as illustrated in FIG. 4, any one of the vertical mode selection signals Sy1, Py1, Sy2, Py2, Sy3, and Py3 may be omitted. The horizontal mode selection signals Sx1, Px1, Sx2, Px2, Sx3, and Px3 may include a first horizontal mode selection signal Sx for activating the first mode and a second horizontal mode selection signal Px for activating the second mode.

FIG. 4 is a circuit diagram schematically illustrating a pixel circuit according to one example embodiment of the present disclosure.

Referring to FIG. 4, the pixel circuit PIX includes a first light-emitting element EL1 that emits light in a first mode (S mode), a second light-emitting element EL2 that emits light in a second mode (P mode), a driving element DT that generates a current required for driving the light-emitting elements EL1 and EL2, and a mode selection circuit SPM that selects a current path between the driving element DT and the light-emitting elements EL1 and EL2 according to the selected viewing angle mode. The pixel circuit PIX may further include a pixel switch element M01 that switches a current path between the driving element DT and the mode selection circuit SPM.

Figure 6:
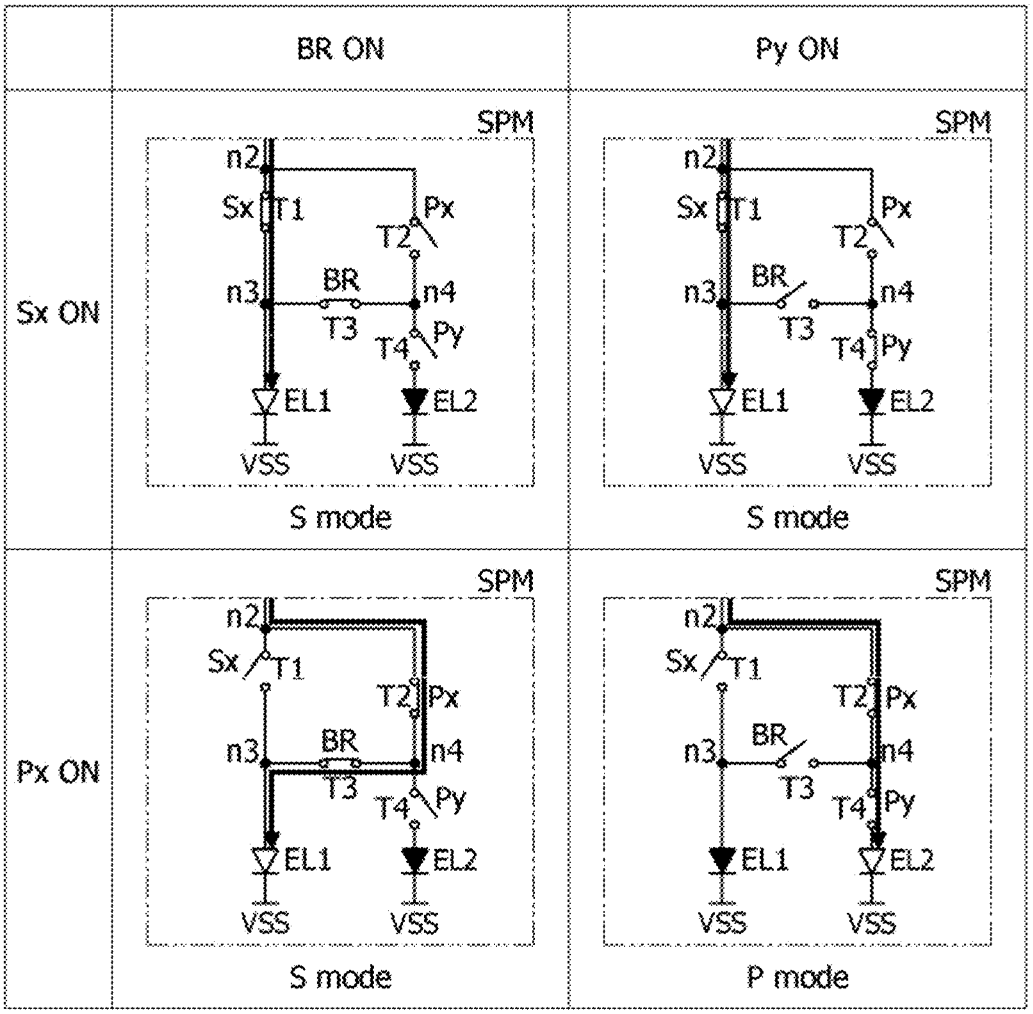
FIGS. 6 to 8 are diagrams showing examples of the configuration and operation of the mode selection circuit shown in FIG. 4.

The driving element DT may generate a current required for driving the first and second light-emitting elements EL1 and EL2 according to the gate-source voltage. The pixel switch element M01 may be connected to the driving element DT through a first node n1 and, as shown in FIG. 6, may be connected to the mode selection circuit SPM through a second node n2. The mode selection circuit SPM may include a plurality of switch elements T1, T2, T3, and T4, as shown in FIG. 6. In the pixel circuit PIX, each of the driving element DT, the pixel switch element M01, and the switch elements T1, T2, T3, and T4 of the mode selection circuit SPM may be implemented as transistors.

The pixel circuit PIX may be driven by an initialization stage, a data writing and threshold voltage sampling stage, and a light emission stage. To this end, the pixel circuit PIX may further include a compensation circuit PIC. The compensation circuit PIC may initialize the pixel circuit PIX in the initialization stage using two or more pixel switch elements and a capacitor, sample the threshold voltage of the driving element DT in the data writing and threshold voltage sampling stage, and apply the data voltage Vdata compensated by the threshold voltage to the gate electrode of the driving element DT. The compensation circuit PIC may turn on the pixel switch element M01 in the light emission stage to electrically connect the driving element DT and the mode selection circuit SPM.

The mode selection circuit SPM receives a vertical mode selection signal Py, a first horizontal mode selection signal Sx, a second horizontal mode selection signal Px, and a bridge signal BR and supplies current from the driving element DT to the light-emitting elements EL1 and EL2 driven in the light emission stage.

Figure 5:
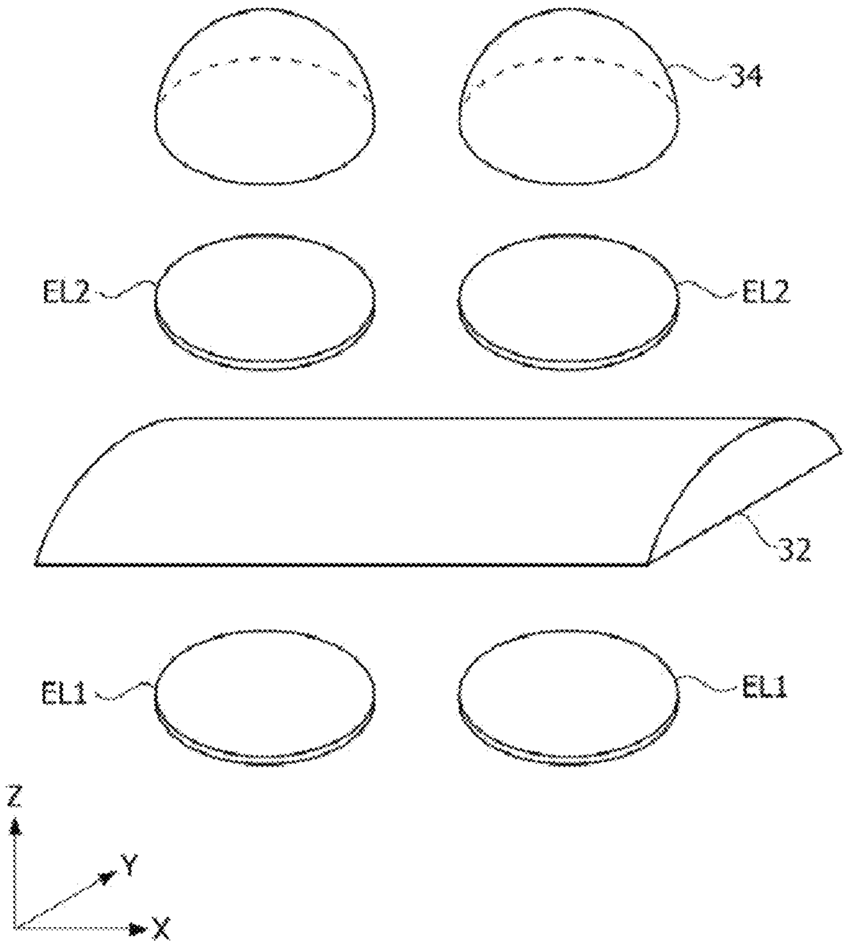
FIG. 5 is a diagram illustrating an example of lenses disposed on light-emitting elements.

FIG. 5 is a diagram illustrating an example of lenses disposed on light-emitting elements.

Referring to FIG. 5, a first lens 32 may be disposed on the first light-emitting element EL1. The first lens 32 may be implemented as a semi-cylindrical lens to limit the up-down viewing angle and widen the left-right viewing angle. The first lens 32 may be long along the X-axis direction parallel to the gate lines 103 of the display panel 100, and may have a narrow and convex center portion in the Y-axis direction parallel to the data lines 102. The first lens 32 diffuses the light of the first light-emitting element EL1 emitted in the first mode S mode at the left-right viewing angles.

The second lens 34 may be disposed on the second light-emitting element EL2. The second lens 34 may be a hemispherical lens having a convex center portion and becoming thinner toward an edge. The second lens 34 may condense the light of the second light-emitting element EL2 emitted in the second mode (P mode) to narrow the up-down viewing angle and the left-right viewing angle of the second light-emitting element EL2.

The first and second lenses 32 and 34 may be implemented as a transparent medium or a transparent insulating layer pattern disposed in the display panel 100, but are not limited thereto.

Figure 7:
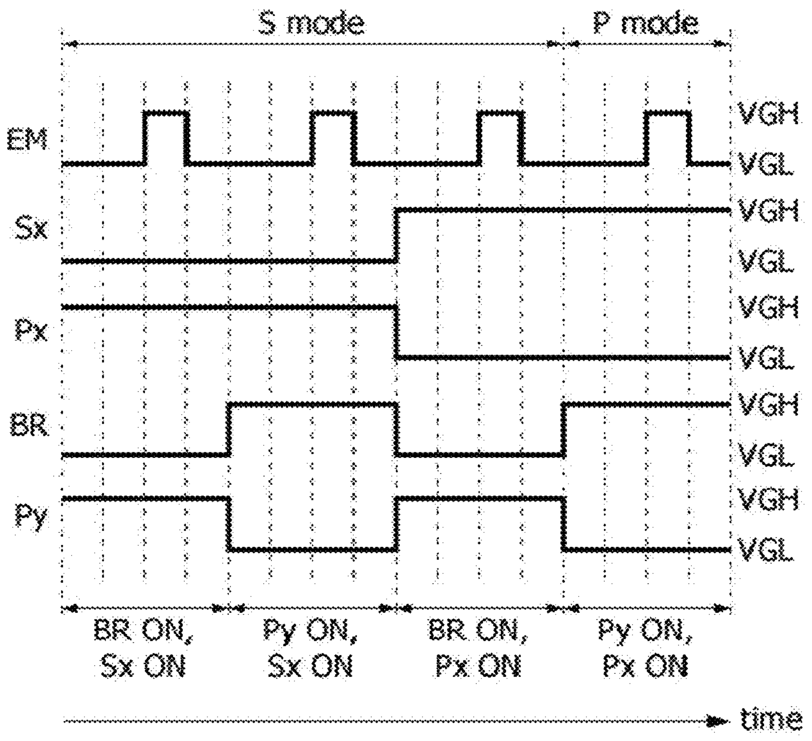

FIG. 6 is a circuit diagram showing an example of the configuration and operation of the mode selection circuit shown in FIG. 4. In FIG. 6, “S mode” is a state in which a pixel is driven in the first mode. “P mode” is a state in which a pixel is driven in the second mode. FIG. 7 is a waveform diagram showing an example of a mode selection signal inputted to the mode selection circuit shown in FIG. 6.

Referring to FIGS. 6 and 7, the mode selection circuit SPM includes a first switch element T1, a second switch element T2, a third switch element T3, and a fourth switch element T4. As an example, the switch elements T1, T2, T3, and T4 may be implemented as p-channel transistors. In this case, each of the switch elements T1, T2, T3, and T4 may be turned on in response to the gate low voltage VGL, while each of the switch elements T1, T2, T3, and T4 may be turned off in response to the gate high voltage VGH. In the example shown in FIGS. 6 to 11, the gate low voltage VGL is described as a gate-on voltage, and the gate high voltage VGH is described as a gate-off voltage. However, in alternative examples, the gate high voltage VGH may be used as the gate-on voltage, and the gate low voltage VGL may be used as the gate-off voltage.

The first switch element T1 may be connected between the second node n2 and the third node n3 to be turned on in response to the gate-on voltage VGL of the first horizontal mode selection signal Sx. The second node n2 is connected to the pixel switch element M01. The third node n3 is connected to the anode electrode of the first light-emitting element EL1. When the first switch element T1 is turned on, the second node n2 may be electrically connected to the anode electrode of the first light-emitting element EL1.

The second switch element T2 may be connected between the second node n2 and the fourth node n4 to be turned on in response to the gate-on voltage VGL of the second horizontal mode selection signal Px. When the second switch element T2 is turned on, the second node n2 may be electrically connected to the fourth node n4.

The third switch element T3 may be connected between the third node n3 and the fourth node n4 to be turned on in response to the gate-on voltage VGL of the bridge signal BR. When the third switch element T3 is turned on, the third node n3 may be electrically connected to the fourth node n4.

The fourth switch element T4 may be connected between the fourth node n4 and the anode electrode of the second light-emitting element EL2 to be turned on in response to the gate-on voltage VGL of the vertical mode selection signal Py. When the fourth switch element T4 is turned on, the fourth node n4 may be electrically connected to the anode electrode of the second light-emitting element EL2.

Referring to FIGS. 6 and 7, the first and third switch elements T1 and T3 may be turned on in response to a bridge signal BR and a first horizontal mode selection signal Sx, and the second and fourth switch elements T2 and T4 may be in an off state (BR ON & Sx ON). In this case, a current from the driving element DT may be supplied to the first light-emitting element EL1 through the first switch element T1. In this case, the pixel may be driven in the first mode (S mode), so that the first light-emitting element EL1 may emit light.

The first and fourth switch elements T1 and T4 may be turned on in response to a vertical mode selection signal Py and a first horizontal mode selection signal Sx, and the second and third switch elements T2 and T3 may be in an off state (Py ON & Sx ON). In this case, a current from the driving element DT may be supplied to the first light-emitting element EL1 through the first switch element T1. In this case, the pixel may be driven in the first mode S mode, so that the first light-emitting element EL1 may emit light.

The second and third switch elements T2 and T3 may be turned on in response to the bridge signal BR and the second horizontal mode selection signal Px, and the first and fourth switch elements T1 and T4 may be in an off state (BR ON & Px ON). In this case, a current from the driving element DT may be supplied to the first light-emitting element EL1 through the second and third switch elements T2 and T3. In this case, the pixel may be driven in the first mode (S mode), so that the first light-emitting element EL1 may emit light.

The second and fourth switch elements T2 and T4 may be turned on in response to a vertical mode selection signal Py and a second horizontal mode selection signal Px, and the first and third switch elements T1 and T3 may be in an off state (Py ON & Px ON). In this case, a current from the driving element DT may be supplied to the second light-emitting element EL2 through the second and fourth switch elements T2 and T4. In this case, the pixel may be driven in the second mode (P mode), so that the second light-emitting element EL2 may emit light.

Figure 8:
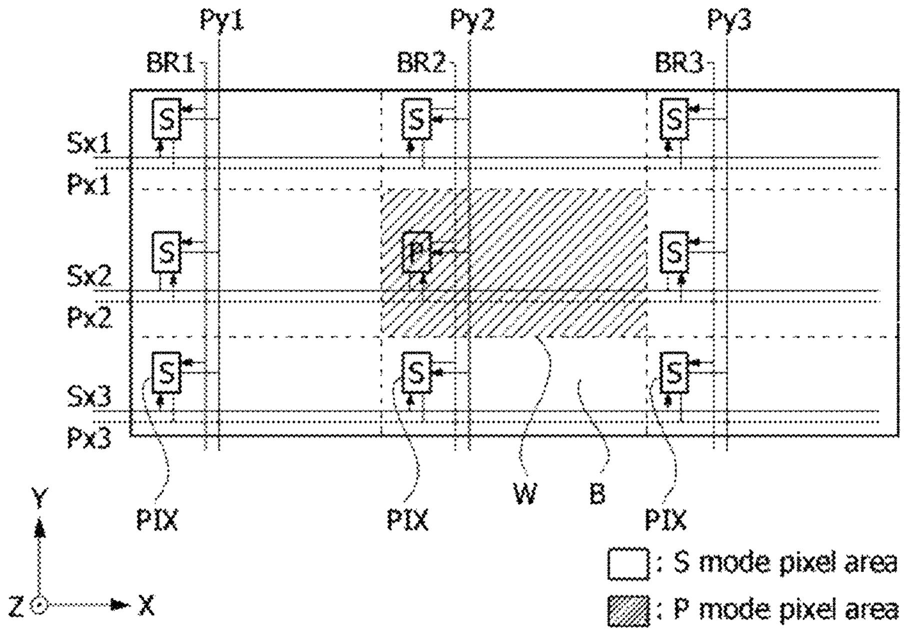

FIG. 8 is a diagram illustrating an example in which a window pixel region and a background pixel region are driven in different viewing angle modes by the control method of the mode selection circuit shown in FIGS. 6 and 7. In the example of FIG. 8, pixels of the background pixel region B may be driven in the first mode (S mode) to emit light at a narrow viewing angle, and pixels of the window pixel region W may be driven in the second mode (P mode) to emit light at a wide viewing angle.

Figure 9:
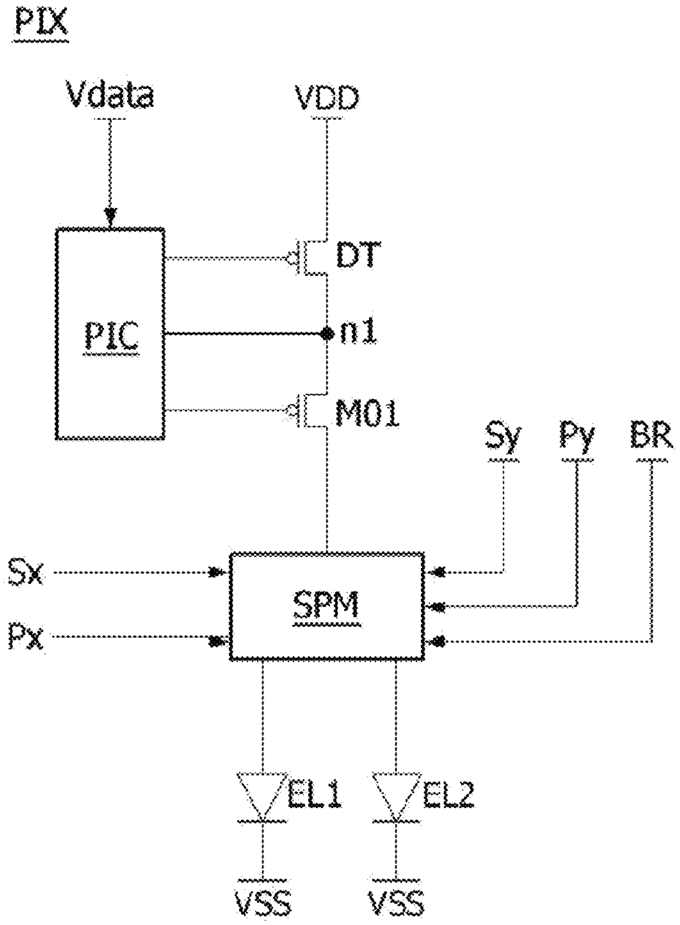
FIG. 9 is a circuit diagram schematically illustrating a pixel circuit according to another example embodiment of the present disclosure.

FIG. 9 is a circuit diagram schematically illustrating a pixel circuit according to another example embodiment of the present disclosure. In FIGS. 9 to 15, substantially the same components as those of the above-described embodiments are denoted by the same reference numerals, and a detailed description thereof is omitted.

Figure 10:
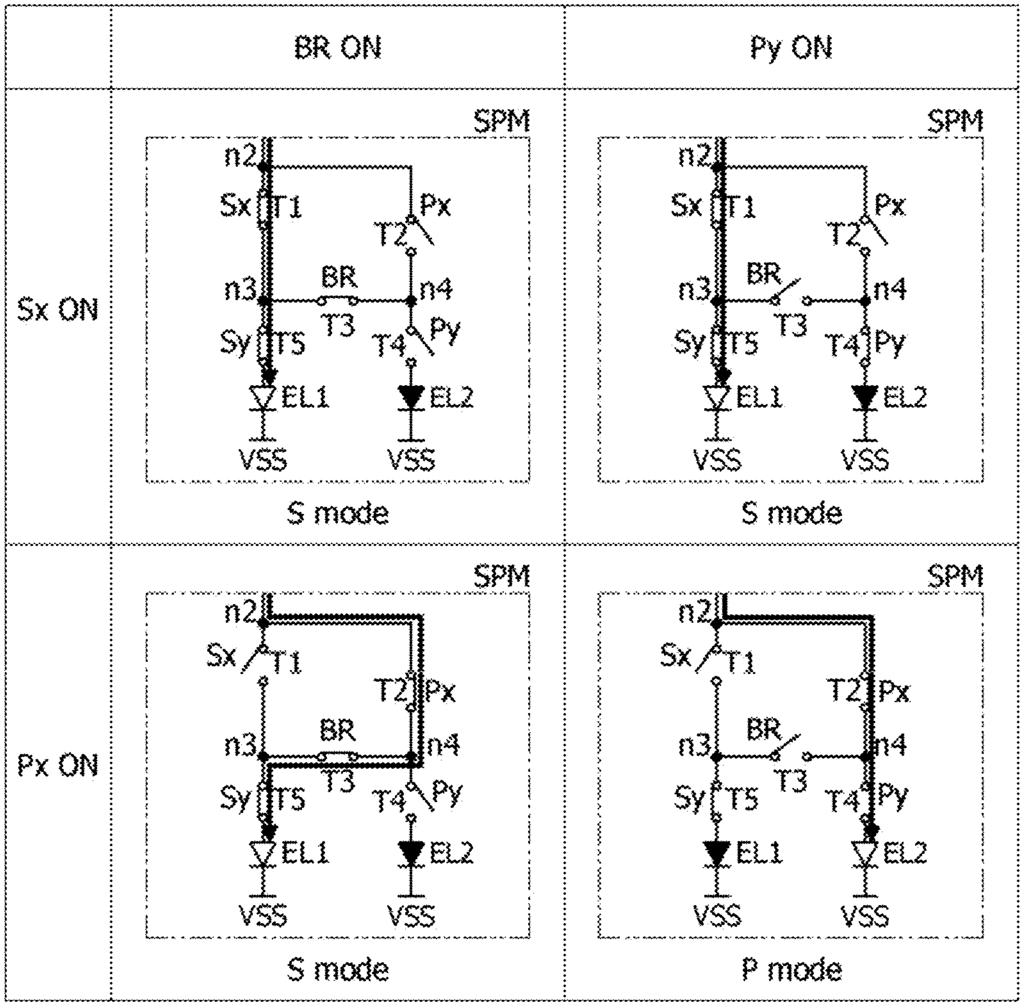
FIGS. 10 to 15 are diagrams showing examples of the configuration and operation of the mode selection circuit shown in FIG. 9.
Figure 11:
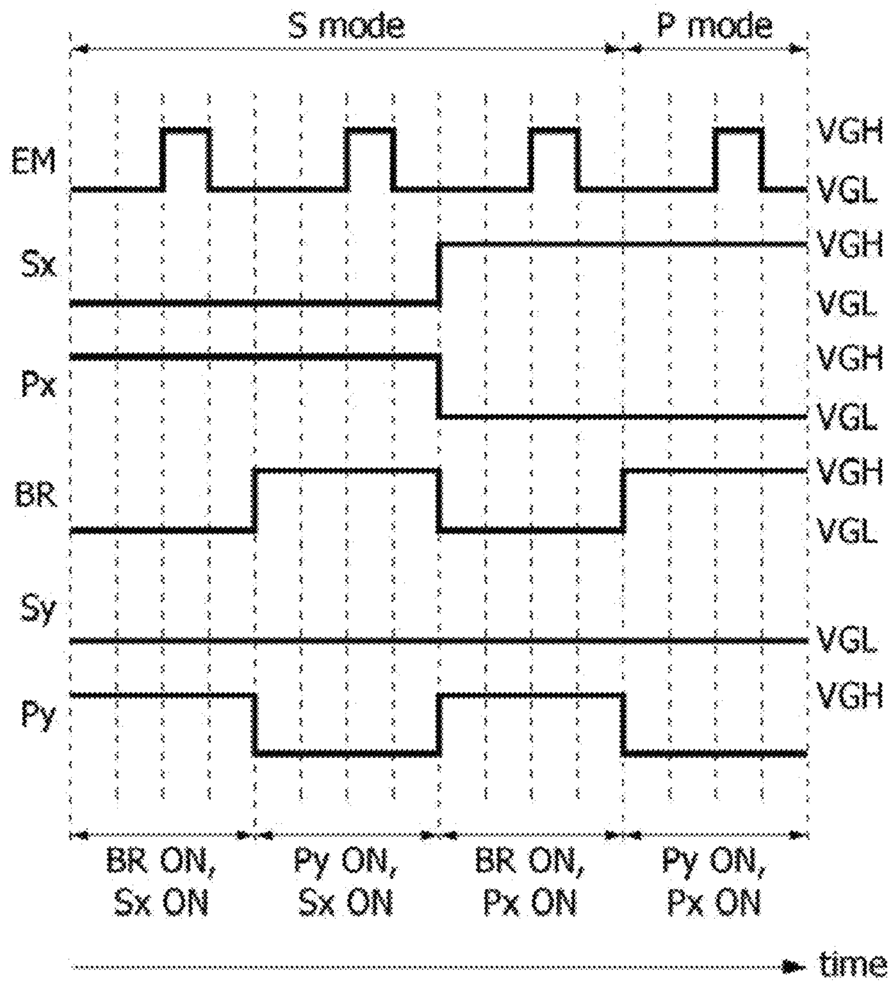

Referring to FIGS. 9 to 11, the mode selection circuit SPM includes a first switch element T1, a second switch element T2, a third switch element T3, a fourth switch element T4, and a fifth switch element T5. The switch elements T1, T2, T3, T4, and T5 may be implemented as p-channel transistors.

The first switch element T1 may be connected between the second node n2 and the third node n3 to be turned on in response to the gate-on voltage VGL of the first horizontal mode selection signal Sx. The second switch element T2 may be connected between the second node n2 and the fourth node n4 to be turned on in response to the gate-on voltage VGL of the second horizontal mode selection signal Px. The third switch element T3 may be connected between the third node n3 and the fourth node n4 to be turned on in response to the gate-on voltage VGL of the bridge signal BR. The fourth switch element T4 may be connected between the fourth node n4 and the anode electrode of the second light-emitting element EL2 to be turned on in response to the gate-on voltage VGL of the second vertical mode selection signal Py.

The fifth switch element T5 may be connected between the third node n3 and the anode electrode of the first light-emitting element EL1 and may be turned on in response to the gate-on voltage VGL of the first vertical mode selection signal Sy. When the fifth switch element T5 is turned on, the third node n3 may be electrically connected to the anode electrode of the first light-emitting element EL1.

When the first mode (S mode) is a basic setting, as shown in FIGS. 10 and 11, the fifth switch element T5 may be in an ON state at all times.

Referring to FIGS. 10 and 11, the first and third switch elements T1 and T3 may be turned on in response to a bridge signal BR and a first horizontal mode selection signal Sx, and the second and fourth switch elements T2 and T4 may be in an off state (BR ON & Sx ON). In this case, the fifth switch element T5 may be in an on state. In this case, the pixel may be driven in the first mode (S mode).

The first and fourth switch elements T1 and T4 may be turned on in response to the second vertical mode selection signal Py and the first horizontal mode selection signal Sx, and the second and third switch elements T2 and T3 may be in an off state (Py ON & Sx ON). In this case, the fifth switch element T5 may be in an on state. In this case, the pixel may be driven in the first mode (S mode).

The second and third switch elements T2 and T3 may be turned on in response to the bridge signal BR and the second horizontal mode selection signal Px, and the first and fourth switch elements T1 and T4 may be in an off state (BR ON & Px ON). In this case, the fifth switch element T5 may be in an on state. In this case, the pixel may be driven in the first mode (S mode).

Figure 12:
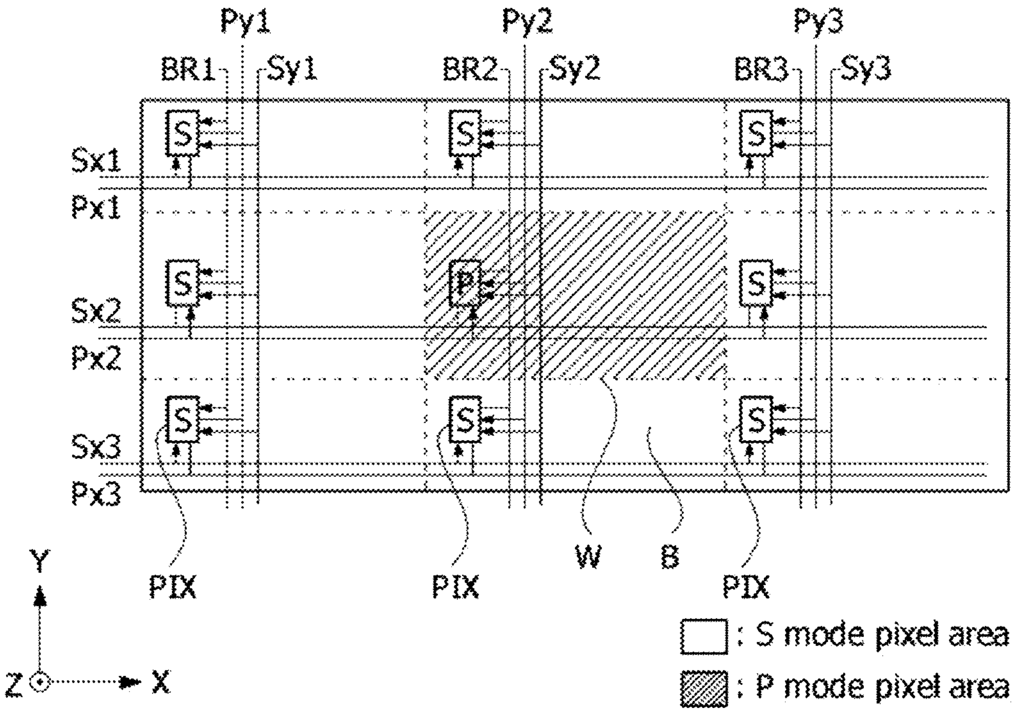

The second and fourth switch elements T2 and T4 may be turned on in response to the second vertical mode selection signal Py and the second horizontal mode selection signal Px, and the first and third switch elements T1 and T3 may be in an off state (Py ON & Px ON). In this case, the fifth switch element T5 may be in an on state. In this case, the pixel may be driven in the second mode (P mode), and as illustrated in FIG. 12, the pixel in the window pixel region W may be driven in the second mode (P mode).

Figure 13:
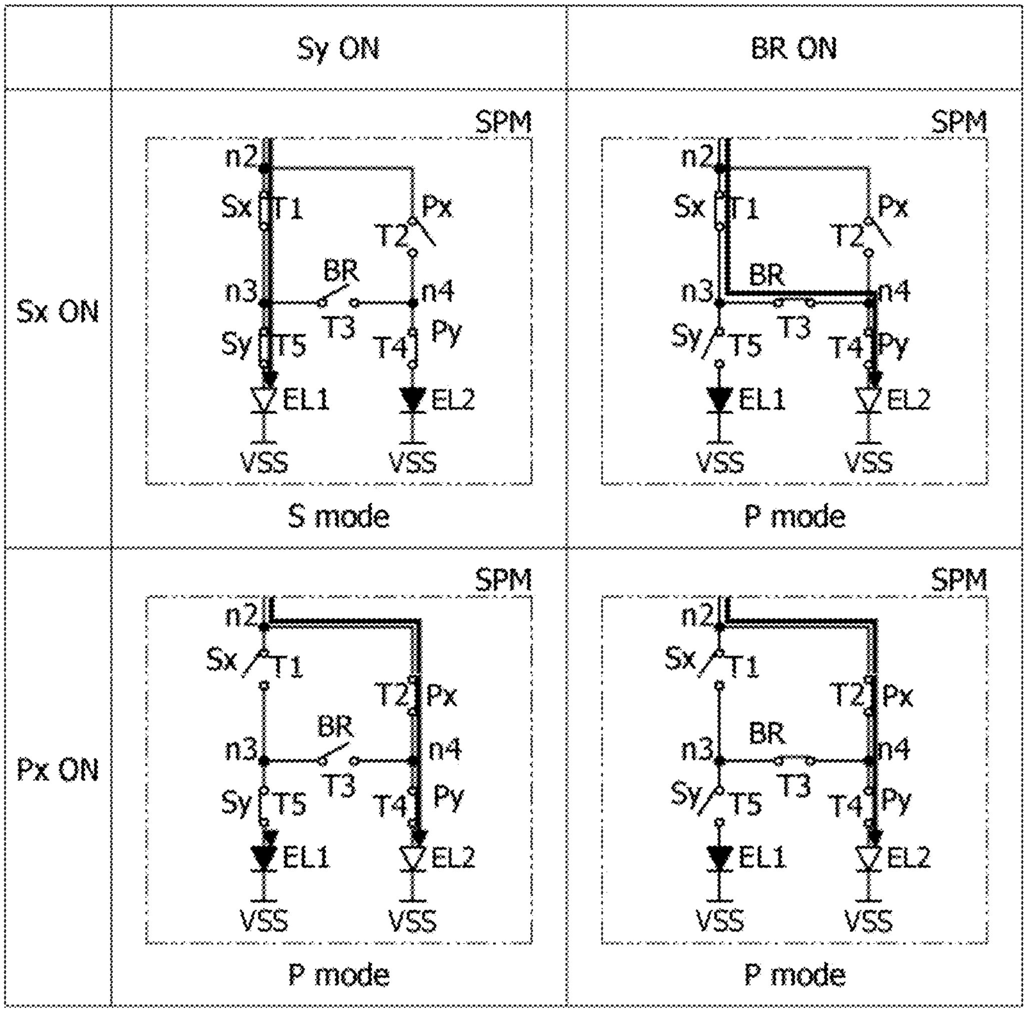
Figure 14:
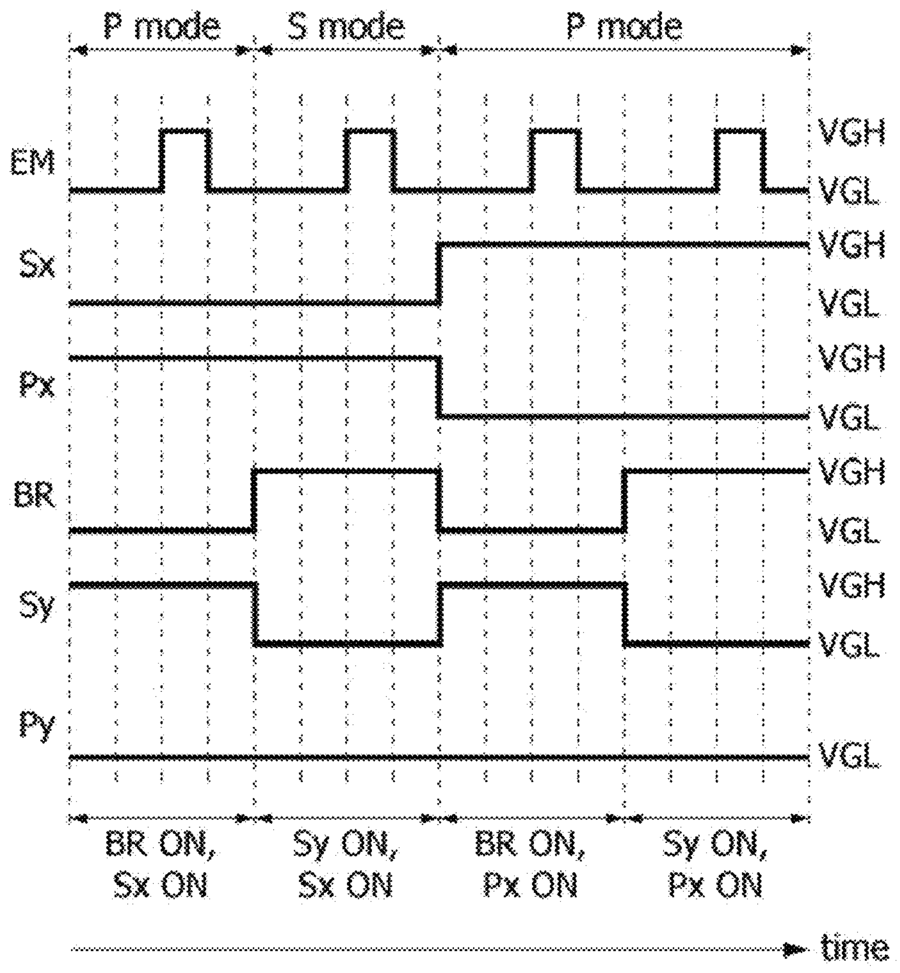
Figure 15:
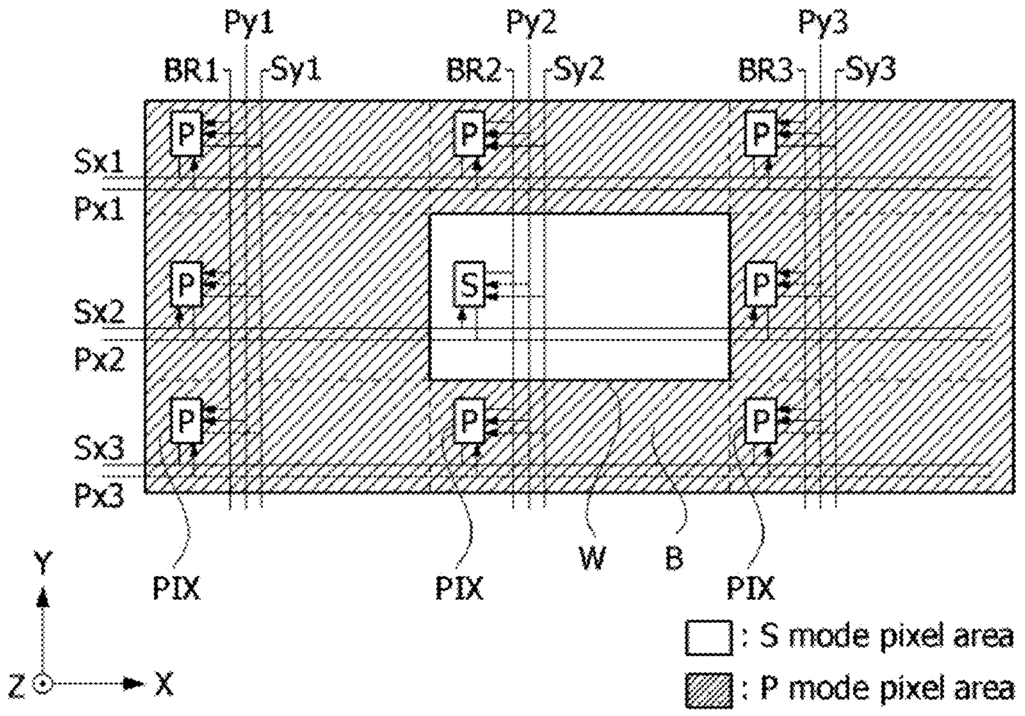

When the second mode (P mode) is the basic setting, as shown in FIGS. 13 and 14, the fourth switch element T4 may be in an ON state at all times.

Referring to FIGS. 13 and 14, the first and fifth switch elements T1 and T5 may be turned on in response to a first vertical mode selection signal Sy and a first horizontal mode selection signal Sx, and the second and third switch elements T2 and T3 may be in an off state (Sy ON & Sx ON). In this case, the fourth switch element T4 may be in an on state. In this case, the pixel may be driven in the first mode (S mode) like the window pixel area W shown in FIG. 15.

The first and third switch elements T1 and T3 may be turned on in response to a bridge signal BR and a first horizontal mode selection signal Sx, and the second and fifth switch elements T2 and T5 may be in an off state (BR ON & Sx ON). In this case, the fourth switch element T4 may be in an on state. In this case, the pixel may be driven in the second mode (P mode) like a background pixel area B illustrated in FIG. 15.

The second and fifth switch elements T2 and T5 may be turned on in response to the first vertical mode selection signal Sy and the second horizontal mode selection signal Px, and the first and third switch elements T1 and T3 may be turned off (Sy ON & Px ON). In this case, the fourth switch element T4 may be in the on state. In this case, the pixel may be driven in the second mode (P mode) like a background pixel area B illustrated in FIG. 15.

The second and third switch elements T2 and T3 may be turned on in response to a bridge signal BR and the second horizontal mode selection signal Px, and the first and fifth switch elements T1 and T5 may be in an off state (BR ON & Px ON). In this case, the fourth switch element T4 may be in an on state. In this case, the pixel may be driven in the second mode (P mode) like a background pixel area B illustrated in FIG. 15.

Figure 16:
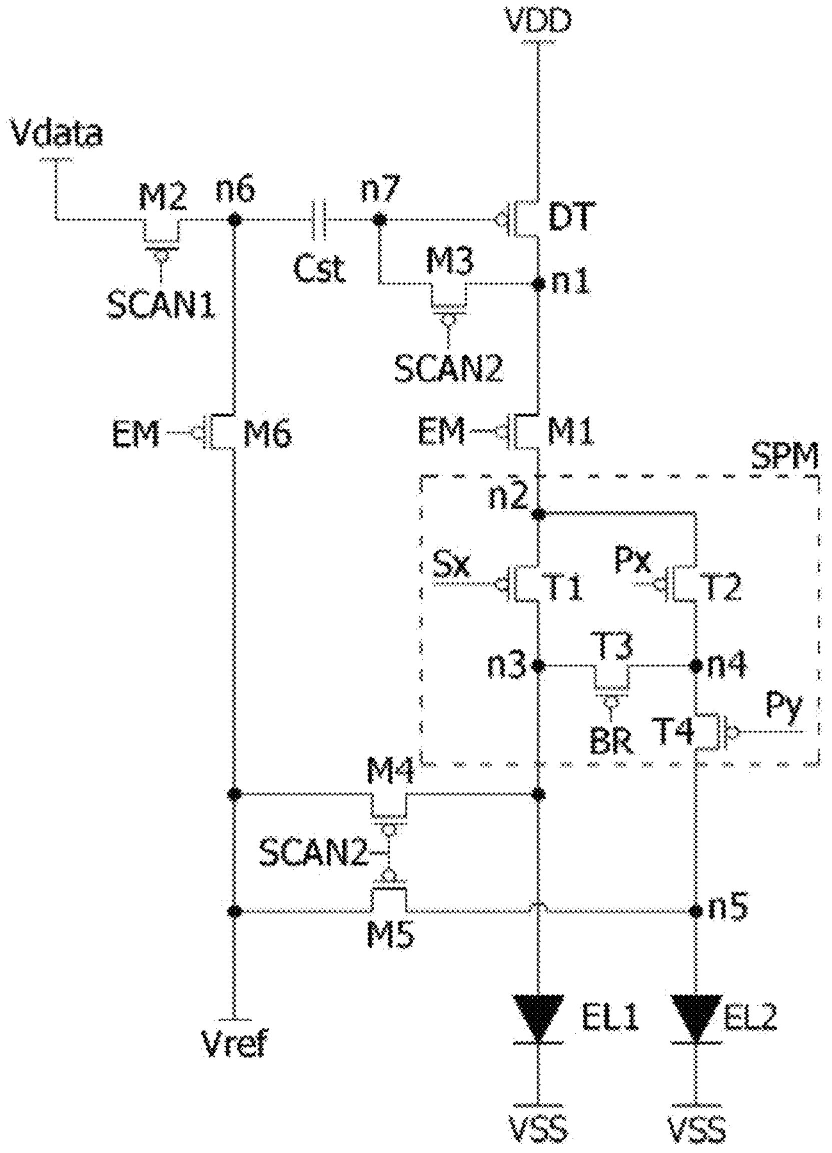
FIG. 16 is a circuit diagram showing an example of a pixel circuit to which the mode selection circuit shown in FIGS. 4 and 6 is applied.
Figure 17:
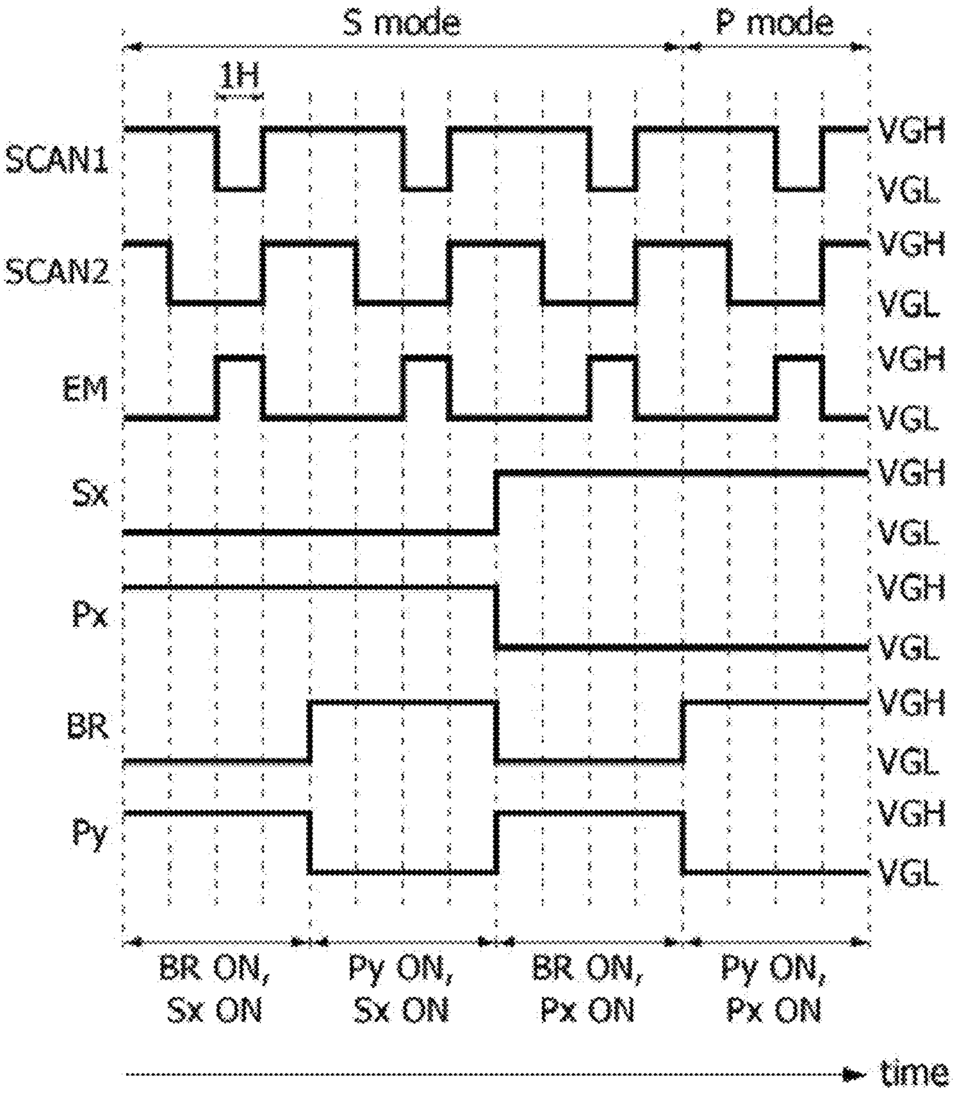
FIG. 17 is a waveform diagram illustrating an example of a gate signal and a mode selection signal input to the pixel circuit shown in FIG. 16.

FIG. 16 is a circuit diagram illustrating an example of a pixel circuit to which the mode selection circuit shown in FIGS. 4 and 6 is applied. FIG. 17 is a waveform diagram illustrating an example of a gate signal and a mode selection signal input to the pixel circuit shown in FIG. 16. In FIGS. 16 and 17, detailed descriptions of components that are substantially the same as those of the above-described embodiments will be omitted.

Referring to FIGS. 16 and 17, the pixel circuit includes a first light-emitting element EL1, a second light-emitting element EL2, a driving element DT, a capacitor Cst, a plurality of pixel switch elements M1 to M6, and a mode selection circuit SPM. The driving element DT, the pixel switch elements M1 to M6, and the switch elements T1, T2, T3, and T4 of the mode selection circuit SPM may be implemented as p-channel transistors, but are not limited thereto.

The pixel circuit is connected to the pixel driving (VDD) node to which the pixel driving voltage VDD is applied, the VSS node to which the cathode voltage VSS is applied, and the reference (REF) node to which the reference voltage Vref is applied. The VDD node, the VSS node, and the REF node may be connected to a corresponding power line to be commonly connected to all pixels. The pixel circuit may be connected to a data line to which a data voltage Vdata is applied and gate lines to which gate signals SCAN1, SCAN2, and EM are applied. The mode selection circuit SPM may be connected to the vertical and horizontal mode lines to which the mode selection signals Sy, Py, Sx, and Px and the bridge signal BR are applied.

The pixel driving voltage VDD may be set to a voltage that is higher than the maximum voltage of the data voltage Vdata and allows the driving element DT to operate in a saturation region. The pixel driving voltage VDD is a voltage higher than the cathode voltage VSS. The reference voltage Vref may be set to a voltage lower than a minimum voltage of the data voltage Vdata and higher than or equal to the cathode voltage VSS. For example, the reference voltage Vref may be set to a voltage higher by 1 to 2 V than the cathode voltage VSS, but is not limited thereto. The gate-off voltage VGH may be set to a voltage higher than the pixel driving voltage VDD, and the gate-on voltage VGL may be set to a voltage lower than the cathode voltage VSS. For example, it may be VDD=15[V], VSS=3[V], Vref=3[V], VGH=16[V], and VGL=−9[V], but is not limited thereto. The data voltage Vdata of the pixel data may have a dynamic range between 2V and 7V. The higher the grayscale value of the pixel data, the lower the voltage level of the data voltage Vdata may be selected. The higher the grayscale value of the pixel data, the higher the luminance of the light-emitting elements EL1 and EL2 may be.

The first light-emitting element EL1 includes an anode electrode connected to the third node n3 and a cathode electrode to which a cathode voltage VSS is applied. The second light-emitting element EL2 includes an anode electrode connected to the fifth node n5 and a cathode electrode to which a cathode voltage VSS is applied. The first light-emitting element EL1 may be driven by the current from the driving element DT and emit light in the first mode (S mode). The second light-emitting element EL2 may be driven by the current from the driving element DT and emit light in the second mode (P mode).

The driving element DT includes a first electrode to which the pixel driving voltage VDD is applied, a second electrode connected to the first node n1, and a gate electrode connected to the seventh node n7. The driving element DT generates a current required for driving the first and second light-emitting elements EL1 and EL2 according to a gate-source voltage that varies according to the data voltage Vdata. The capacitor Cst is connected between the sixth node n6 and the seventh node n7.

The first pixel switch element M1 is connected between the first node n1 and the second node n2 and is turned on in response to the gate-on voltage VGL of the EM signal EM. When the first pixel switch element M1 is turned on, the first node n1 may be electrically connected to the second node n2. The first pixel switch element M1 includes a first electrode connected to the first node n1, a gate electrode to which the EM signal EM is applied, and a second electrode connected to the second node n2.

The second pixel switch element M2 is connected between the data line to which the data voltage Vdata of the pixel data is applied and the sixth node n6 to be turned on in response to the gate-on voltage VGL of the first scan signal SCAN1. When the second pixel switch element M2 is turned on, the data voltage Vdata may be applied to the sixth node n6. The second pixel switch element M2 includes a first electrode to which the data voltage Vdata is applied, a gate electrode to which the first scan signal SCAN1 is applied, and a second electrode connected to the sixth node n6.

The third pixel switch element M3 is connected between the first node n1 and the seventh node n7 and is turned on in response to the gate-on voltage VGL of the second scan signal SCAN2. When the third pixel switch element M3 is turned on, the first node n1 may be electrically connected to the seventh node n7. The third pixel switch element M3 includes a first electrode connected to the first node n1, a gate electrode to which the second scan signal SCAN2 is applied, and a second electrode connected to the seventh node n7.

The fourth pixel switch element M4 is connected between the REF node to which the reference voltage Vref is applied and the third node n3 to be turned on in response to the gate-on voltage VGL of the second scan signal SCAN2. When the fourth pixel switch element M4 is turned on, the reference voltage Vref may be applied to the third node n3. The fourth pixel switch element M4 includes a first electrode connected to the REF node, a gate electrode to which the second scan signal SCAN2 is applied, and a second electrode connected to the third node n3.

The fifth pixel switch element M5 is connected between the REF node to which the reference voltage Vref is applied and the fifth node n5 and is turned on in response to the gate-on voltage VGL of the second scan signal SCAN2. When the fifth pixel switch element M5 is turned on, the reference voltage Vref may be applied to the fifth node n5. The fifth pixel switch element M5 includes a first electrode connected to the REF node, a gate electrode to which the second scan signal SCAN2 is applied, and a second electrode connected to the fifth node n5.

The sixth pixel switch element M6 is connected between the REF node to which the reference voltage Vref is applied and the sixth node n6 to be turned on in response to the gate-on voltage VGL of the EM signal EM. When the sixth pixel switch element M6 is turned on, the reference voltage Vref may be applied to the sixth node n6. The sixth pixel switch element M6 includes a first electrode connected to the REF node, a gate electrode to which the EM signal EM is applied, and a second electrode connected to the sixth node n6.

The mode selection circuit SPM is substantially the same as the circuit shown in FIG. 6.

When the first switch element T1 is turned on, the second node n2 may be electrically connected to the anode electrode of the first light-emitting element EL1. The first switch element T1 includes a first electrode connected to the second node n2, a gate electrode to which the first horizontal mode selection signal Sx is applied, and a second electrode connected to the third node n3. When the second switch element T2 is turned on, the second node n2 may be electrically connected to the fourth node n4. The second switch element T2 includes a first electrode connected to the second node n2, a gate electrode to which the second horizontal mode selection signal Px is applied, and a second electrode connected to the fourth node n4.

When the third switch element T3 is turned on, the third node n3 may be electrically connected to the fourth node n4. The third switch element T3 includes a first electrode connected to the third node n3, a gate electrode to which the bridge signal BR is applied, and a second electrode connected to the fourth node n4. When the fourth switch element T4 is turned on, the fourth node n4 may be electrically connected to the anode electrode of the second light-emitting element EL2. The fourth switch element T4 includes a first electrode connected to the fourth node n4, a gate electrode to which the vertical mode selection signal Py is applied, and a second electrode connected to the fifth node n5.

Figure 18:
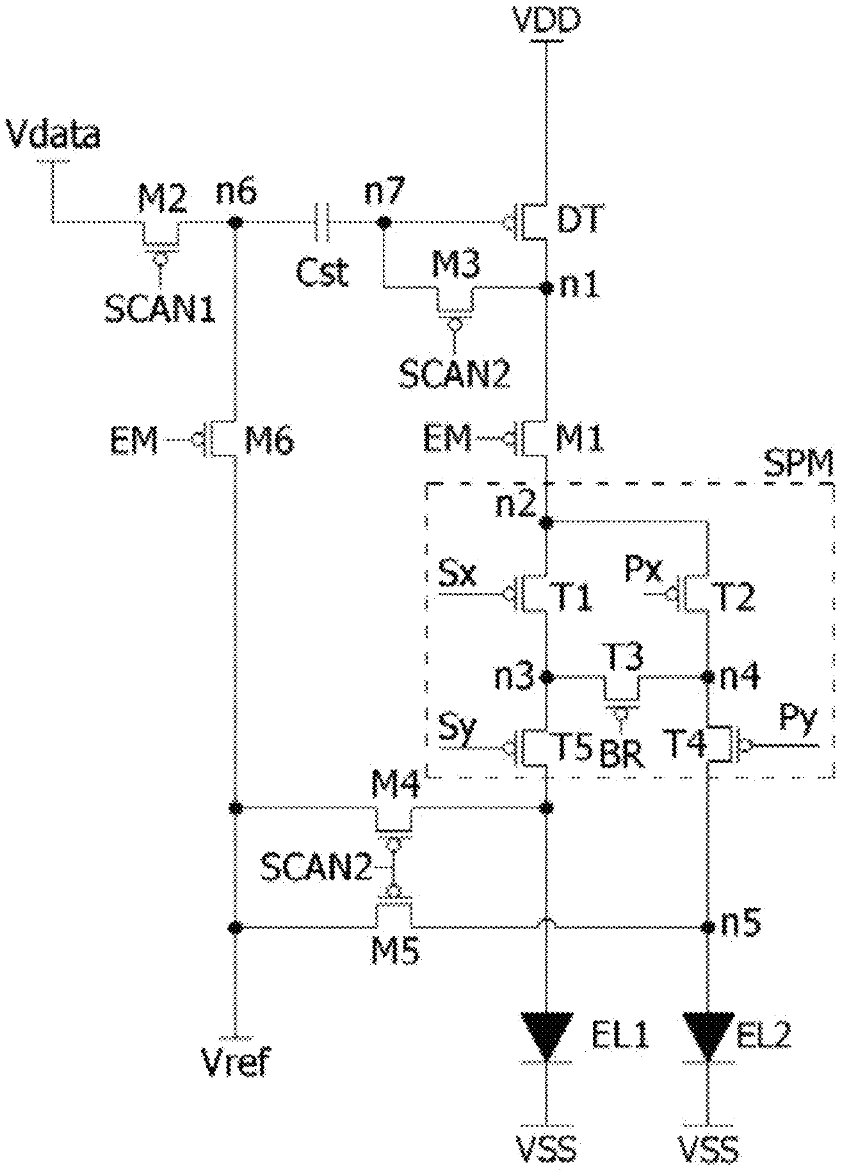
FIG. 18 is a circuit diagram showing an example of a pixel circuit to which the mode selection circuit shown in FIG. 9 is applied.
Figure 19A:
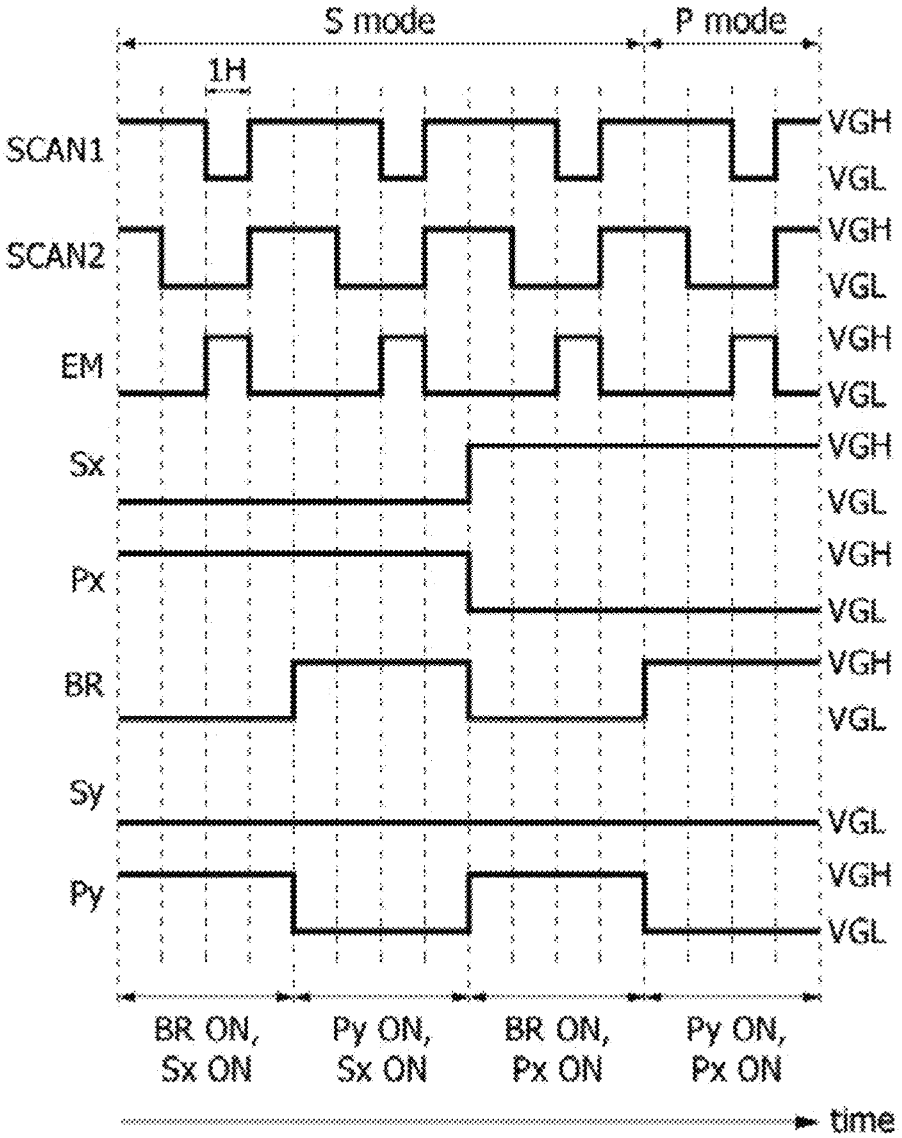
FIGS. 19A and 19B are waveform diagrams illustrating an example of a gate signal and a mode selection signal input to the pixel circuit shown in FIG. 18.
Figure 19B:
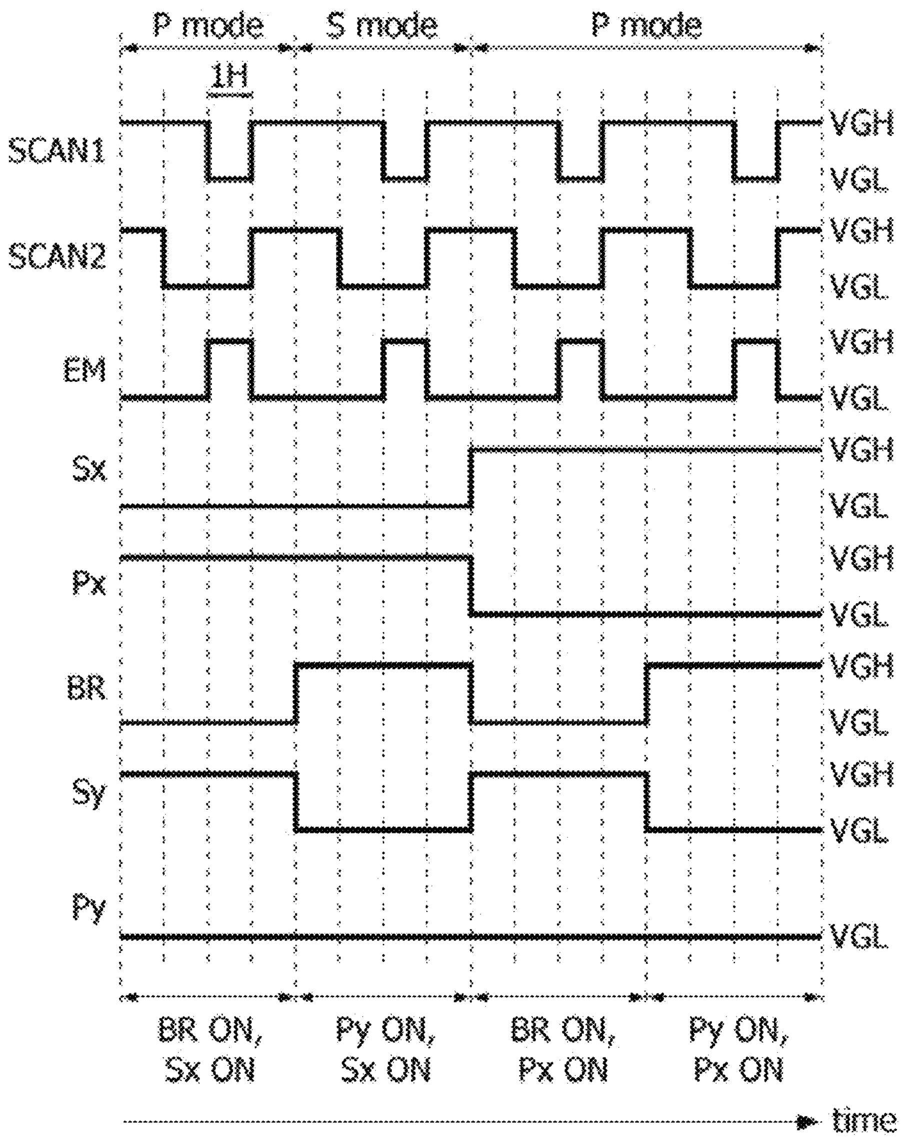

FIG. 18 is a circuit diagram illustrating an example of a pixel circuit to which the mode selection circuit shown in FIG. 9 is applied. FIGS. 19A and 19B are waveform diagrams illustrating an example of a gate signal and a mode selection signal input to the pixel circuit shown in FIG. 18. Referring to FIGS. 18 to 19B, detailed descriptions of components that are substantially the same as those of the above-described embodiments will be omitted.

Referring to FIG. 18, a mode selection circuit SPM of the pixel circuit PIX is substantially the same as the circuit shown in FIG. 10.

The mode selection circuit SPM of the pixel circuit further includes a fifth switch element T5. When the fifth switch element T5 is turned on, the third node n3 may be electrically connected to the anode electrode of the first light-emitting element EL1. The fifth switch element T5 includes a first electrode connected to the third node n3, a gate electrode to which the first vertical mode selection signal Sy is applied, and a second electrode connected to the anode electrode of the first light-emitting element EL1.

When the first mode (S mode) is a basic setting, the first vertical mode selection signal Sy may be set to the gate-on voltage VGL, as illustrated in FIG. 19A. In this case, the fifth switch element T5 may be in an always-on state.

When the second mode (P mode) is the basic setting, the second vertical mode selection signal Py may be set to the gate-on voltage VGL, as illustrated in FIG. 19*b*. In this case, the fourth switch element T4 may be in the always-on state.

The pixel circuit PIX may be driven by an initialization stage, a data writing and a threshold voltage sampling stage, and a light emission stage. Hereinafter, the operation of the pixel circuit PIX will be described in detail.

FIGS. 20A to 22B are examples of diagrams illustrating an initialization stage, a data writing and threshold voltage sampling stage, and a light emission stage of the pixel circuit shown in FIG. 16. The initialization stage, the data writing and threshold voltage sampling stage, and the light emission stage of the pixel circuit are substantially the same as those of the pixel circuit shown in FIG. 18. For example, the gate signals SCAN1, SCAN2, and EM may be identically applied to the pixel circuits shown in FIGS. 16 and 18. Time when the initialization stage, the data writing and threshold voltage sampling stage, and the light emission stage are performed may be controlled by waveforms of the gate signals SCAN1, SCAN2, and EM. In this pixel circuit, the switch elements T1 to T4 of the mode selection circuit SPM are controlled by the mode selection signals Py, Sx, and Px and the bridge signal BR shown in FIGS. 7 and 17. The operation of the mode selection circuit SPM is substantially the same as the embodiment shown in FIGS. 6 to 18 described above, and thus a description thereof will be omitted.

Figure 20A:
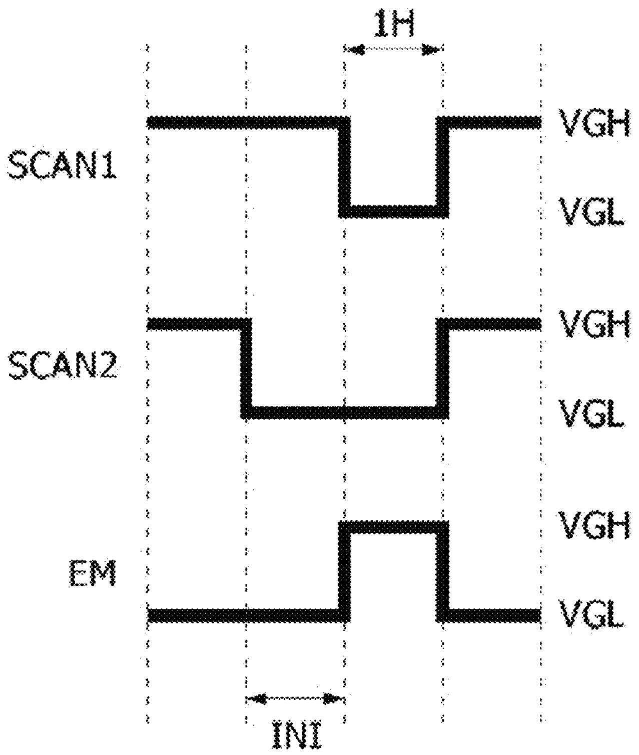
FIGS. 20A to 20B are examples of diagrams illustrating an initialization stage, a data writing and threshold voltage sampling stage, and a light emission stage of the pixel circuit shown in FIG. 16.
Figure 20B:
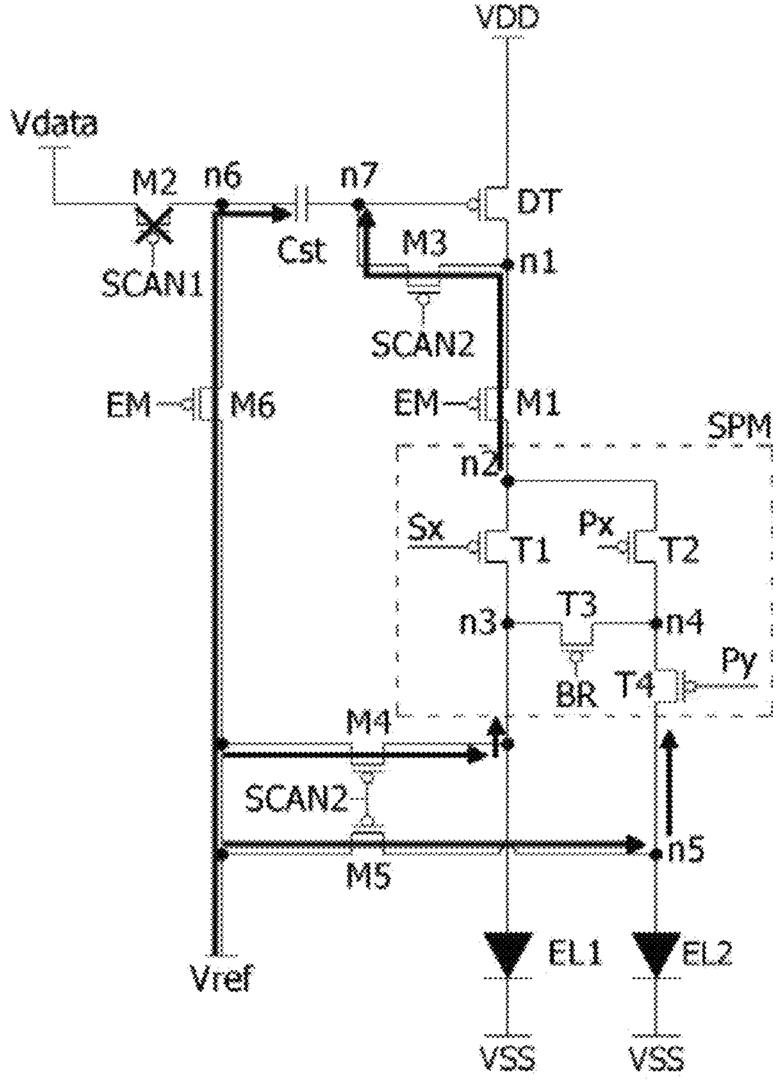

FIGS. 20A and 20B are a waveform and a circuit diagram, respectively, illustrating an initialization stage of the pixel circuit shown in FIG. 16. The initialization stage may be performed during a first period INI.

Referring to FIGS. 20A and 20B, a voltage of the first scan signal SCAN1 during the first period INI is the gate-off voltage VGH, and voltages of the second scan signal SCAN2 and EM signal EM are the gate-on voltage VGL. The third pixel switch element M3, the fourth pixel switch element M4, the fifth pixel switch element M5, and the sixth pixel switch element M6 are turned on during the first period INI. The second pixel switch element M2 is turned off during the first period INI. The driving element DT is turned on during the first period INI.

During the first period INI, as shown in FIG. 17, it may be the gate-on voltage VGL of the first horizontal mode selection signal Sx. Accordingly, the reference voltage Vref may be applied to the second node n2 through the first switch element T1 during the first period INI.

During the first period INI, the capacitor Cst and the light-emitting elements EL1 and EL2 are initialized to the reference voltage Vref. The light-emitting elements EL1 and EL2 are turned off during the first period INI.

Figure 21A:
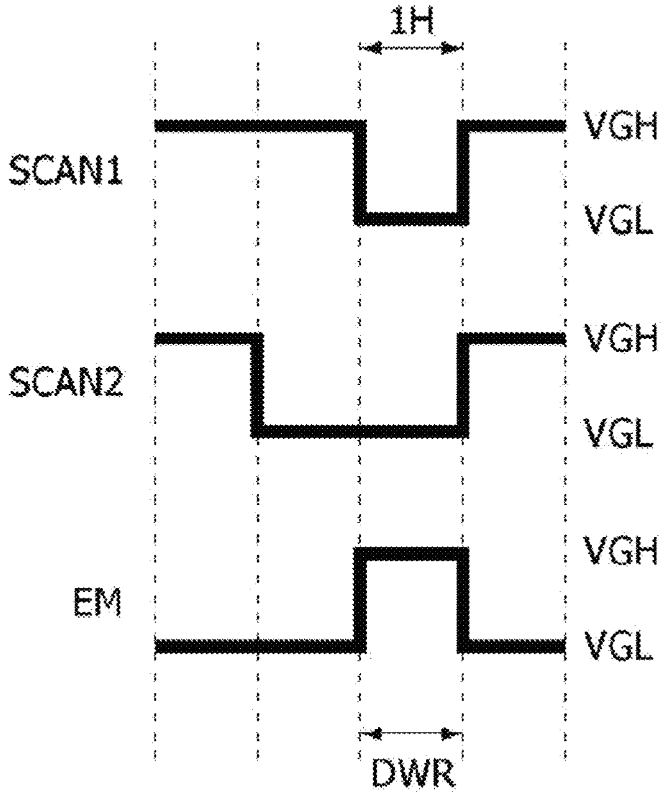
FIGS. 21A to 21B are other example diagrams illustrating an initialization stage, a data writing and threshold voltage sampling stage, and a light emission stage of the pixel circuit shown in FIG. 16.
Figure 21B:
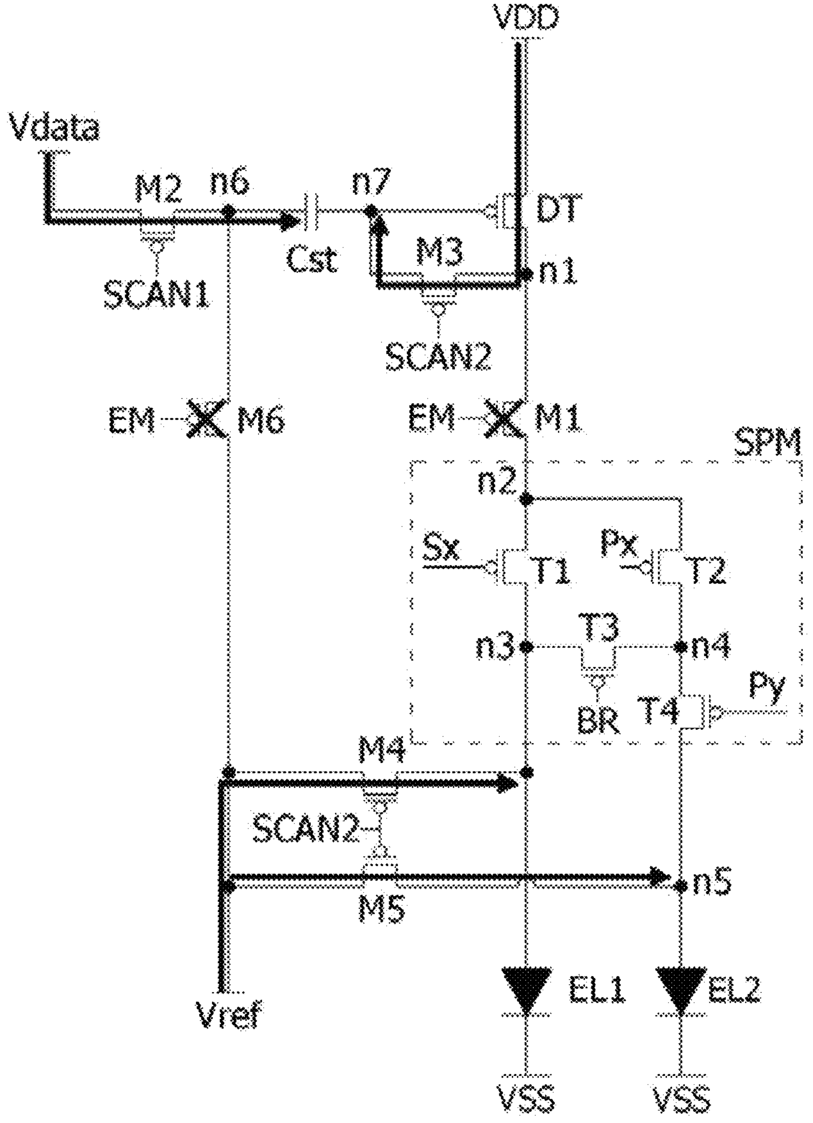

FIGS. 21A and 21B are an example waveform and an example circuit diagram, respectively, illustrating data writing and threshold voltage sampling stages of the pixel circuit shown in FIG. 16. Data writing and threshold voltage sampling stages are performed during a second period DWR.

Referring to FIGS. 21A and 21B, voltages of the first scan signal SCAN1 and the second scan signal SCAN2 during the second period DWR are the gate-on voltage VGL, and voltages of the EM signal EM are the gate-off voltage VGH. During the second period DWR, the second pixel switch element M2, the third pixel switch element M3, the fourth pixel switch element M4, and the fifth pixel switch element M5 are turned on, and the sixth pixel switch element M6 are turned off. At the second period DWR, the data voltage Vdata of the pixel data is applied to the sixth node n6. At the end of the second period DWR, the voltage of the sixth node n6 is the data voltage Vdata, and the voltage of the seventh node n7 is VDD+Vth. Here, Vth is a threshold voltage of the driving element DT. During the second period DWR, the light-emitting elements EL1 and EL2 are in the off state.

Figure 22A:
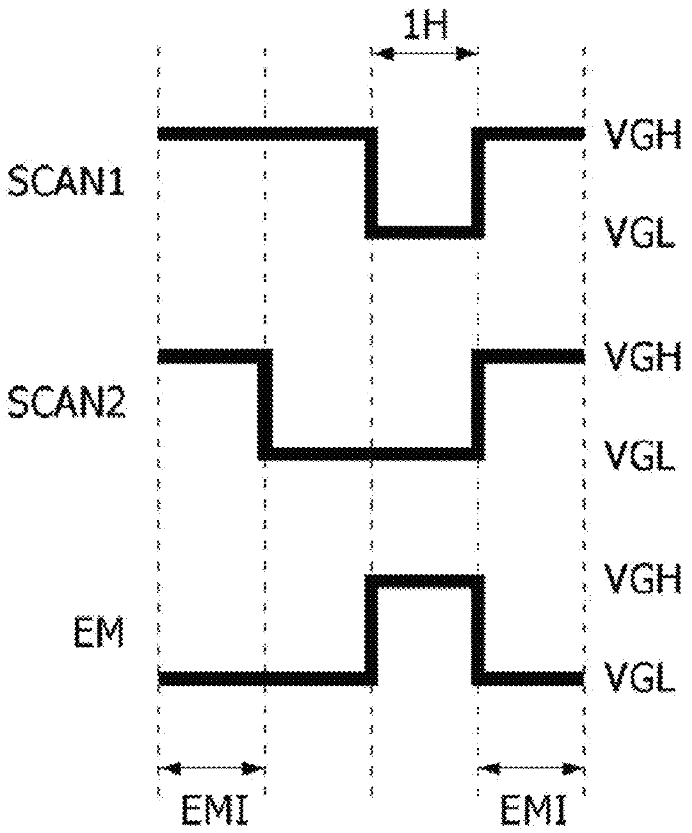
FIGS. 22A to 22B are other example diagrams illustrating an initialization stage, a data writing and threshold voltage sampling stage, and a light emission stage of the pixel circuit shown in FIG. 16.
Figure 22B:
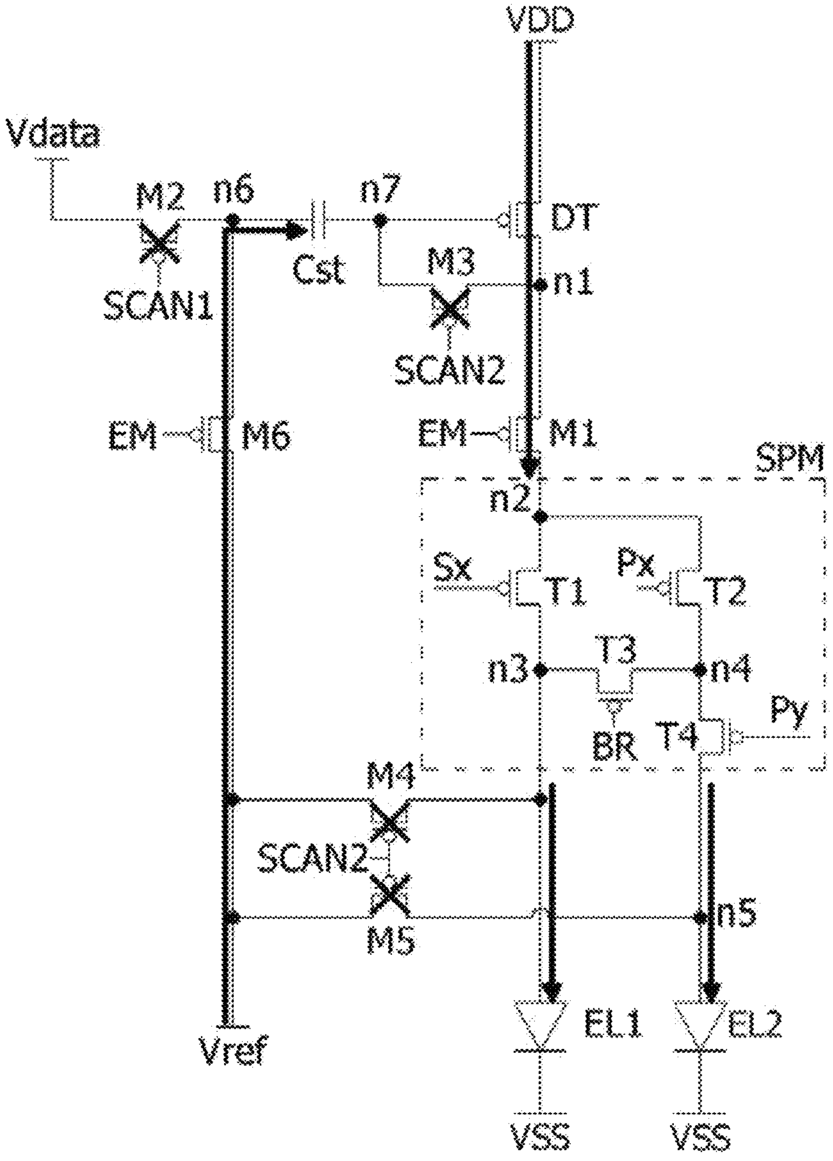

FIGS. 22A and 22B are an example waveform and an example circuit diagram, respectively, illustrating a light emission stage of the pixel circuit shown in FIG. 16. The light emission stage is performed during the third period EMI.

Referring to FIGS. 22A and 22B, voltages of the first scan signal SCAN1 and the second scan signal SCAN2 during the third period EMI are a gate-off voltage VGH, and voltage of the EM signal EM is a gate-on voltage VGL. The sixth pixel switch element M6 is turned on during the third period EMI, while the second pixel switch element M2, the third pixel switch element M3, the fourth pixel switch element M4, and the fifth pixel switch element M5 are turned off. When the third period EMI in the first mode (S mode) ends, the voltage of the sixth node n6 is the reference voltage Vref, and the voltage of the seventh node n7 is Vref−Vdata+VDD+Vth.

During the third period EMI, a current generated according to the gate-source voltage of the driving element DT is supplied to the first light-emitting element EL1 or the second light-emitting element EL2 through the mode selection circuit SPM. Accordingly, one of the first light-emitting element EL1 and the second light-emitting element EL2 may be emitted and turned on and the other one may be in an off state during the third period EMI according to the on/off states of the switch elements T1, T2, T3, and T4 shown in FIGS. 6, 7, and 17.

Figure 23:
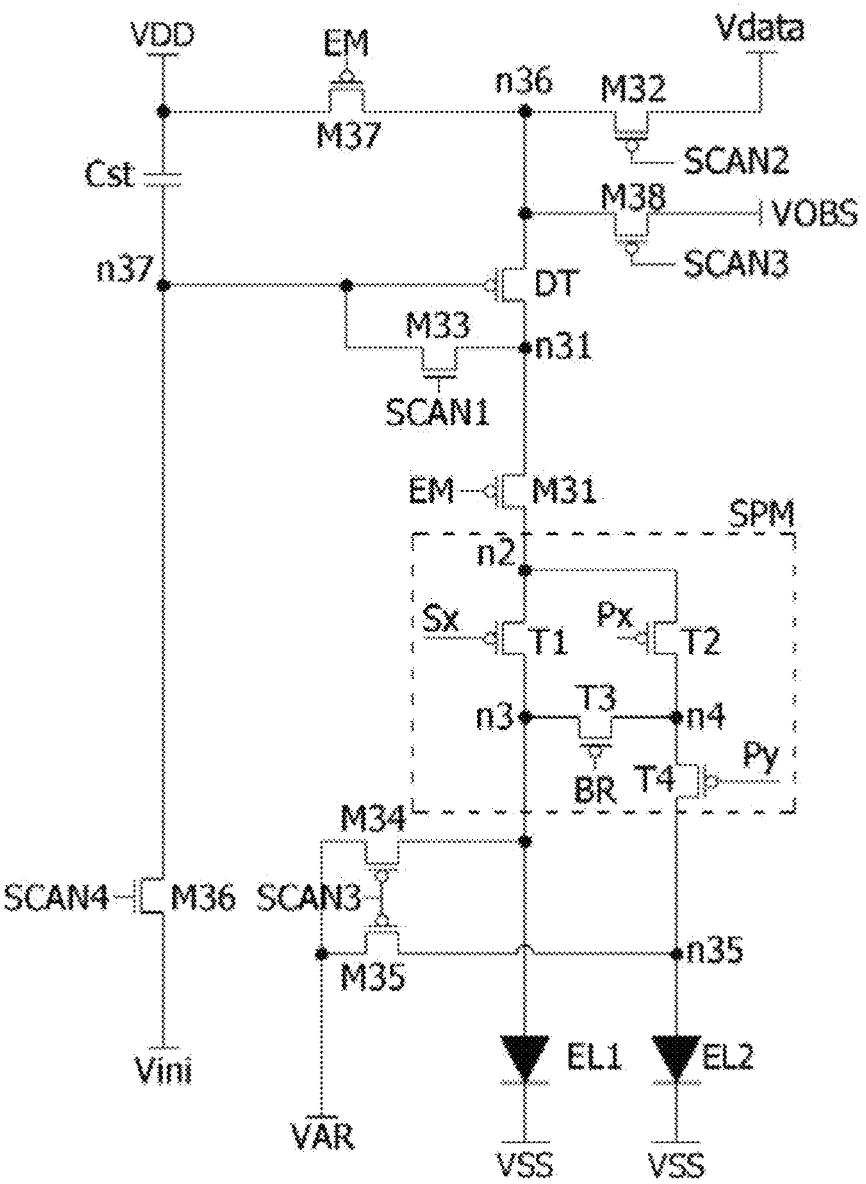
FIG. 23 is a circuit diagram illustrating another example of a pixel circuit to which the mode selection circuit shown in FIGS. 4 and 6 is applied.

FIG. 23 is a circuit diagram illustrating another example of a pixel circuit to which the mode selection circuit shown in FIGS. 4 and 6 is applied. The pixel circuit according to the present embodiment may be driven at a variable refresh rate (VRR) under the control of the timing controller 130. The timing controller 130 may reduce power consumption of the display device by analyzing the input image and lowering the refresh rate when the input image does not change by a predetermined time. The timing controller 130 may decrease the refresh rate of the pixel when the display device is operated in a standby mode or in response to a user command. In an always on display (AOD) screen, the refresh rate may be lowered. The AOD screen is a partial pixel area of the display area AA in which preset information, for example, brief information such as remaining battery capacity, time, and the like are displayed in the standby mode. In FIG. 23, the detailed description of substantially the same components as those of the above-described embodiments will be omitted.

Referring to FIG. 23, the pixel circuit includes a first light-emitting element EL1, a second light-emitting element EL2, a driving element DT, a capacitor Cst, a plurality of pixel switch elements M31 to M38, and a plurality of switch elements T1, T2, T3, and T4. The driving element DT, the pixel switch elements M31, M32, M34, M35, M37, and M38 and the switch elements T1, T2, T3, and T4 may be implemented as p-channel transistors. The third and sixth pixel switch elements M33 and M36 may be implemented as n-channel transistors. The p-channel transistor may be turned on in response to the gate low voltage VGL, and may be turned off in response to the gate high voltage VGH. The n-channel transistor may be turned on in response to the gate high voltage VGH, and may be turned off in response to the gate low voltage VGL.

The pixel circuit may be connected to the VDD node to which the pixel driving voltage VDD is applied, the VSS node to which the cathode voltage VSS is applied, the REF node to which the reference voltage Vref is applied, the initialization (INI) node to which the initialization voltage Vini is applied, the first compensation (OBS) node to which the first compensation voltage VOBS is applied, and the second compensation (AR) node to which the second compensation voltage VAR is applied. The VDD node, the VSS node, the REF node, the INI node, the OBS node, and the AR node may be connected to a corresponding power line to be commonly connected to all pixels. The pixel circuit may be connected to a data line to which a data voltage Vdata is applied, and gate lines to which gate signals SCAN1, SCAN2, SCAN3, SCAN4, and EM are applied. The mode selection circuit SPM may be connected to vertical and horizontal mode lines to which the mode selection signals Sy, Py, Sx, and Px and the bridge signal BR are applied. The mode selection circuit SPM is substantially the same as the circuit shown in FIG. 6.

The first light-emitting element EL1 includes an anode electrode connected to the third node n3, and a cathode electrode to which a cathode voltage VSS is applied. The second light-emitting element EL2 includes an anode electrode connected to the fifth node n35, and a cathode electrode to which a cathode voltage VSS is applied. The first light-emitting element EL1 may be driven by the current from the driving element DT to emit light in the first mode (S mode). The second light-emitting element EL2 may be driven by the current from the driving element DT to emit light in the second mode (P mode).

The driving element DT includes a first electrode connected to the sixth node n36, a second electrode connected to the first node n31, and a gate electrode connected to the seventh node n37. The driving element DT generates a current required for driving the first and second light-emitting elements EL1 and EL2 according to a gate-source voltage that varies according to the data voltage Vdata. The capacitor Cst is connected between the VDD node and the seventh node n37.

The first pixel switch element M31 is connected between the first node n31 and the second node n2 and is turned on in response to the gate low voltage VGL of the EM signal EM. When the first pixel switch element M31 is turned on, the first node n31 may be electrically connected to the second node n2. The first pixel switch element M31 includes a first electrode connected to the first node n31, a gate electrode to which the EM signal EM is applied, and a second electrode connected to the second node n2.

The second pixel switch element M32 is connected between the data line to which the data voltage Vdata of the pixel data is applied and the sixth node n36 to be turned on in response to the gate low voltage VGL of the second scan signal SCAN2. When the second pixel switch element M32 is turned on, the data voltage Vdata may be applied to the sixth node n36. The second pixel switch element M32 includes a first electrode to which a data voltage Vdata is applied, a gate electrode to which a second scan signal SCAN2 is applied, and a second electrode connected to the sixth node n36.

The third pixel switch element M33 is connected between the first node n31 and the seventh node n37 and is turned on in response to the gate high voltage VGH of the first scan signal SCAN1. When the third pixel switch element M33 is turned on, the first node n31 may be electrically connected to the seventh node n37. The third pixel switch element M33 includes a first electrode connected to the first node n31, a gate electrode to which the first scan signal SCAN1 is applied, and a second electrode connected to the seventh node n37.

The fourth pixel switch element M34 is connected between the AR node to which the second compensation voltage VAR is applied and the third node n3 to be turned on in response to the gate low voltage VGL of the third scan signal SCAN3. When the fourth pixel switch element M34 is turned on, the second compensation voltage VAR may be applied to the third node n3. The fourth pixel switch element M34 includes a first electrode connected to an AR node to which the second compensation voltage VAR is applied, a gate electrode to which the third scan signal SCAN3 is applied, and a second electrode connected to the third node n3.

The fifth pixel switch element M35 is connected between the AR node to which the second compensation voltage VAR is applied and the fifth node n35 to be turned on in response to the gate low voltage VGL of the third scan signal SCAN3. When the fifth pixel switch element M35 is turned on, the second compensation voltage VAR may be applied to the fifth node n35. The fifth pixel switch element M35 includes a first electrode to which the second compensation voltage VAR is applied, a gate electrode to which the third scan signal SCAN3 is applied, and a second electrode connected to the fifth node n35.

The sixth pixel switch element M36 is connected between the INI node to which the initialization voltage Vini is applied and the seventh node n37 to be turned on in response to the gate high voltage VGH of the fourth scan signal SCAN4. When the sixth pixel switch element M36 is turned on, the initialization voltage Vini may be applied to the seventh node n37. The sixth pixel switch element M36 includes a first electrode to which the initialization voltage Vini is applied, a gate electrode to which the fourth scan signal SCAN4 is applied, and a second electrode connected to the seventh node n37.

The seventh pixel switch element M37 is connected between the VDD node to which the pixel driving voltage VDD is applied and the sixth node n36 and is turned on in response to the gate low voltage VGL of the EM signal EM. When the seventh pixel switch element M37 is turned on, the pixel driving voltage VDD may be applied to the sixth node n36. The seventh pixel switch element M37 includes a first electrode connected to a VDD node to which the pixel driving voltage VDD applied, a gate electrode to which the EM signal EM is applied, and a second electrode connected to the sixth node n36.

The eighth pixel switch element M38 is connected between the OBS node to which the first compensation voltage VOBS is applied and the sixth node n36 to be turned on in response to the gate low voltage VGL of the third scan signal SCAN3. When the eighth pixel switch element M38 is turned on, the first compensation voltage VOBS may be applied to the sixth node n36. The eighth pixel switch element M38 includes a first electrode to which the first compensation voltage VOBS is applied, a gate electrode to which the third scan signal SCAN3 is applied, and a second electrode connected to the sixth node n36.

FIGS. 24A to 28B are example diagrams illustrating a first reset stage, an initialization stage, a data writing and threshold voltage sampling stage, a second reset stage, and a light emission stage of the pixel circuit shown in FIG. 23.

Figure 24A:
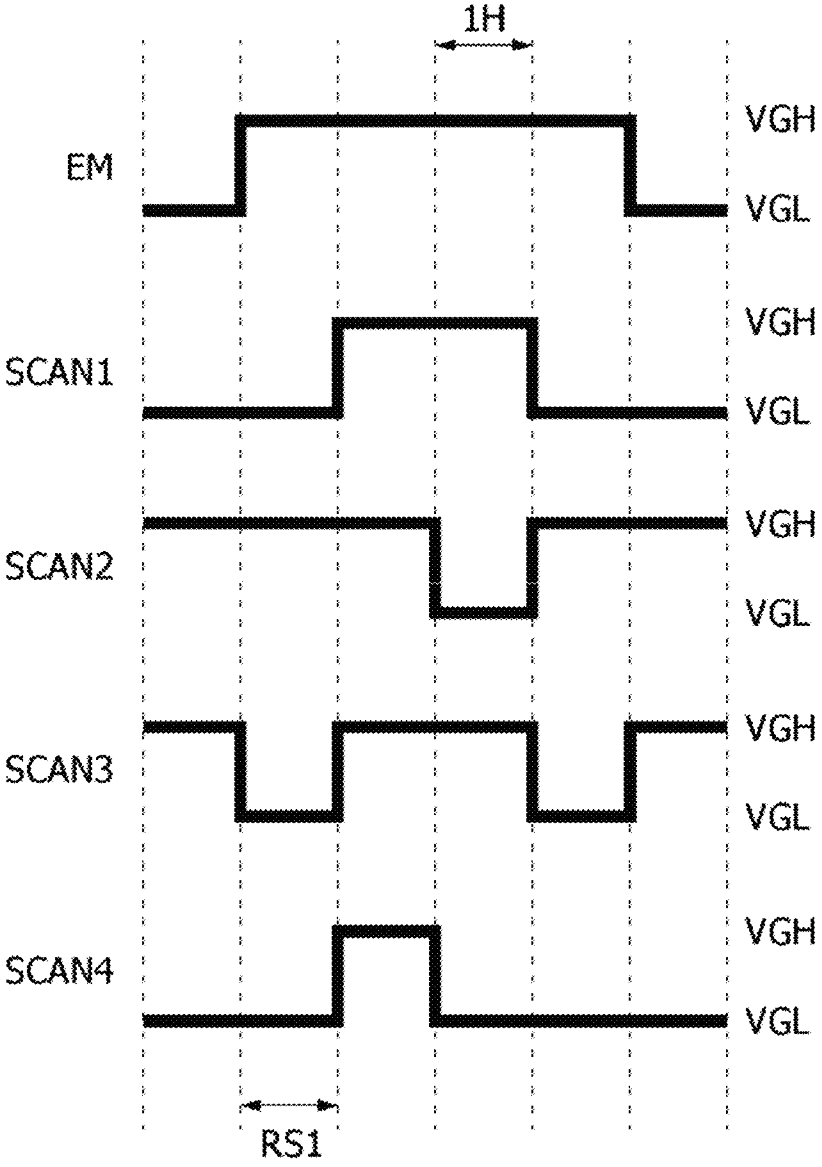
FIGS. 24A to 24B are example diagrams illustrating a first reset stage, an initialization stage, a data writing and threshold voltage sampling stage, a second reset stage, and a light emission stage of the pixel circuit shown in FIG. 23.
Figure 24B:
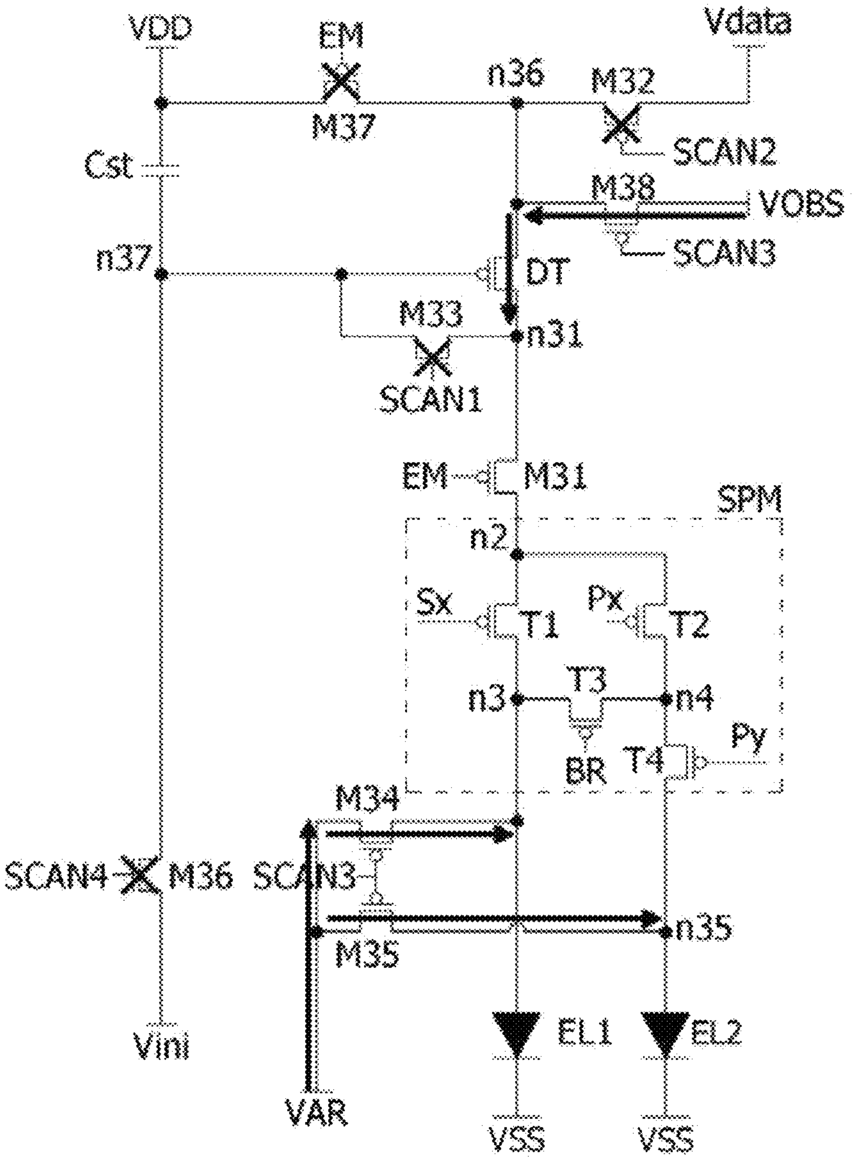

FIGS. 24A and 24B are a waveform and a circuit diagram, respectively, illustrating the first reset stage of the pixel circuit shown in FIG. 23. The first reset stage is performed during a first period RS1.

Referring to FIGS. 24A and 24B, during the first period RS1, the voltages of the first, third and fourth scan signals SCAN1, SCAN3, and SCAN4 are the gate low voltage VGL, and the voltages of the second scan signal SCAN2 and the EM signal EM are the gate high voltage VGH.

During the first period RS1, the fourth pixel switch element M34, the fifth pixel switch element M35, and the eighth pixel switch element M38 are turned on, and the other pixel switch elements M31, M32, M33, M36, and M37 are turned off. During the first period RS1, a first compensation voltage VOBS is applied to the sixth node n36 to turn on the driving element DT. During the first period RS1, a second compensation voltage VAR is applied to the third and fifth nodes n33 and n35 through the turned-on fourth and fifth pixel switch elements M34 and M35. The light-emitting elements EL1 and EL2 are in the off state.

Figure 25A:
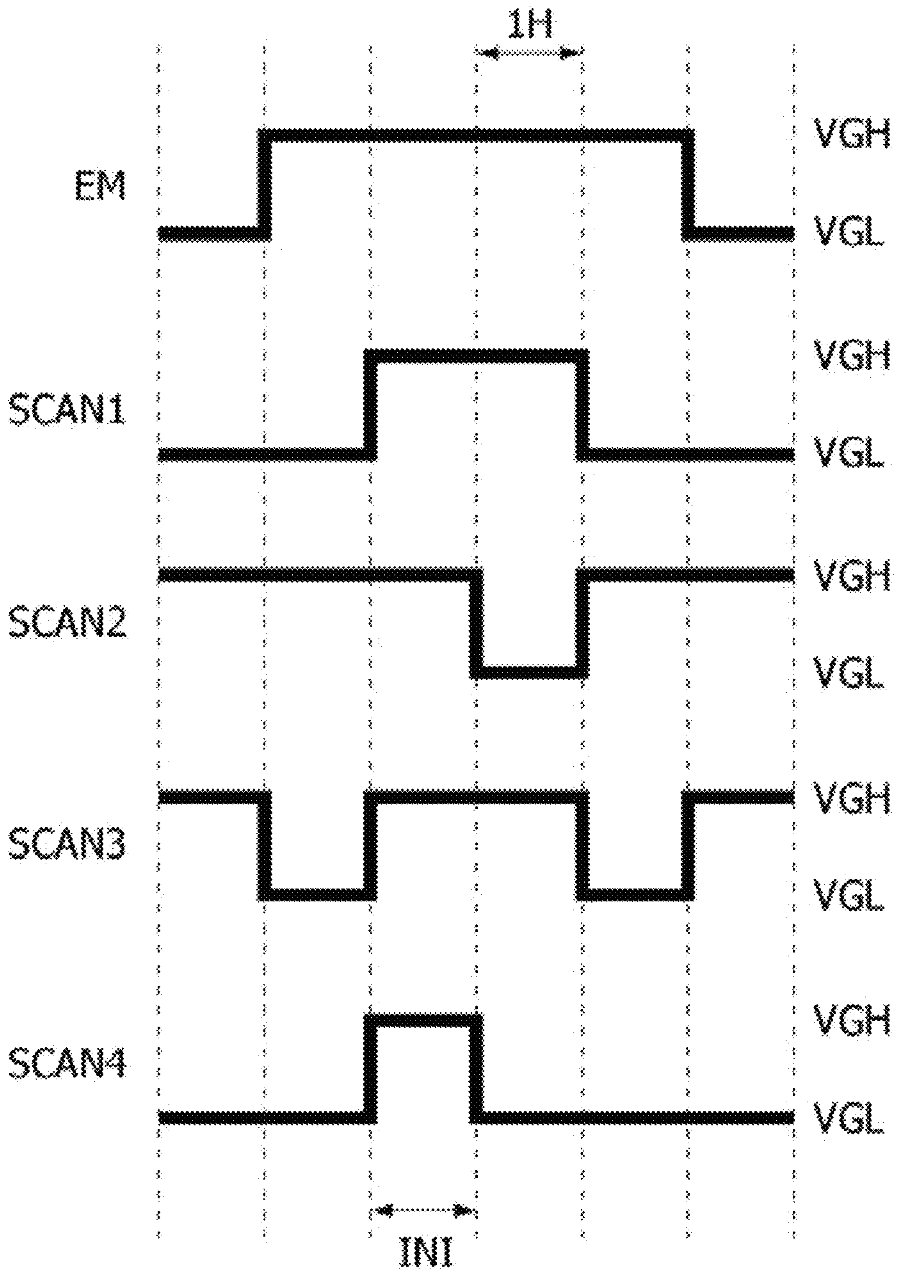
FIGS. 25A to 25B are other example diagrams illustrating a first reset stage, an initialization stage, a data writing and threshold voltage sampling stage, a second reset stage, and a light emission stage of the pixel circuit shown in FIG. 23.
Figure 25B:
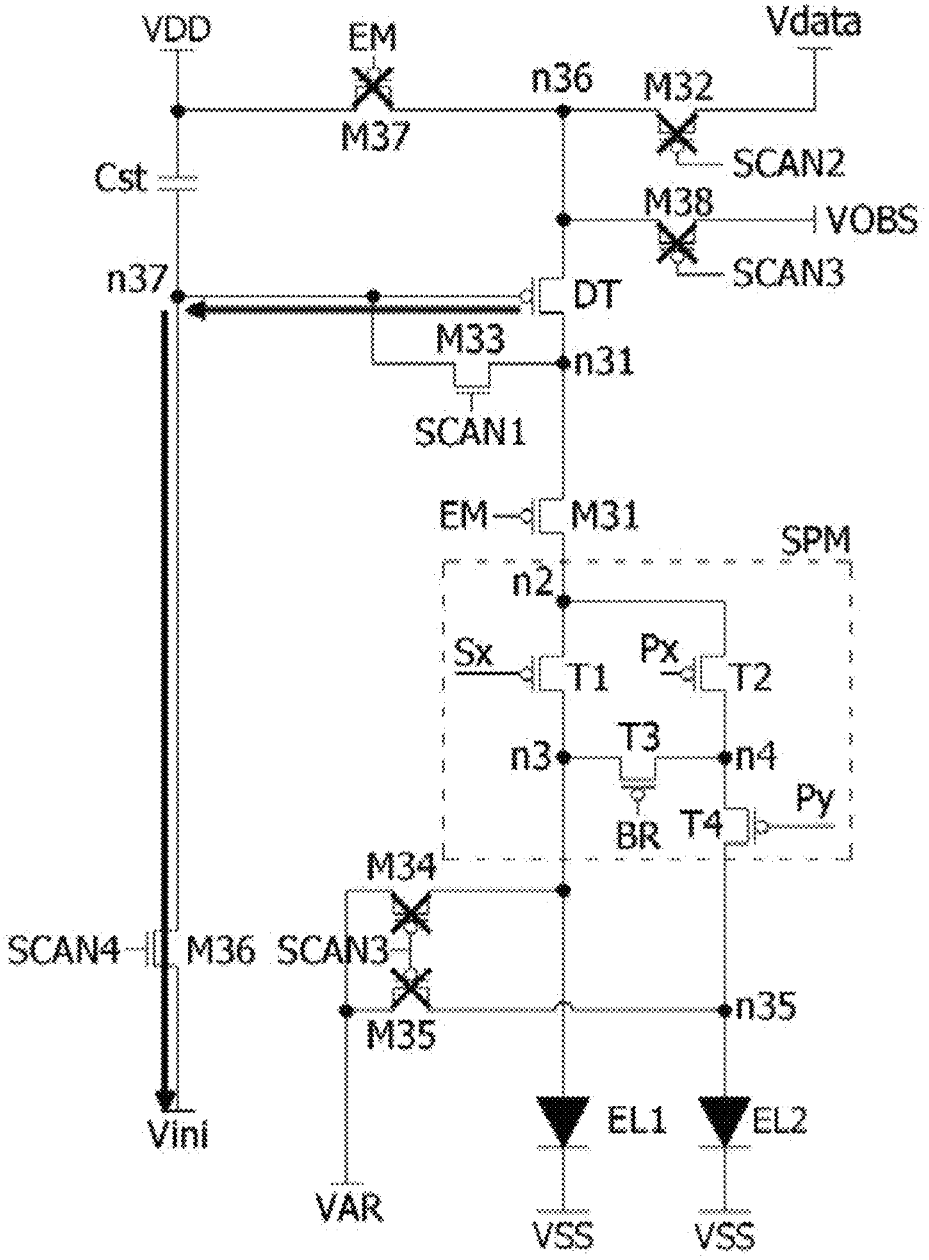

FIGS. 25A and 25B are an example waveform and an example circuit diagram, respectively, illustrating the initialization stage of the pixel circuit shown in FIG. 23. The initialization stage is performed during a second period INI.

Referring to FIGS. 25A and 25B, the voltage of the first, second, third, and fourth scan signals SCAN1, SCAN2, SCAN3, and SCAN4 and the EM signal EM is the gate-high voltage VGH during the second period INI.

During the second period INI, the third and sixth pixel switch elements M33 and M36 are turned on, and the other pixel switch elements M31, M32, M34, M35, M37, and M38 are turned off. During the second period INI, the initialization voltage Vini is applied to the seventh node n37 to initialize the capacitor Cst. During the second period INI, the light-emitting elements EL1 and EL2 are in the off state.

Figure 26A:
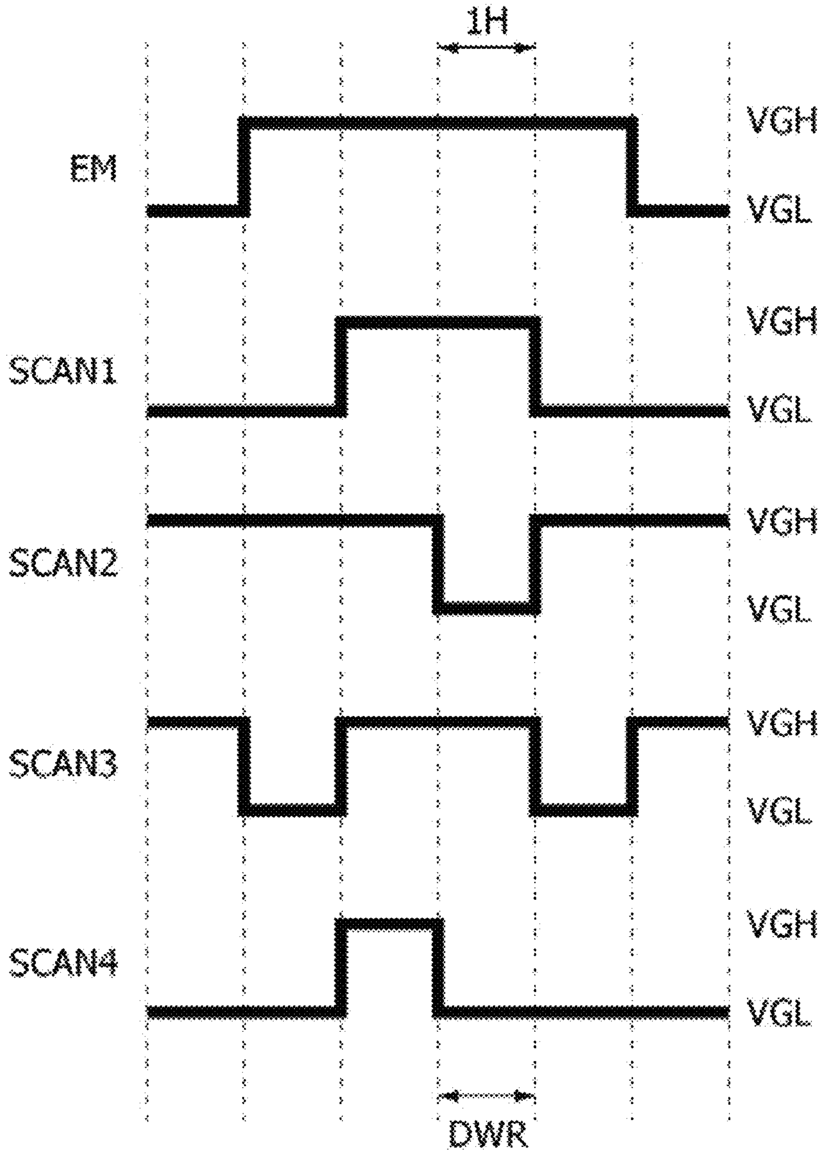
FIGS. 26A to 26B are other example diagrams illustrating a first reset stage, an initialization stage, a data writing and threshold voltage sampling stage, a second reset stage, and a light emission stage of the pixel circuit shown in FIG. 23.
Figure 26B:
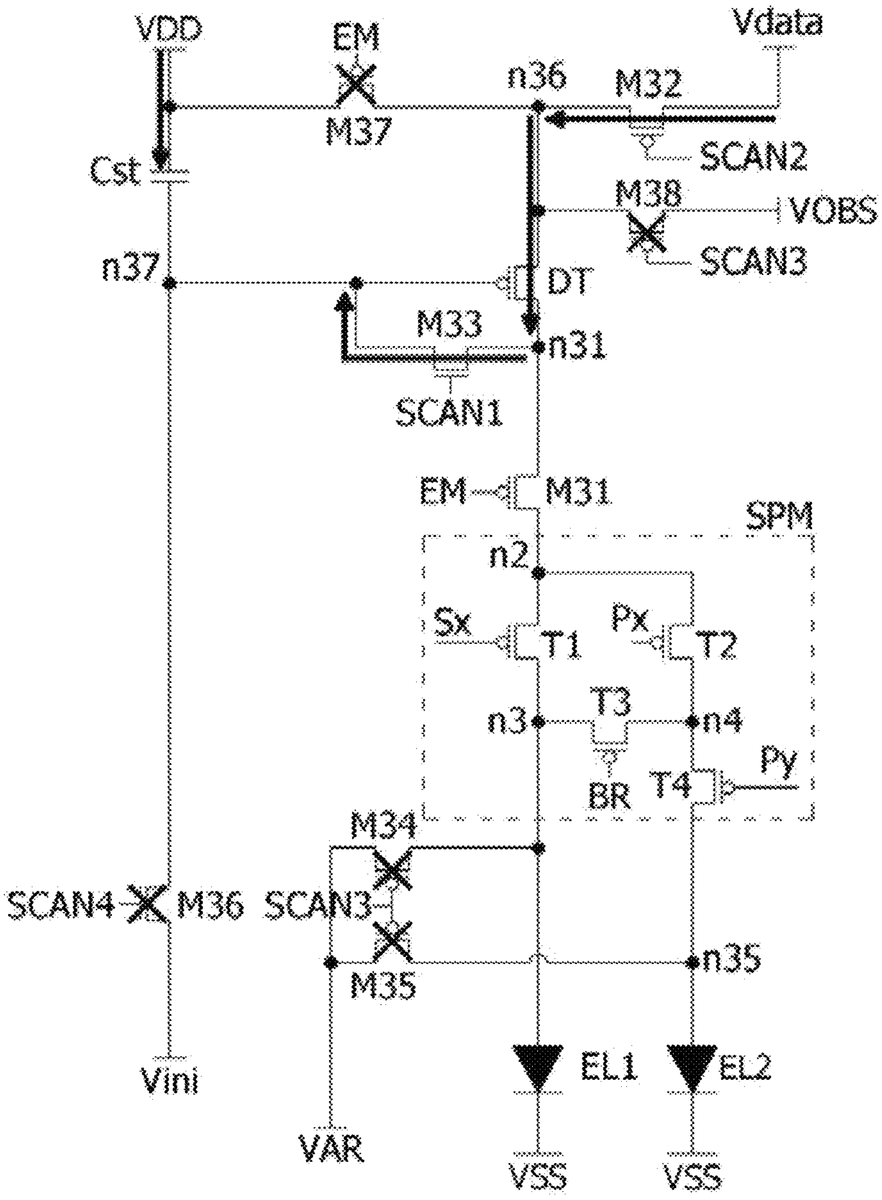

FIGS. 26A and 26B are an example waveform and an example circuit diagram, respectively, illustrating the data writing and threshold voltage sampling stage of the pixel circuit in FIG. 23. The data writing and threshold voltage sampling stage are performed during a third period DWR.

Referring to FIG. 26A and FIG. 26B, during the third period DWR, the voltages of the first and third scan signals SCAN1 and SCAN3 are the gate high voltage VGH and the voltages of the second and fourth scan signals SCAN2 and SCAN4 are the gate low voltage VGL. During the third period DWR, the voltage of the EM signal EM is the gate high voltage VGH.

During the third period DWR, the second and third pixel switch elements M32 and M33 are turned on, while the other pixel switch elements M31, M34, M35, M36, M37, and M38 are turned off. At the end of the third period DWR, the voltages of the first and sixth nodes n31 and n36 are the data voltage Vdata, and the voltage of the seventh node n37 is a voltage of Vdata+Vth. Here, Vth is the threshold voltage of the driving element DT. During the third period DWR, the light-emitting elements EL1 and EL2 are in the off state.

Figure 27A:
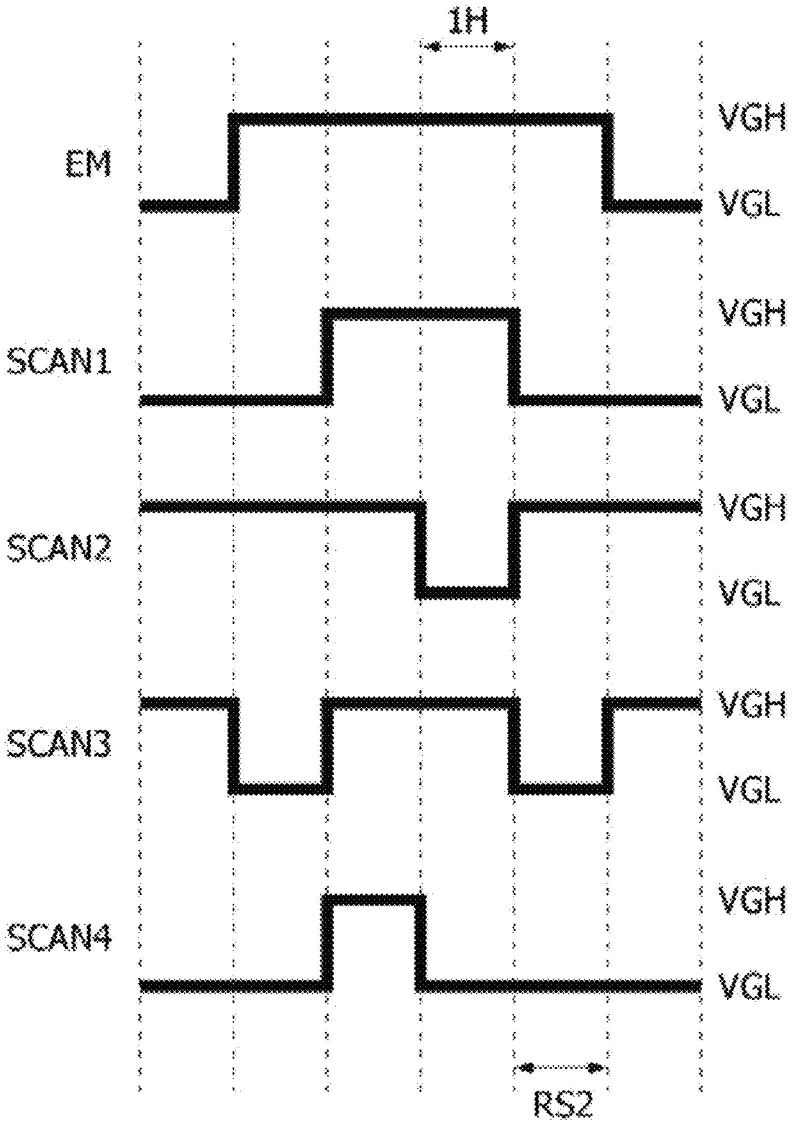
FIGS. 27A to 27B are other example diagrams illustrating a first reset stage, an initialization stage, a data writing and threshold voltage sampling stage, a second reset stage, and a light emission stage of the pixel circuit shown in FIG. 23.
Figure 27B:
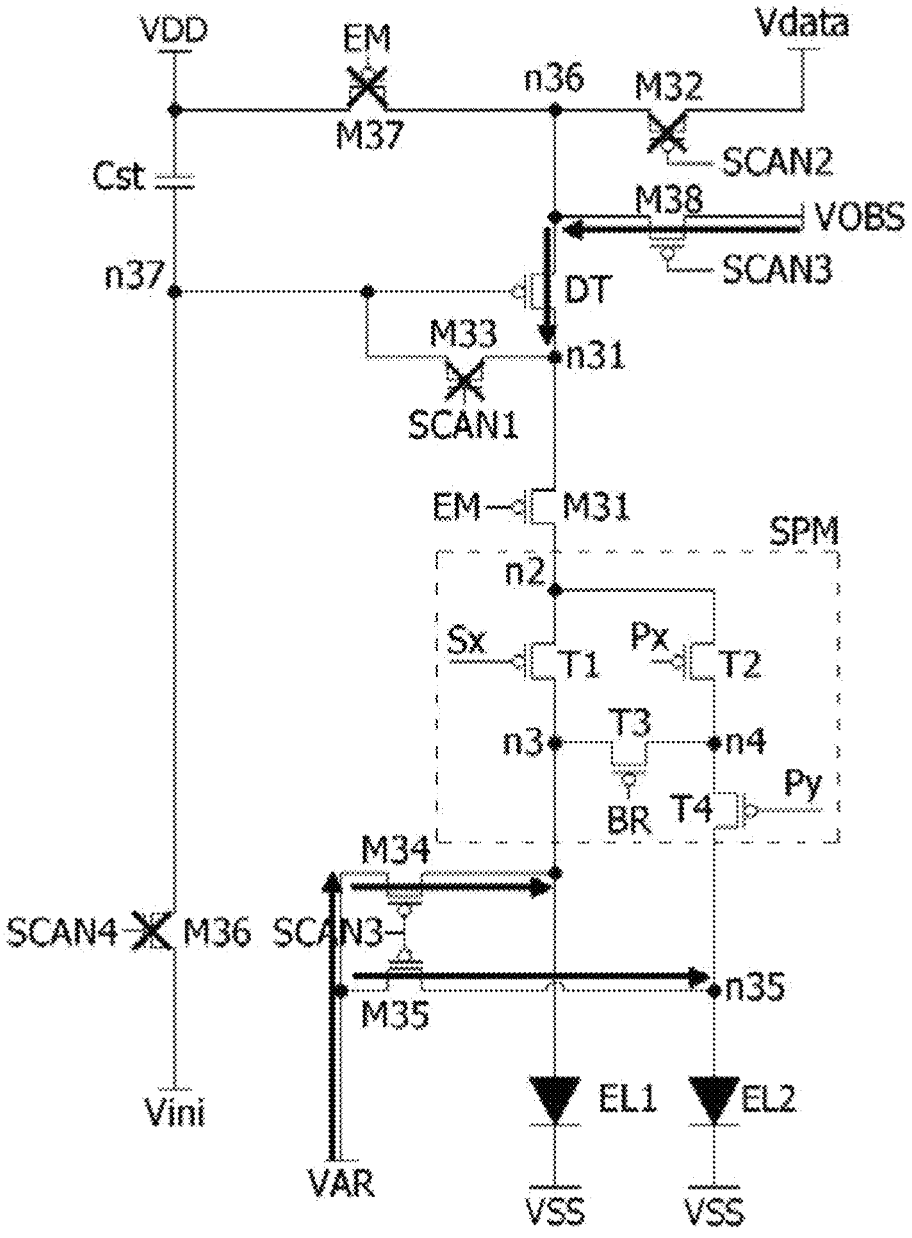

FIGS. 27A and 27B are an example waveform and an example circuit diagram, respectively, illustrating the second reset stage of the pixel circuit shown in FIG. 23. The second reset stage is performed during a fourth period RS2.

Referring to FIGS. 27A and 27B, during the fourth period RS2, the voltages of the first, third and fourth scan signals SCAN1, SCAN3, and SCAN4 are the gate low voltage VGL, and the voltages of the second scan signal SCAN2 and the EM signal EM are the gate high voltage VGH.

During the fourth period RS2, the fourth pixel switch element M34, the fifth pixel switch element M35, and the eighth pixel switch element M38 are turned on, and the other pixel switch elements M31, M32, M33, M36, and M37 are turned off. During the fourth period RS2, the first compensation voltage VOBS is applied to the sixth node n36 to turn on the driving element DT. During the fourth period RS2, the second compensation voltage VAR is applied to the third and fifth nodes n3 and n35. During the fourth period RS2, the light-emitting elements EL1 and EL2 are in the off state.

Figure 28A:
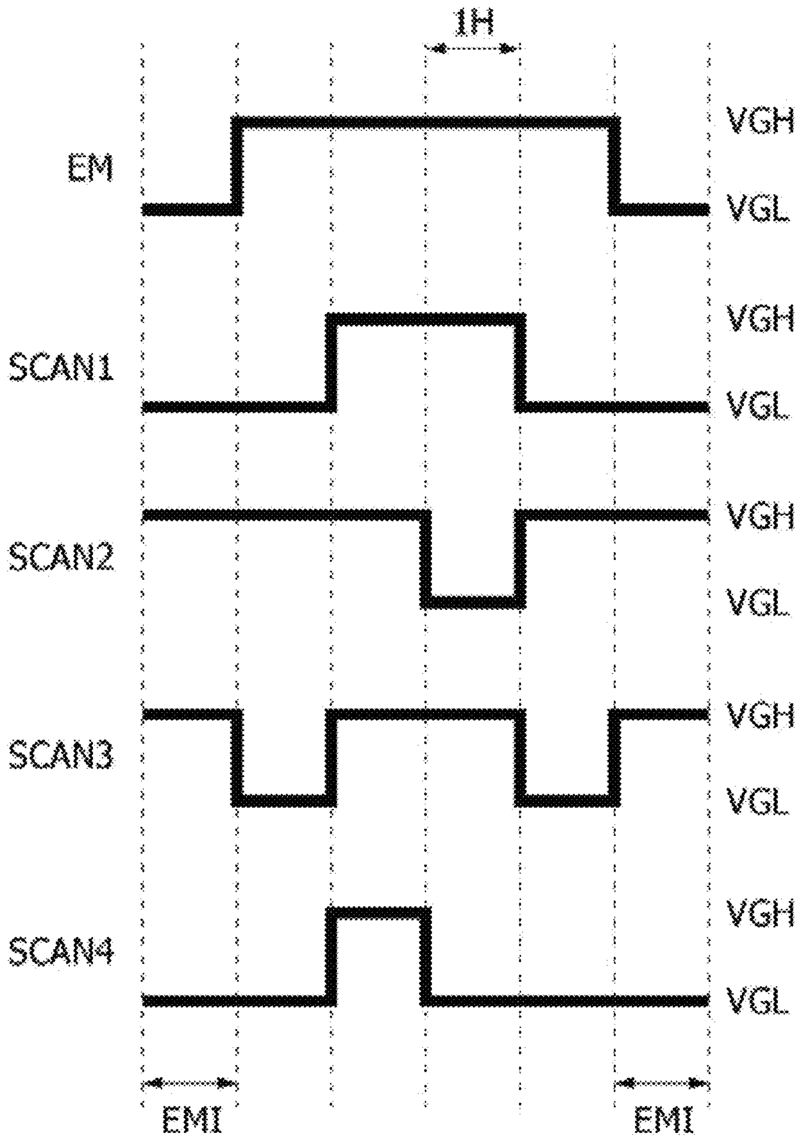
FIGS. 28A to 28B are other example diagrams illustrating a first reset stage, an initialization stage, a data writing and threshold voltage sampling stage, a second reset stage, and a light emission stage of the pixel circuit shown in FIG. 23.
Figure 28B:
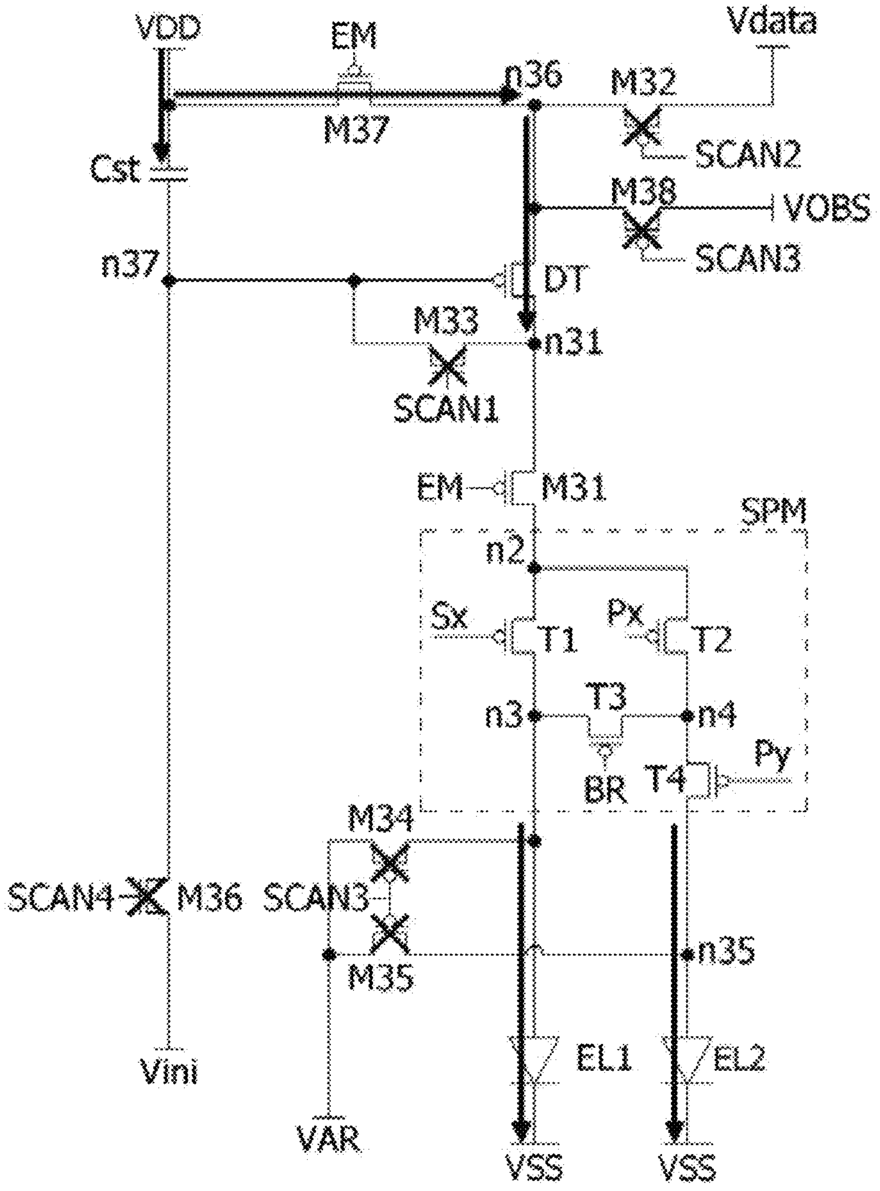

FIGS. 28A and 28B are an example waveform and an example circuit diagram, respectively, illustrating the light emission stage of the pixel circuit shown in FIG. 23. the light emission stage is performed during fifth periods EMI.

Referring to FIG. 28A and FIG. 28B, during the fifth periods EMI, the voltages of the first and fourth scan signals SCAN1 and SCAN4 are the gate low voltage VGL and the voltages of the second and third scan signals SCAN2 and SCAN3 are the gate high voltage VGH. During the fifth periods EMI, the voltage of the EM signal EM is the gate low voltage VGL. During the fifth period EMI, the first pixel switch element M31 and the seventh pixel switch element M37 are turned on, while the other pixel switch elements M32, M33, M34, M35, M36, and M38 are turned off.

During the fifth periods EMI, a current generated by the gate-to-source voltage of the driving element DT is supplied to the first light-emitting element EL1 or the second light-emitting element EL2 through the mode selection circuit SPM. Therefore, depending on the on/off state of the switch elements T1, T2, T3, and T4, during the fifth period EMI, either the first light-emitting element EL1 or the second light-emitting element EL2 may be lit by emitting light, and the other may be in the off state.

Figure 29:
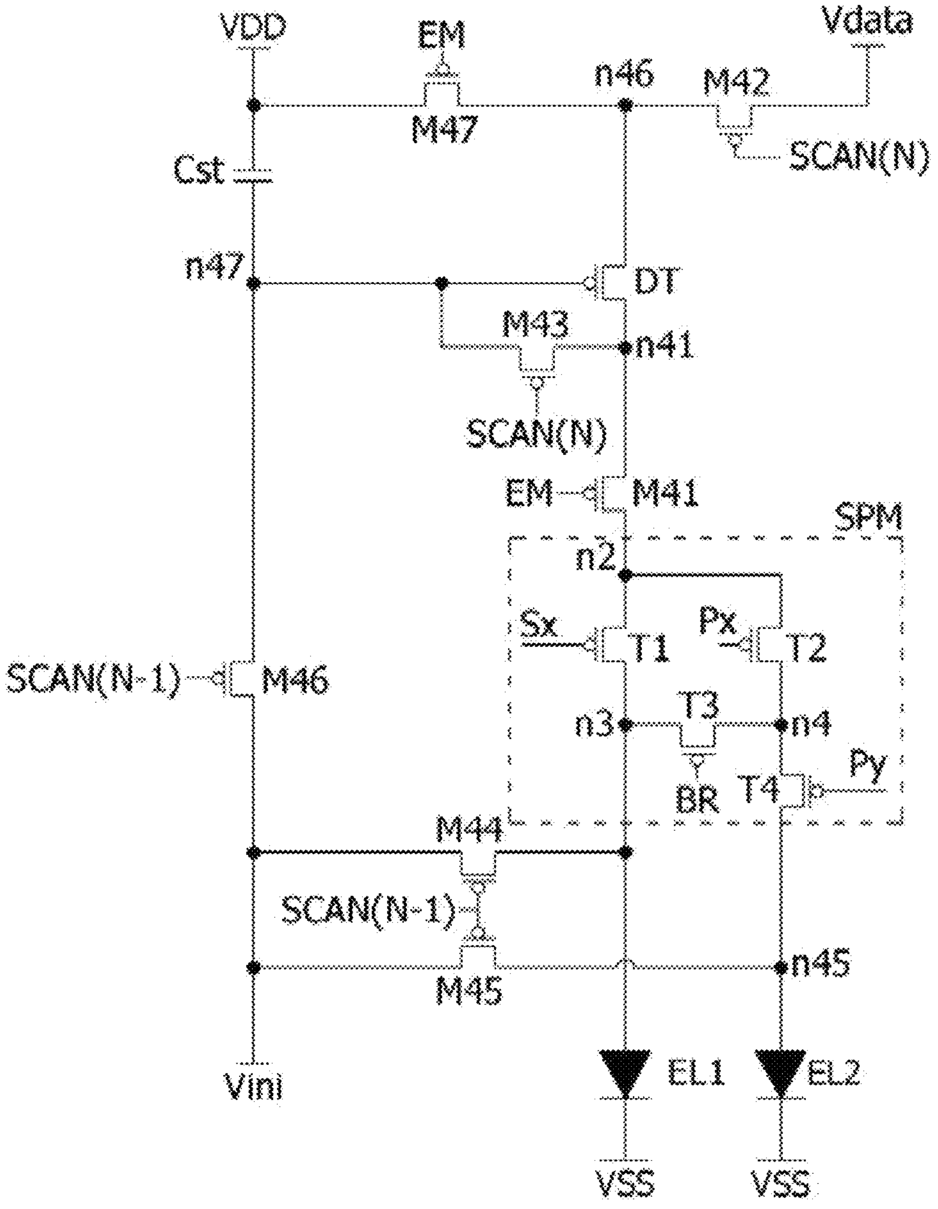
FIG. 29 is a circuit diagram showing another example of a pixel circuit to which the mode selection circuit shown in FIGS. 4 and 6 is applied.

FIG. 29 is a circuit diagram illustrating another example of a pixel circuit to which the mode selection circuit shown in FIGS. 4 and 6 is applied. A mode selection circuitry SPM of this pixel circuit is substantially the same as the embodiments described above in FIGS. 6 and 7.

Referring to FIG. 29, the pixel circuit includes a first light-emitting element EL1, a second light-emitting element EL2, a driving element DT driving the light-emitting elements EL1 and EL2, a plurality of pixel switch elements M41 to M46, and a plurality of switch elements T1, T2, T3, and T4. The driving element DT, the pixel switch elements M41 to M46, and the switch elements T1, T2, T3, and T4 may be implemented as, but not limited to, p-channel transistors.

The first light-emitting element EL1 includes an anode electrode connected to a third electrode n3, and a cathode electrode to which the cathode voltage VSS is applied. The second light-emitting element EL2 includes an anode electrode connected to a fifth node n45, and a cathode electrode to which the cathode voltage VSS is applied. The first light-emitting element EL1 may be driven by a current from the driving element DT to emit light in the first mode (S mode). The second light-emitting element EL2 may be driven by a current from the driving element DT to emit light in the second mode (P mode).

The driving element DT includes a first electrode connected to a sixth node n46, a second electrode connected to a first node n41, and a gate electrode connected to a seventh node n47. The driving element DT generates a current required to drive the first and second light-emitting elements EL1 and EL2 according to a gate-to-source voltage that varies with the data voltage Vdata. A capacitor Cst is connected between the VDD node and the seventh node n47.

A first pixel switch element M41 is connected between the first node n41 and a second node n2, and is turned on in response to the gate-on voltage VGL of the EM signal EM. When the first pixel switch element M41 is turned on, the first node n41 may be electrically connected to the second node n2. The first pixel switch element M41 includes a first electrode connected to the first node n41, a gate electrode to which the EM signal EM is applied, and a second electrode connected to the second node n2.

A second pixel switch element M42 is connected between the data line to which the data voltage Vdata of pixel data is applied and the sixth node n46, and is turned on in response to the gate-on voltage VGL of an Nth scan signal SCAN(N) where N is a natural number. When the second switch element M42 is turned on, the data voltage Vdata may be applied to the sixth node n46. The second pixel switch element M42 includes a first electrode to which the data voltage Vdata is applied, a gate electrode to which the Nth scan signal SCAN(N) is applied, and a second electrode connected to the sixth node n46.

A third pixel switch element M43 is connected between the first node n41 and the seventh node n47, and is turned on in response to the gate-on voltage VGL of the Nth scan signal SCAN(N). When the third pixel switch element M43 is turned on, the first node n41 may be electrically connected to the seventh node n47. The third pixel switch element M43 includes a first electrode connected to the first node n41, a gate electrode to which the Nth scan signal SCAN(N) is applied, and a second electrode connected to the seventh node n47.

A fourth pixel switch element M44 is connected between the INI node to which the initialization voltage Vini is applied and the third node n3, and is turned on in response to a gate-on voltage VGL of an (N−1)th scan signal SCAN (N−1). When the fourth pixel switch element M44 is turned on, the third node n3 may be initialized to the initialization voltage Vini. The fourth pixel switch element M44 includes a first electrode connected to the INI node to which the initialization voltage Vini is applied, a gate electrode to which the (N−1)th scan signal SCAN(N−1) is applied, and a second electrode connected to the third node n3.

A fifth pixel switch element M45 is connected between the INI node to which the initialization voltage Vini is applied and the fifth node n45, and is turned on in response to the gate-on voltage VGL of the (N−1)th scan signal SCAN(N−1). When the fifth pixel switch element M45 is turned on, the fifth node n45 may be initialized to the initialization voltage Vini. The fifth pixel switch element M45 includes a first electrode connected to the INI node to which the initialization voltage Vini is applied, a gate electrode to which the (N−1)th scan signal SCAN(N−1) is applied, and a second electrode connected to the fifth node n45.

A sixth pixel switch element M46 is connected between the INI node to which the initialization voltage Vini is applied and the seventh node n47, and is turned on in response to the gate-on voltage VGL of the (N−1)th scan signal SCAN(N−1). When the sixth pixel switch element M46 is turned on, the capacitor Cst may be initialized. The sixth pixel switch element M46 includes a first electrode connected to the INI node to which the initialization voltage Vini is applied, a gate electrode to which the (N−1)th scan signal SCAN(N−1) is applied, and a second electrode connected to the seventh node n47.

A seventh pixel switch element M47 is connected between the VDD node to which the pixel driving voltage is applied and the sixth node n46, and is turned on in response to the gate-on voltage VGL of the EM signal EM. When the seventh pixel switch element M47 is turned on, a current path is formed between the VDD node and the driving element DT. The seventh pixel switch element M47 includes a first electrode connected to the VDD node to which the pixel driving voltage VDD is applied, a gate electrode to which the EM signal EM is applied, and a second electrode connected to the sixth node n46.

The pixel circuit shown in FIG. 29 may be driven by an initialization stage, a data writing and threshold voltage sampling stage, and a light emission stage. FIGS. 30A to 32B are diagrams illustrating the initialization stage, the data writing and threshold voltage sampling stage, and the light emission stage of the pixel circuit shown in FIG. 29.

Figure 30A:
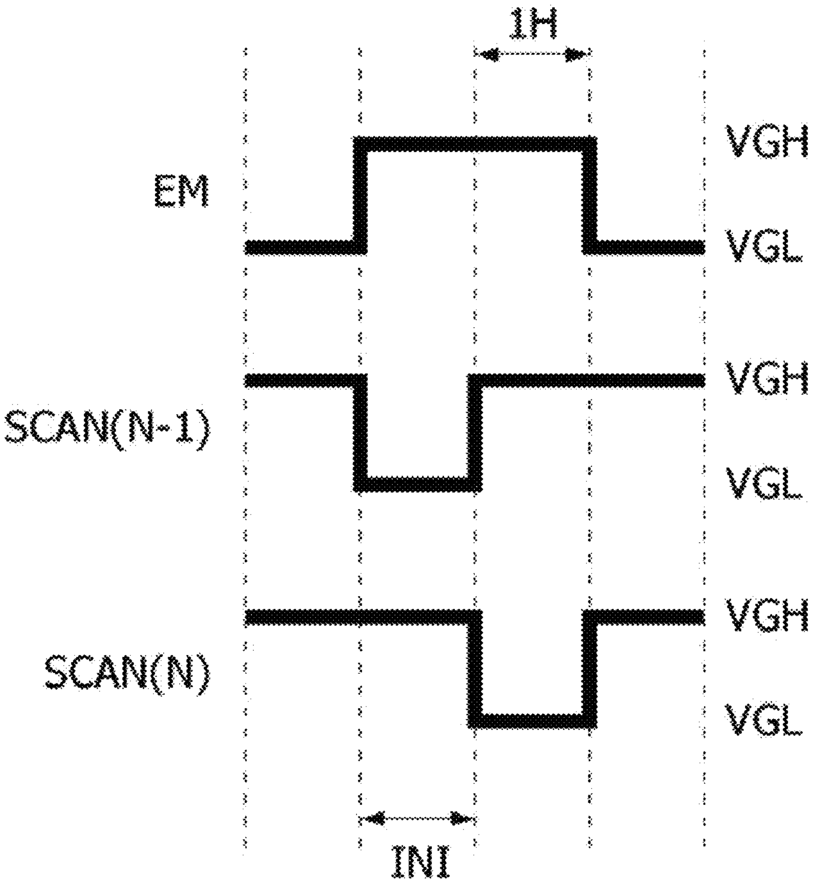
FIGS. 30A to 30B are example diagrams illustrating an initialization stage, a data writing and threshold voltage sampling stage, and a light emission stage of the pixel circuit shown in FIG. 29.
Figure 30B:
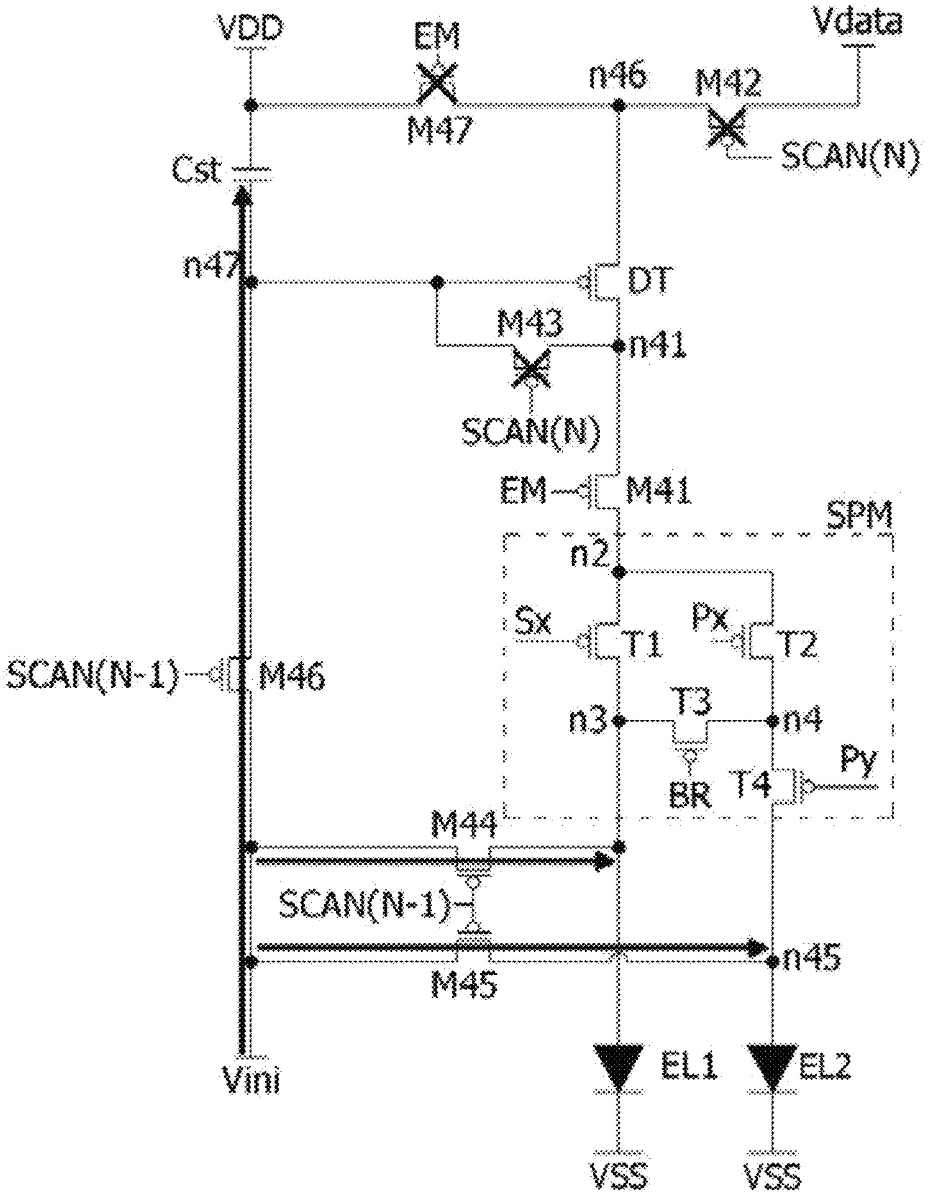

FIGS. 30A and 30B are an example waveform and an example circuit diagram, respectively, illustrating the initialization stage of the pixel circuit shown in FIG. 29. The initialization stage is performed during a first period INI.

Referring to FIGS. 30A and 30B, during the first period INI, the voltage of the (N−1)th scan signal SCAN(N−1) is the gate-on voltage VGL, and the voltage of the Nth scan signal SCAN(N) and the EM signal EM is the gate-off voltage VGH.

During the first interval INI, the fourth pixel switch element M44, the fifth pixel switch element M45, and the sixth pixel switch element M46 are turned on, and the other pixel switch elements M41, M42, M43, and M47 are turned off. In the first period INI, the driving element DT is turned on. During the first period INI, the capacitor Cst and the light-emitting elements EL1 and EL2 are initialized. During the first period INI, the light-emitting elements EL1 and EL2 are in the off state, not emitting light.

Figure 31A:
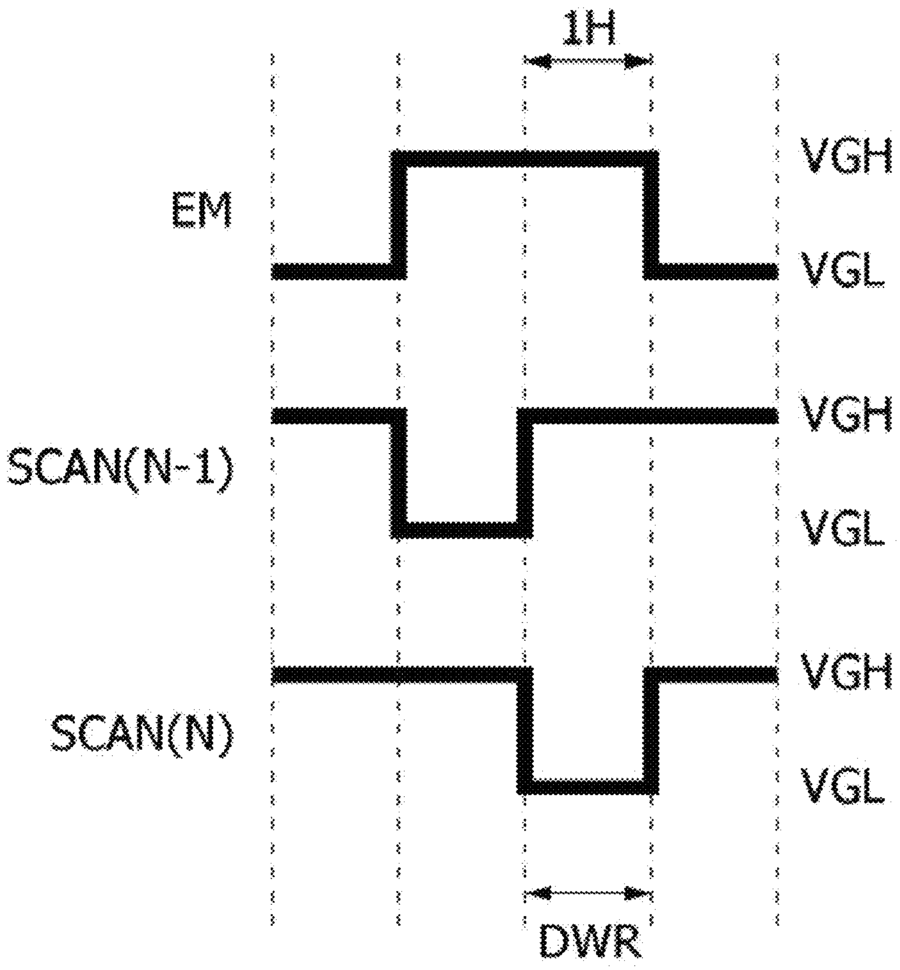
FIGS. 31A to 31B are other example diagrams illustrating an initialization stage, a data writing and threshold voltage sampling stage, and a light emission stage of the pixel circuit shown in FIG. 29.
Figure 31B:
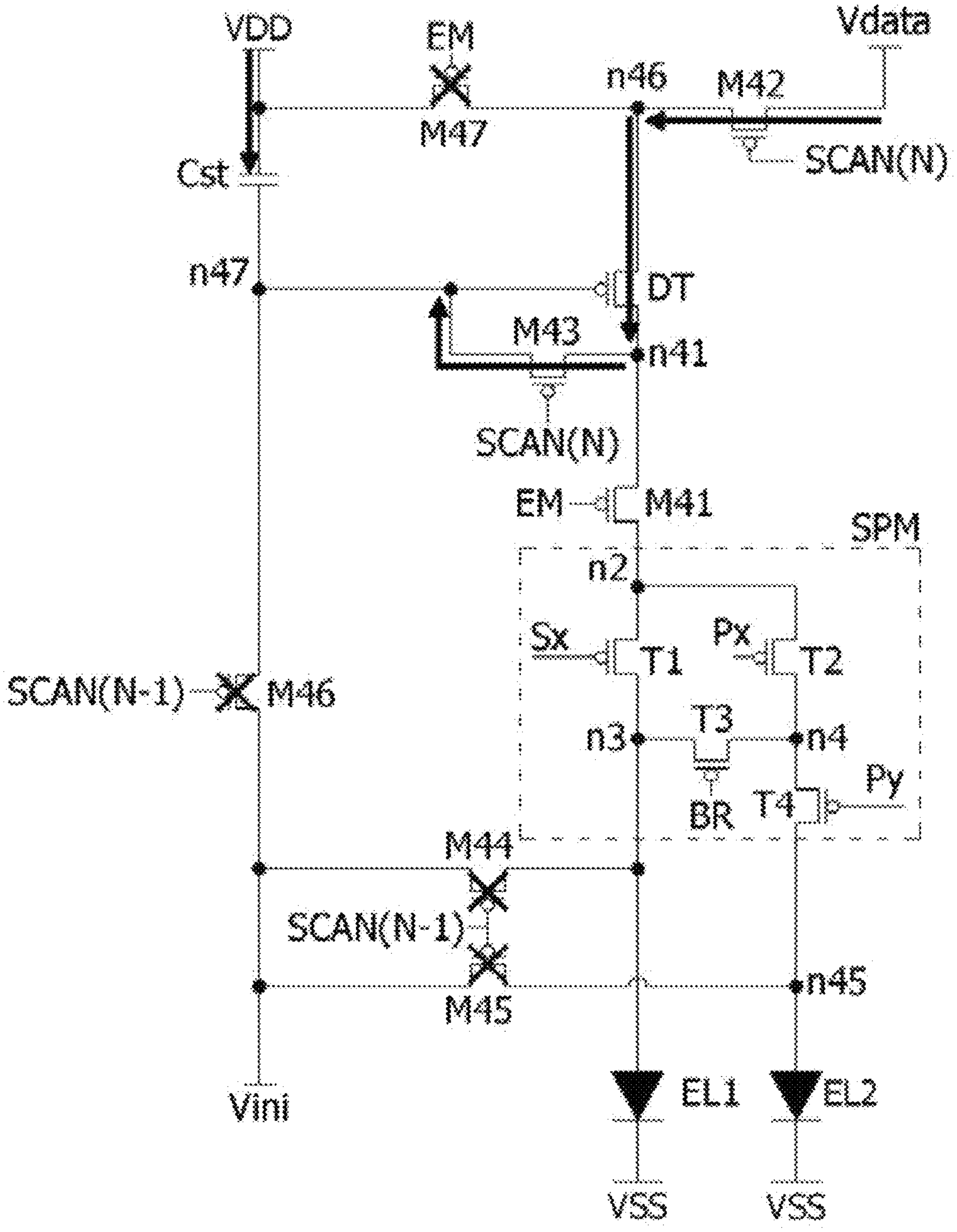

FIGS. 31A and 31B are an example waveform and an example circuit diagram, respectively, illustrating the data writing and threshold voltage sampling stage of the pixel circuit in FIG. 29. The data writing and threshold voltage sampling stage is performed during a second period DWR.

Referring to FIGS. 31A and 31B, during the second period DWR, the voltage of the Nth scan signal SCAN(N) is the gate-on voltage VGL, and the voltages of the (N−1)th scan signal SCAN(N−1) and the EM signal EM are the gate-off voltage VGH. During the second period DWR, the second and third pixel switch elements M42 and M43 are turned on, and the other pixel switch elements M41, M44, M45, M46, and M47 are turned off. During the second period DWR, the data voltage Vdata of the pixel data is applied to the sixth node n46.

Figure 32A:
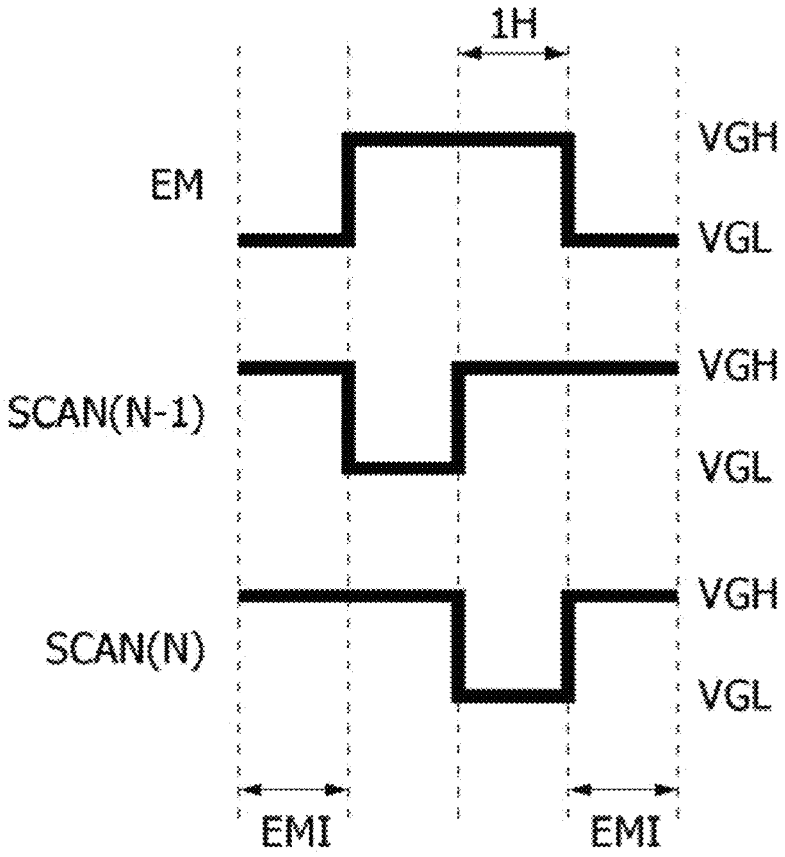
FIGS. 32A to 32B are other example diagrams illustrating an initialization stage, a data writing and threshold voltage sampling stage, and a light emission stage of the pixel circuit shown in FIG. 29.
Figure 32B:
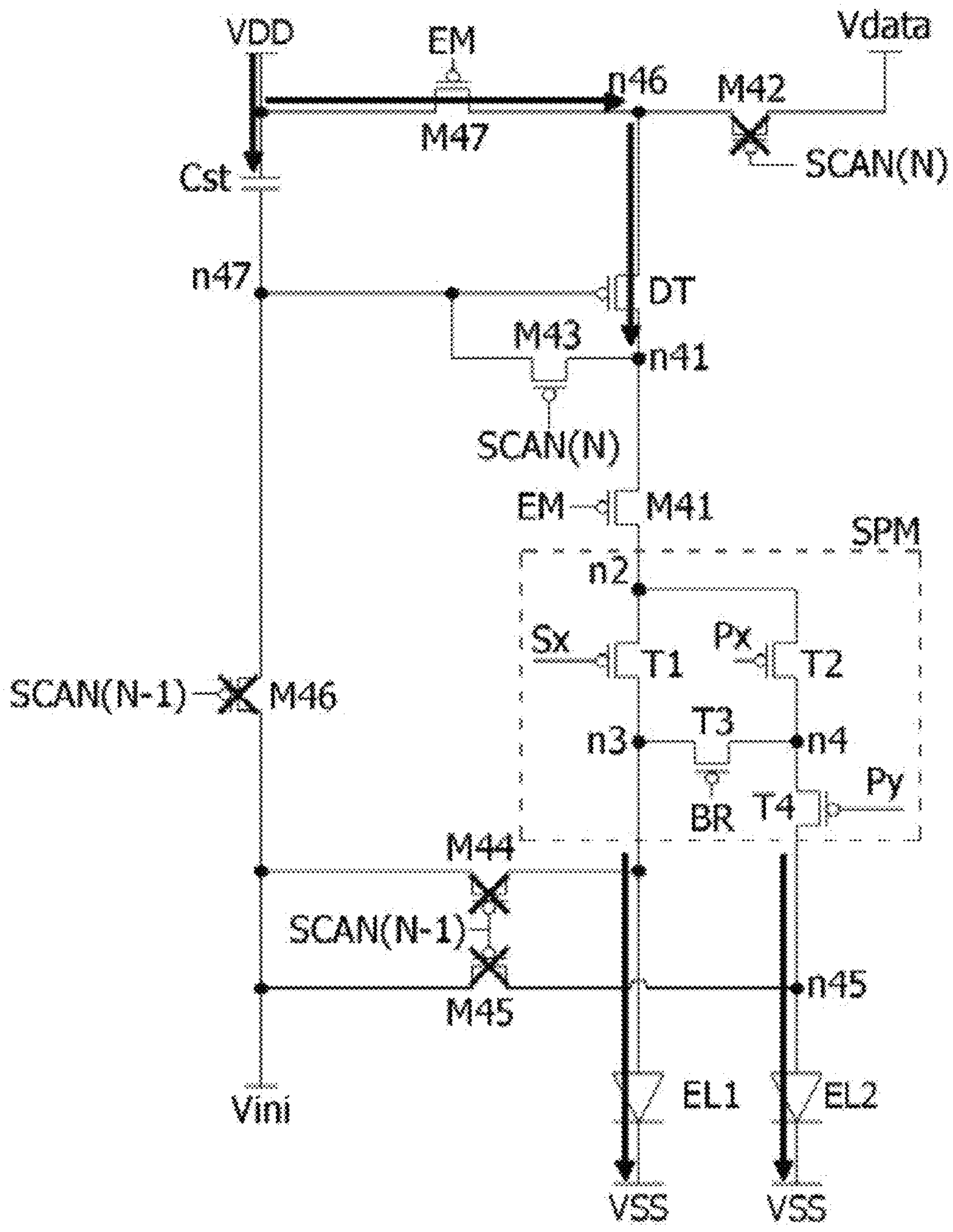

FIGS. 32A and 32B are an example waveform and an example circuit diagram, respectively, illustrating the light emission stage of the pixel circuit shown in FIG. 29.

Referring to FIGS. 32A and 32B, during the second periods EMI, the voltages of the scan signals SCAN(N−1) and SCAN(N) are the gate-off voltage VGH, and the voltage of the EM signal EM is the gate-on voltage VGL. During the third periods EMI, the first and seventh pixel switch elements M41 and M47 are turned on, while the other pixel switch elements M42, M43, M44, M45, and M46 are turned off.

During the third periods EMI, the current generated by the gate-to-source voltage of the driving element DT is supplied to the first light-emitting element EL1 or the second light-emitting element EL2 through the mode selection circuit SPM. Therefore, depending on the on/off state of the switch elements T1, T2, T3, and T4, during the third periods EMI, one of the first light-emitting element EL1 and the second light-emitting element EL2 may be lit by emitting light, and the other may be in the off state.

Figure 33:
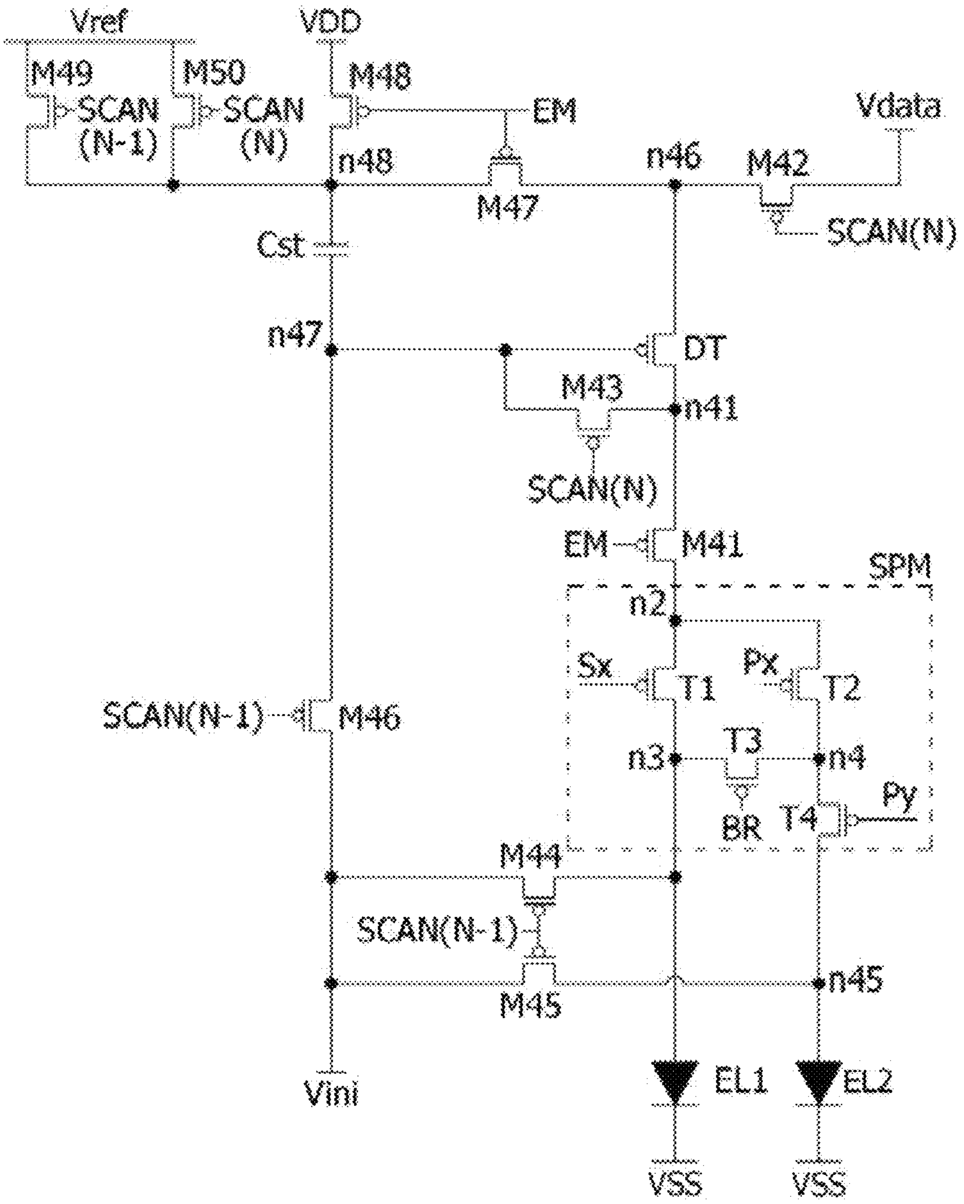
FIG. 33 is a circuit diagram showing another example of a pixel circuit to which the mode selection circuit shown in FIGS. 4 and 6 is applied.

FIG. 33 is a circuit diagram illustrating another example of a pixel circuit to which the mode selection circuit shown in FIGS. 4 and 6 is applied. The gate signals SCAN(N−1), SCAN(N), and EM input to this pixel circuit and the mode selection circuit are substantially the same as in FIGS. 30A, 31B, and 32B. A mode selection circuitry SPM of this pixel circuit is substantially the same as the embodiments described above in FIGS. 6 and 7. In this embodiment, the components that are substantially the same as the pixel circuits of FIGS. 29 to 32B described above are designated by the same reference numerals and are not described in detail.

Referring to FIG. 33, the driving element DT includes a first electrode connected to the sixth node n46, a second electrode connected to the first node n41, and a gate electrode connected to the seventh node n47. The capacitor Cst is connected between the eighth node n48 to which the pixel drive voltage VDD is applied through the eighth pixel switch element M48, and the seventh node n47. The capacitor Cst is connected between the seventh node n47 and the eighth node n48.

The seventh pixel switch element M47 is connected between the sixth node n46 and the eighth node n48, and is turned on in response to the gate-on voltage VGL of the EM signal EM. When the seventh pixel switch element M47 is turned on, the eighth node n48 may be electrically connected to the sixth node n46 to form a current path between the VDD node and the driving element DT. The seventh pixel switch element M47 includes a first electrode connected to the eighth node n48, a gate electrode to which the EM signal EM is applied, and a second electrode connected to the sixth node n46.

The eighth pixel switch element M48 is connected between the VDD node to which the pixel driving voltage is applied and the eighth node n48, and is turned on in response to the gate-on voltage VGL of the EM signal EM. When the eighth pixel switch element M48 is turned on, the VDD node may be electrically connected to the eighth node n48. The eighth pixel switch element M48 includes a first electrode connected to the VDD node to which the pixel driving voltage VDD is applied, a gate electrode to which the EM signal EM is applied, and a second electrode connected to the eighth node n48.

A ninth pixel switch element M49 is connected between the REF node to which the reference voltage Vref is applied and the eight node n48, and is turned on in response to the gate-on voltage VGL of the (N−1)th scan signal SCAN(N−1). When the ninth pixel switch element M49 is turned on, the reference voltage Vref is applied to the eighth node n48. The ninth pixel switch element M49 includes a first electrode connected to the REF node to which the reference voltage Vref is applied, a gate electrode to which the (N−1)th scan signal SCAN(N−1) is applied, and a second electrode connected to the eighth node n48.

A tenth pixel switch element M50 is connected between the REF node to which the reference voltage Vref is applied and the eight node n48, and is turned on in response to the gate-on voltage VGL of the Nth scan signal SCAN(N). When the tenth pixel switch element M50 is turned on, the reference voltage Vref is applied to the eighth node n48. The tenth pixel switch element M50 includes a first electrode connected to the REF node to which the reference voltage Vref is applied, a gate electrode to which the Nth scan signal SCAN(N) is applied, and a second electrode connected to the eighth node n48.

Figure 34:
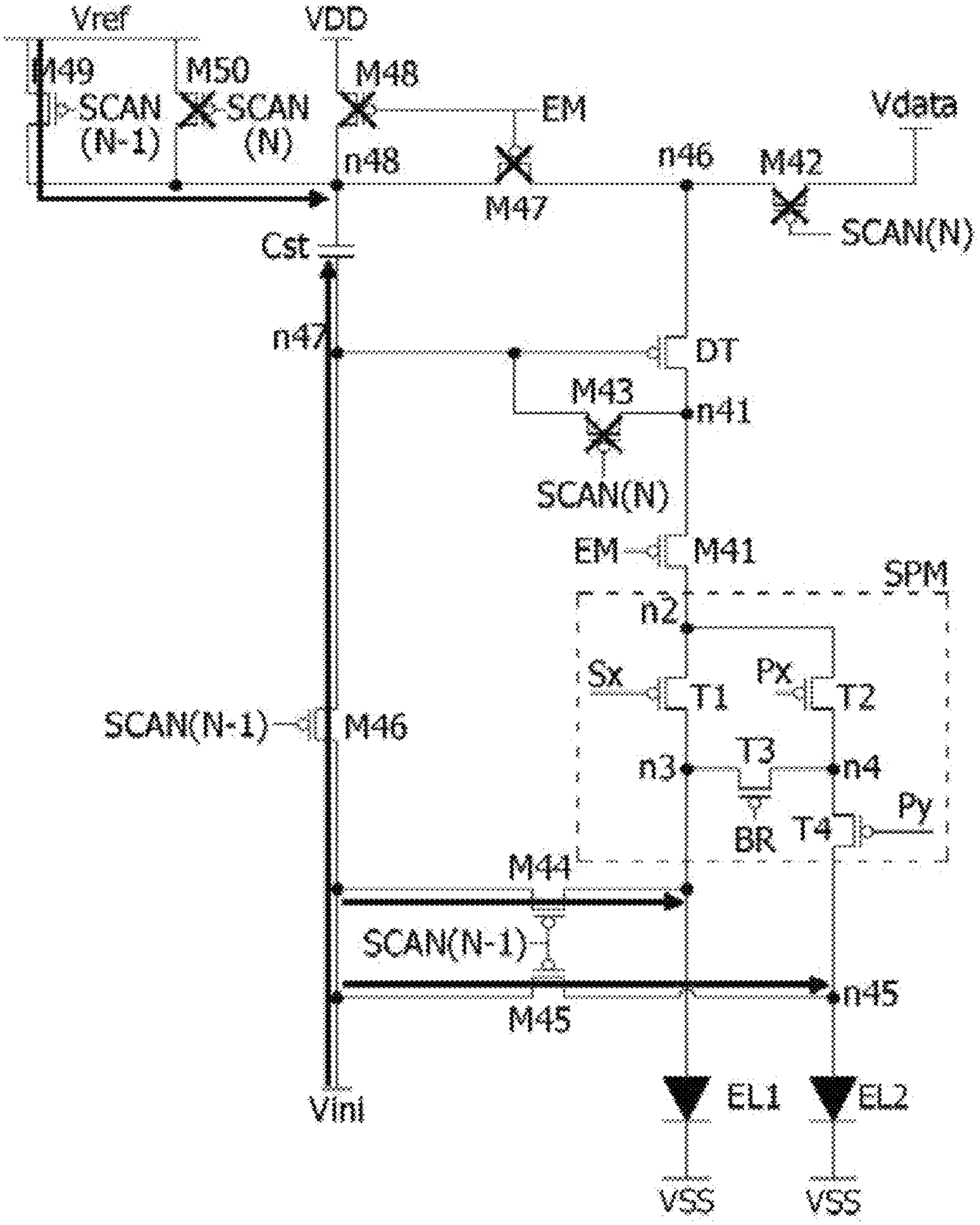
FIG. 34 is an example of a diagram illustrating an initialization stage, a data writing and threshold voltage sampling stage, and a light emission stage of the pixel circuit shown in FIG. 33.
Figure 35:
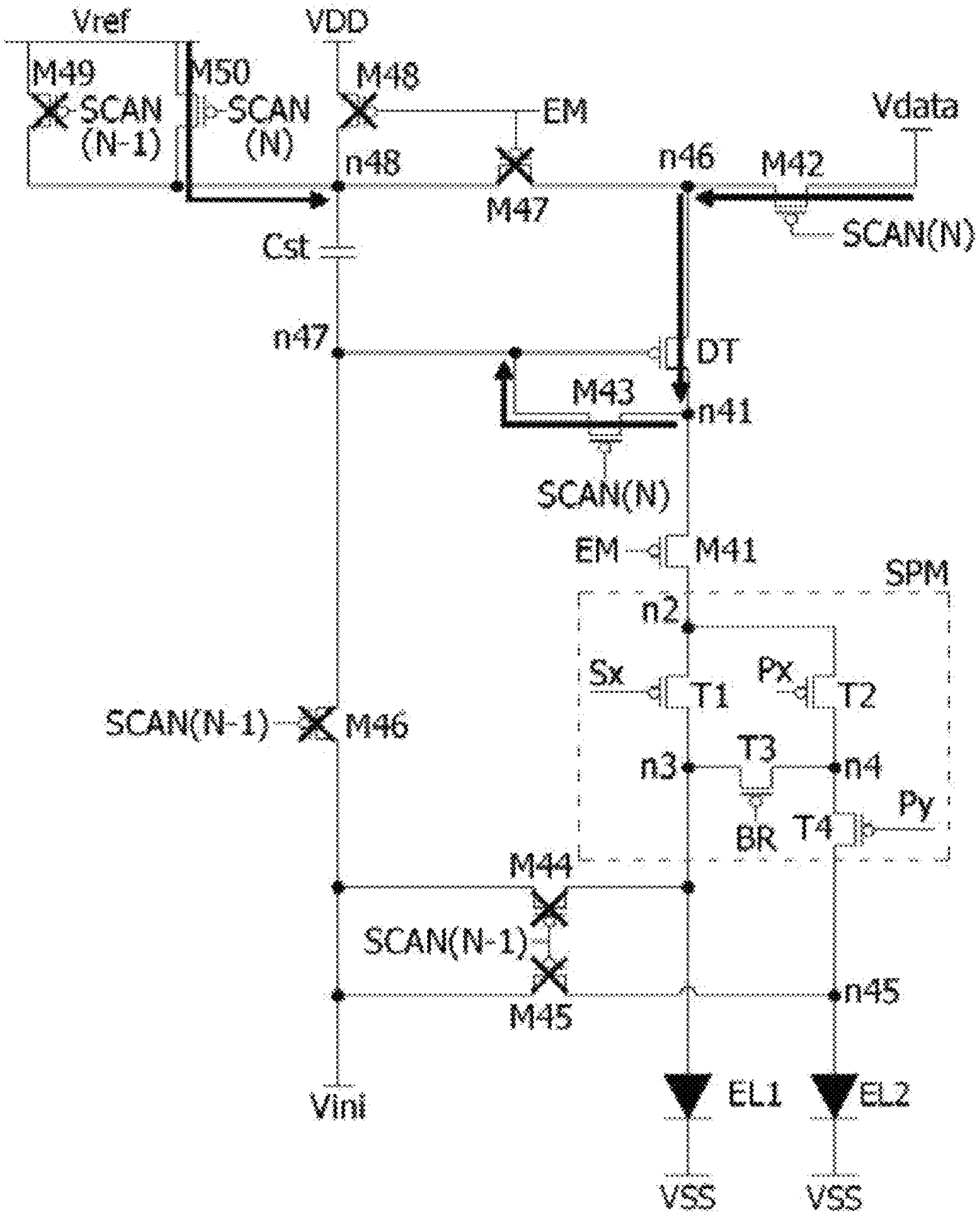
FIG. 35 is another example diagram illustrating an initialization stage, a data writing and threshold voltage sampling stage, and a light emission stage of the pixel circuit shown in FIG. 33.
Figure 36:
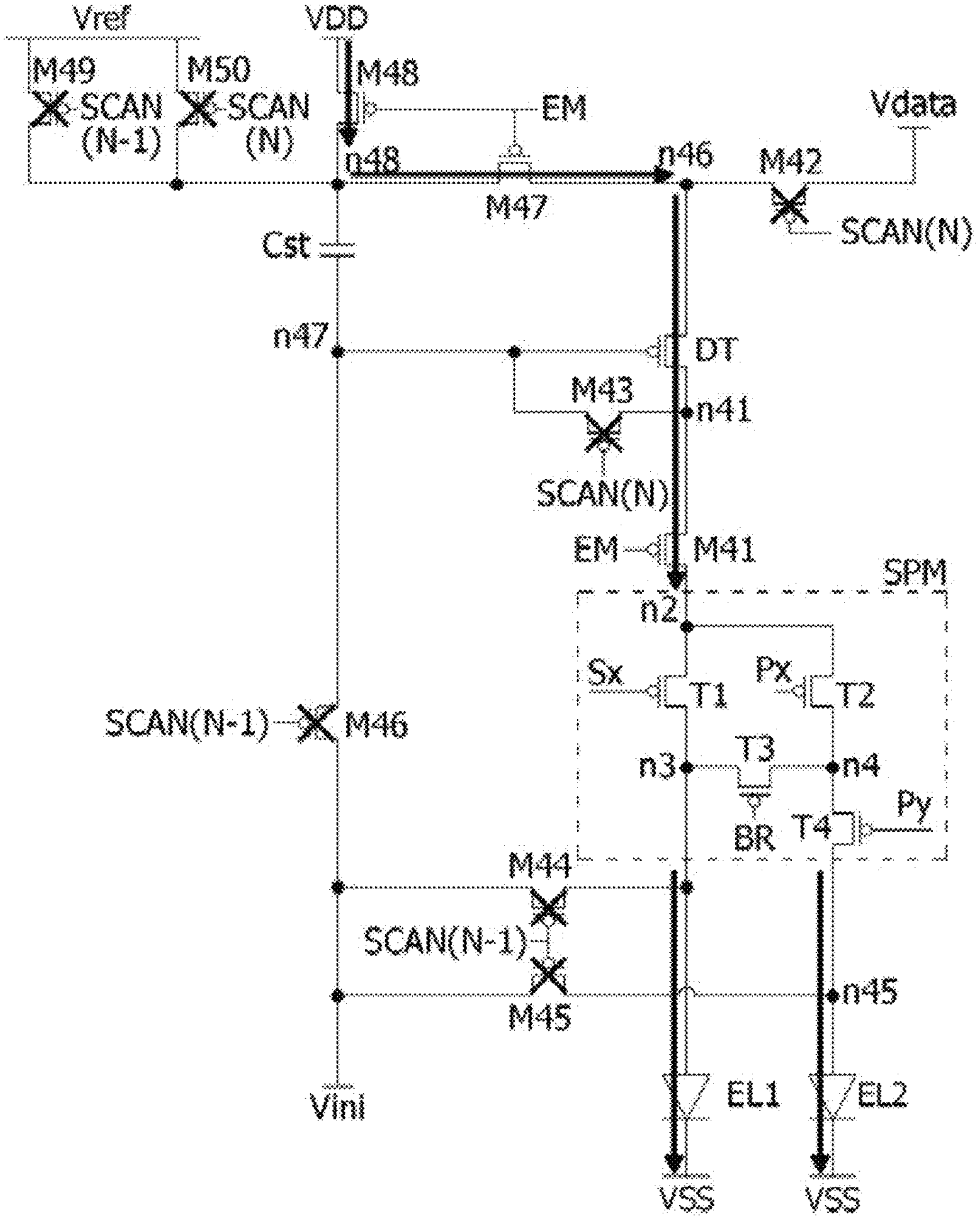
FIG. 36 is another example diagram illustrating an initialization stage, a data writing and threshold voltage sampling stage, and a light emission stage of the pixel circuit shown in FIG. 33.

The pixel circuit shown in FIG. 33 may be driven by an initialization stage, a data writing and threshold voltage sampling stage, and a light emission stage. FIGS. 34 to 36 are example diagrams illustrating the initialization stage, the data writing and threshold voltage sampling stage, and a light emission stage of the pixel circuit shown in FIG. 33.

Referring to FIGS. 30A and 34, the initialization stage of the pixel circuit is performed during a first period INI. During the first period INI, the voltage of the (N−1)th scan signal SCAN(N−1) is the gate-on voltage VGL, and the voltages of the Nth scan signal SCAN(N) and the EM signal EM are the gate-off voltage VGH. In this case, the fourth, fifth, sixth, and ninth pixel switch elements M44, M45, M46, and M49 of the pixel circuit are turned on, and the other pixel switch elements M41, M42, M43, M47, M48, and M50 are turned off. In the first period INI, the driving element DT is turned on. During the first period INI, the capacitor Cst and the light-emitting elements EL1 and EL2 are initialized. During the first period INI, the light-emitting elements EL1 and EL2 are in the off state.

Referring to FIGS. 31A and 35, the data writing and threshold voltage sampling stage of the pixel circuit is performed during the second period DWR. During the second period DWR, the voltage of the Nth scan signal SCAN(N) is the gate-on voltage VGL, and the voltages of the (N−1)th scan signal SCAN(N−1) and the EM signal EM are the gate-off voltage VGH. During the second period DWR, the second, third, and tenth pixel switch elements M42, M43, and M50 are turned on, and the other pixel switch elements M41, M44, M45, M46, M47, M48, and M49 are turned off. The data voltage Vdata of the pixel data is applied to the sixth node n46.

Referring to FIG. 32A and FIG. 36, the light emission stage of the pixel circuit is performed during the third periods EMI. During the third periods EMI, the voltages of the scan signals SCAN(N−1) and SCAN(N)) are the gate-off voltage VGH and the voltage of the EM signal EM is the gate-on voltage VGL. During the third periods EMI, the first, seventh, and eighth pixel switch elements M41, M47, and M48 are turned on, while the other pixel switch elements M42, M43, M44, M45, M46, M49, and M50 are turned off. During the third periods EMI, the current generated by the gate-to-source voltage of the driving element DT is supplied to the first light-emitting element EL1 or the second light-emitting element EL2 through the mode selection circuit SPM.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting lighting devices or inorganic light emitting lighting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The scope of protection of the present disclosure should be construed based on the following claims, and all technical features within the scope of equivalents thereof should be construed as being included within the scope of the present disclosure.

What is claimed is:

1. A display panel, comprising:

a plurality of sub-pixels, wherein each of the plurality of sub-pixels includes:

a driving element configured to generate a current;

a first light-emitting element configured to emit light by the current from the driving element;

a second light-emitting element configured to emit light by the current from the driving element;

a mode selection circuit configured to select a current path from the driving element in response to a first horizontal mode selection signal, a second horizontal mode selection signal, a vertical mode selection signal, and a bridge signal; and a first pixel switch element connected to the driving element through a first node and connected to the mode selection circuit through a second node, and wherein the vertical mode selection signal includes at least a second vertical mode selection signal among a first vertical mode selection signal and the second vertical mode selection signal, and wherein a plurality of lines to which the vertical mode selection signal is applied intersect with a plurality of lines to which the first horizontal mode selection signal and the second horizontal mode selection signal are applied, in a display area of the display panel.

2. A display panel, comprising:

a plurality of sub-pixels, wherein each of the plurality of sub-pixels includes:

a driving element configured to generate a current;

a first light-emitting element configured to emit light by the current from the driving element;

a second light-emitting element configured to emit light by the current from the driving element;

a mode selection circuit configured to select a current path from the driving element in response to a first horizontal mode selection signal, a second horizontal mode selection signal, a vertical mode selection signal, and a bridge signal; and a first pixel switch element connected to the driving element through a first node and connected to the mode selection circuit through a second node, wherein the vertical mode selection signal includes at least a second vertical mode selection signal among a first vertical mode selection signal and the second vertical mode selection signal, and wherein the mode selection circuit includes:

a first switch element configured to be turned on in response to a gate-on voltage of the first horizontal mode selection signal electrically connecting the second node to a third node;

a second switch element configured to be turned on in response to the gate-on voltage of the second horizontal mode selection signal electrically connecting the second node to a fourth node;

a third switch element configured to be turned on in response to the gate-on voltage of the bridge signal electrically connecting the third node to the fourth node; and a fourth switch element configured to be turned on in response to the gate-on voltage of the second vertical mode selection signal electrically connecting the fourth node to an anode electrode of the second light-emitting element.

3. The display panel of claim 2, wherein an anode electrode of the first light-emitting element is connected to the third node.

4. The display panel of claim 2, wherein a sub-pixel is configured to be driven in a first mode, when the first switch element and the third switch element are turned on, and the second switch element and the fourth switch element are in an off state, a sub-pixel is configured to be driven in the first mode, when the first switch element and the fourth switch element are turned on, and the second switch element and the third switch element are in the off state, a sub-pixel is configured to be driven in the first mode, when the second switch element and the third switch element are turned on, and the first switch element and the fourth switch element are in the off state, and a sub-pixel is configured to be driven in a second mode, when the second switch element and the fourth switch element are turned on, and the first switch element and the third switch element are in the off state.

5. The display panel of claim 4, wherein a viewing angle of a sub-pixel for being driven in the first mode is greater than a viewing angle of a sub-pixel for being driven in the second mode.

6. The display panel of claim 2, wherein the mode selection circuit further includes:

a fifth switch element configured to be turned on in response to the gate-on voltage of the first vertical mode selection signal electrically connecting the third node to an anode electrode of the first light-emitting element.

7. The display panel of claim 6, wherein a sub-pixel is configured to be driven in a first mode, when the first switch element, the third switch element, and the fifth switch element are turned on, and the second switch element and the fourth switch element are in an off state, a sub-pixel is configured to be driven in the first mode, when the first switch element, the fourth switch element, and the fifth switch element are turned on, and the second switch element and the third switch element are in the off state, a sub-pixel is configured to be driven in the first mode, when the second switch element, the third switch element, and the fifth switch element are turned on, and the first switch element and the fourth switch element are in the off state, and a sub-pixel is configured to be driven in a second mode, when the second switch element, the fourth switch element, and the fifth switch element are turned on, and the first switch element and the third switch element are in the off state.

8. The display panel of claim 6, wherein a sub-pixel is configured to be driven in a first mode, when the first switch element, the fourth switch element, and the fifth switch element are turned on, and the second switch element and the third switch element are in an off state, a sub-pixel is configured to be driven in a second mode, when the first switch element, the third switch element, and the fourth switch element are turned on, and the second switch element and the fifth switch element are in the off state, a sub-pixel is configured to be driven in the second mode, when the second switch element, the fourth switch element, and the fifth switch element are turned on, and the first switch element and the third switch element are in the off state, and a sub-pixel is configured to be driven in the second mode, when the second switch element, the third switch element, and the fourth switch element are turned on, and the first switch element and the fifth switch element are in the off state.

9. The display panel of claim 7, wherein a viewing angle of a sub-pixel for being driven in the first mode is greater than a viewing angle of a sub-pixel for being driven in the second mode.

10. The display panel of claim 2, wherein each of the plurality of sub-pixels further includes:

a capacitor connected between sixth and seventh nodes;

a second pixel switch element connected between a data line to which a data voltage of a pixel data is for being applied and a sixth node, and configured to be turned on in response to the gate-on voltage of a first scan signal;

a third pixel switch element connected between the first node and the seventh node, and configured to be turned on in response to the gate-on voltage of a second scan signal;

a fourth pixel switch element connected between a reference node to which a reference voltage is for being applied and an anode electrode of the first light-emitting element, and configured to be turned on in response to the gate-on voltage of the second scan signal;

a fifth pixel switch element connected between the reference node and the anode electrode of the second light-emitting element, and configured to be turned on in response to the gate-on voltage of the second scan signal; and a sixth pixel switch element connected between the reference node and the sixth node, and configured to be turned on in response to the gate-on voltage of a light-emitting signal, and wherein the first pixel switch element is connected between the first node and the second node and is configured to be turned on in response to the gate-on voltage of the light-emitting signal, and the driving element includes a first electrode to which a pixel driving voltage is for being applied, a second electrode connected to the first node, and a gate electrode connected to the seventh node.

11. The display panel of claim 2, wherein each of the plurality of sub-pixels further includes:

a capacitor connected between a pixel driving node to which a pixel driving voltage is for being applied and a seventh node;

a second pixel switch element connected between a data line to which a data voltage of a pixel data is for being applied and a sixth node, and configured to be turned on in response to the gate-on voltage of a second scan signal;

a third pixel switch element connected between the first node and the seventh node, and configured to be turned on in response to the gate-on voltage of a first scan signal;

a fourth pixel switch element connected between a second compensation node to which a second compensation voltage is for being applied and an anode electrode of the first light-emitting element, and configured to be turned on in response to the gate-on voltage of a third scan signal;

a fifth pixel switch element connected between the second compensation node and the anode electrode of the second light-emitting element, and configured to be turned on in response to the gate-on voltage of the third scan signal;

a sixth pixel switch element connected between an initialization node to which an initialization voltage is for being applied and the seventh node, and configured to be turned on in response to the gate-on voltage of a fourth scan signal;

a seventh pixel switch element connected between the pixel driving node and the sixth node, and configured to be turned on in response to the gate-on voltage of a light-emitting signal; and an eighth pixel switch element connected between a first compensation node to which a first compensation voltage is for being applied and the sixth node, and configured to be turned on in response to the gate-on voltage of the third scan signal, and wherein the first pixel switch element is connected between the first node and the second node and is configured to be turned on in response to the gate-on voltage of the light-emitting signal, and the driving element includes a first electrode connected to the sixth node, a second electrode connected to the first node, and a gate electrode connected to the seventh node.

12. The display panel of claim 2, wherein each of the plurality of sub-pixels includes:

a capacitor connected between a pixel driving node to which a pixel driving voltage is for being applied and a seventh node;

a second pixel switch element connected between a data line to which a data voltage of a pixel data is for being applied and a sixth node, and configured to be turned on in response to the gate-on voltage of an Nth scan signal (where N is a natural number);

a third pixel switch element connected between the first node and the seventh node, and configured to be turned on in response to the gate-on voltage of the Nth scan signal;

a fourth pixel switch element connected to an initialization node to which an initialization voltage is for being applied and an anode electrode of the first light-emitting element, and configured to be turned on in response to the gate-on voltage of an (N−1)th scan signal;

a fifth pixel switch element connected between the initialization node and the anode electrode of the second light-emitting element, and configured to be turned on in response to the gate-on voltage of the (N−1)th scan signal;

a sixth pixel switch element connected between the initialization node and the seventh node, and configured to be turned on in response to the gate-on voltage of the (N−1)th scan signal; and a seventh pixel switch element connected between the pixel driving node and the sixth node, and configured to be turned on in response to the gate-on voltage of a light-emitting signal, and wherein the first pixel switch element is connected between the first node and the second node and is configured to be turned on in response to the gate-on voltage of the light-emitting signal, and the driving element includes a first electrode connected to the sixth node, a second electrode connected to the first node, and a gate electrode connected to the seventh node.

13. The display panel of claim 2, wherein each of the plurality of sub-pixels includes:

a capacitor connected between seventh and eighth nodes;

a second pixel switch element connected between a data line to which a data voltage of a pixel data is for being applied and a sixth node, and configured to be turned on in response to the gate-on voltage of an Nth scan signal (where N is a natural number);

a third pixel switch element connected between the first node and the seventh node, and configured to be turned on in response to the gate-on voltage of the Nth scan signal;

a fourth pixel switch element connected to an initialization node to which an initialization voltage is for being applied and an anode electrode of the first light-emitting element, and configured to be turned on in response to the gate-on voltage of an (N−1)th scan signal;

a fifth pixel switch element connected between the initialization node and the anode electrode of the second light-emitting element, and configured to be turned on in response to the gate-on voltage of the (N−1)th scan signal;

a sixth pixel switch element connected between the initialization node and the seventh node, and configured to be turned on in response to the gate-on voltage of the (N−1)th scan signal;

a seventh pixel switch element connected between the sixth node and the eighth node, and configured to be turned on in response to the gate-on voltage of a light-emitting signal;

an eighth pixel switch element connected between a pixel driving node to which a pixel driving voltage is for being applied and the eighth node, and configured to be turned on in response to the gate-on voltage of the light-emitting signal;

a ninth pixel switch element connected between a reference node to which a reference voltage is for being applied and the eighth node, and configured to be turned on in response to the gate-on voltage of the (N−1)th scan signal; and a tenth pixel switch element connected between the reference node and the eighth node, and configured to be turned on in response to the gate-on voltage of the Nth scan signal, and wherein the first pixel switch element is connected between the first node and the second node and is configured to be turned on in response to the gate-on voltage of the light-emitting signal, and, the driving element includes a first electrode connected to the sixth node, a second electrode connected to the first node, and a gate electrode connected to the seventh node.

14. A display device, comprising:

a display panel in which a plurality of data lines, a plurality of gate lines, a plurality of power lines, and a plurality of sub-pixels are arranged;

a data driver configured to supply a data voltage to the plurality of data lines;

a gate driver configured to receive a gate timing signal and supply a scan signal and a light emission signal to the plurality of gate lines; and a level shifter configured to output the gate timing signal, a first horizontal mode selection signal, a second horizontal mode selection signal, a vertical mode selection signal, and a bridge signal, wherein each of the plurality of sub-pixels includes:

a driving element configured to generate a current;

a first light-emitting element configured to emit light by the current from the driving element;

a second light-emitting element configured to emit light by the current from the driving element;

a mode selection circuit configured to select a current path from the driving element in response to the first horizontal mode selection signal, the second horizontal mode selection signal, the vertical mode selection signal, and the bridge signal; and a first pixel switch element connected to the driving element through a first node and connected to the mode selection circuit through a second node, and wherein the vertical mode selection signal includes at least a second vertical mode selection signal among a first vertical mode selection signal and the second vertical mode selection signal.

15. The display device of claim 14, wherein the display panel further includes:

a plurality of vertical mode lines parallel to the plurality of data lines; and a plurality of horizontal mode lines parallel to the plurality of gate lines, and wherein the vertical mode selection signal and the bridge signal are for being applied to the plurality of vertical mode lines, and the first horizontal mode selection signal and the second horizontal mode selection signal are for being applied to the plurality of horizontal mode lines.

16. The display device of claim 15, wherein the gate driver is disposed on the display panel, and at least a portion of the plurality of horizontal mode lines overlap the gate driver on the display panel.

17. The display device of claim 14, wherein the mode selection circuit includes:

a first switch element configured to be turned on in response to a gate-on voltage of the first horizontal mode selection signal electrically connecting the second node to a third node;

a second switch element configured to be turned on in response to the gate-on voltage of the second horizontal mode selection signal electrically connecting the second node to a fourth node;

a third switch element configured to be turned on in response to the gate-on voltage of the bridge signal electrically connecting the third node to the fourth node; and a fourth switch element configured to be turned on in response to the gate-on voltage of the second vertical mode selection signal electrically connecting the fourth node to an anode electrode of the second light-emitting element.

18. The display device of claim 17, wherein the mode selection circuit further includes:

a fifth switch element configured to be turned on in response to the gate-on voltage of the first vertical mode selection signal electrically connecting the third node to an anode electrode of the first light-emitting element.

* * * * *